United States Patent [19]
Dahlen et al.

[11] Patent Number: 5,887,135
[45] Date of Patent: Mar. 23, 1999

[54] SYSTEM AND METHOD FOR MANAGEMENT OF OBJECT TRANSITIONS IN AN EXTERNAL STORAGE FACILITY ACCESSED BY ONE OR MORE PROCESSORS

[75] Inventors: Dennis James Dahlen, Rhinebeck; Audrey Ann Helffrich, Poughkeepsie; Jeffrey Mark Nick, Fishkill; David Harold Surman, Milton; Michael Dustin Swanson, Poughkeepsie, all of N.Y.

[73] Assignee: International Business Machines Corporation, Armonk, N.Y.

[21] Appl. No.: 698,142

[22] Filed: Aug. 15, 1996

[51] Int. Cl.⁶ .............................. G06F 13/00; G06F 13/14
[52] U.S. Cl. .................... 395/200.8; 395/200.58; 395/200.83
[58] Field of Search ................. 395/726, 200.46, 395/200.43, 182.09, 680, 673, 200.58; 711/130; 455/403, 422; 370/338, 340

[56] References Cited

U.S. PATENT DOCUMENTS

| | | |
|---|---|---|
| 5,267,240 | 11/1993 | Bartow et al. . |
| 5,317,739 | 5/1994 | Elko et al. . |
| 5,331,673 | 7/1994 | Elko et al. . |
| 5,339,405 | 8/1994 | Elko et al. . |
| 5,339,427 | 8/1994 | Elko et al. . |
| 5,357,608 | 10/1994 | Bartow et al. . |
| 5,386,512 | 1/1995 | Crisman et al. ............... 395/200.58 |
| 5,388,266 | 2/1995 | Frey et al. . |
| 5,390,328 | 2/1995 | Frey et al. ............... 395/683 |
| 5,392,397 | 2/1995 | Elko et al. . |
| 5,394,542 | 2/1995 | Frey et al. . |
| 5,394,554 | 2/1995 | Elko et al. . |
| 5,410,695 | 4/1995 | Frey et al. . |
| 5,412,803 | 5/1995 | Bartow et al. . |
| 5,455,831 | 10/1995 | Bartow et al. . |
| 5,457,793 | 10/1995 | Elko et al. . |
| 5,463,736 | 10/1995 | Elko et al. . |
| 5,493,668 | 2/1996 | Elko et al. . |
| 5,509,122 | 4/1996 | Bartow et al. . |
| 5,537,574 | 7/1996 | Elko et al. . |
| 5,546,579 | 8/1996 | Josten et al. ............... 707/8 |
| 5,669,002 | 9/1997 | Buch ............... 395/726 |
| 5,699,500 | 12/1997 | Dasgupta ............... 395/180 |
| 5,734,909 | 3/1998 | Bennett ............... 395/726 |

*Primary Examiner*—Frank J. Asta
*Assistant Examiner*—Ivan C. Pierce, III
*Attorney, Agent, or Firm*—William A. Kinnaman, Jr.; Bernard M. Goldman

[57] ABSTRACT

Two or more user applications executing on one or more processors, each controlled by an operating system, share use of a list and subsidiary list structure within a Structured External Storage (SES) facility to which each processor is connected. One of the applications registers interest in particular state transitions affecting one or more subsidiary lists within the list structure, causing a process within the SES to notify the appropriate processor when a list operation causes the particular state transition, without interrupting processing on the processor. The application receives notice of the state transition by periodically polling a vector within the processor, or by receiving control when a test by the operating system of a summary indicator for the vector causes an application exit to be driven.

38 Claims, 34 Drawing Sheets

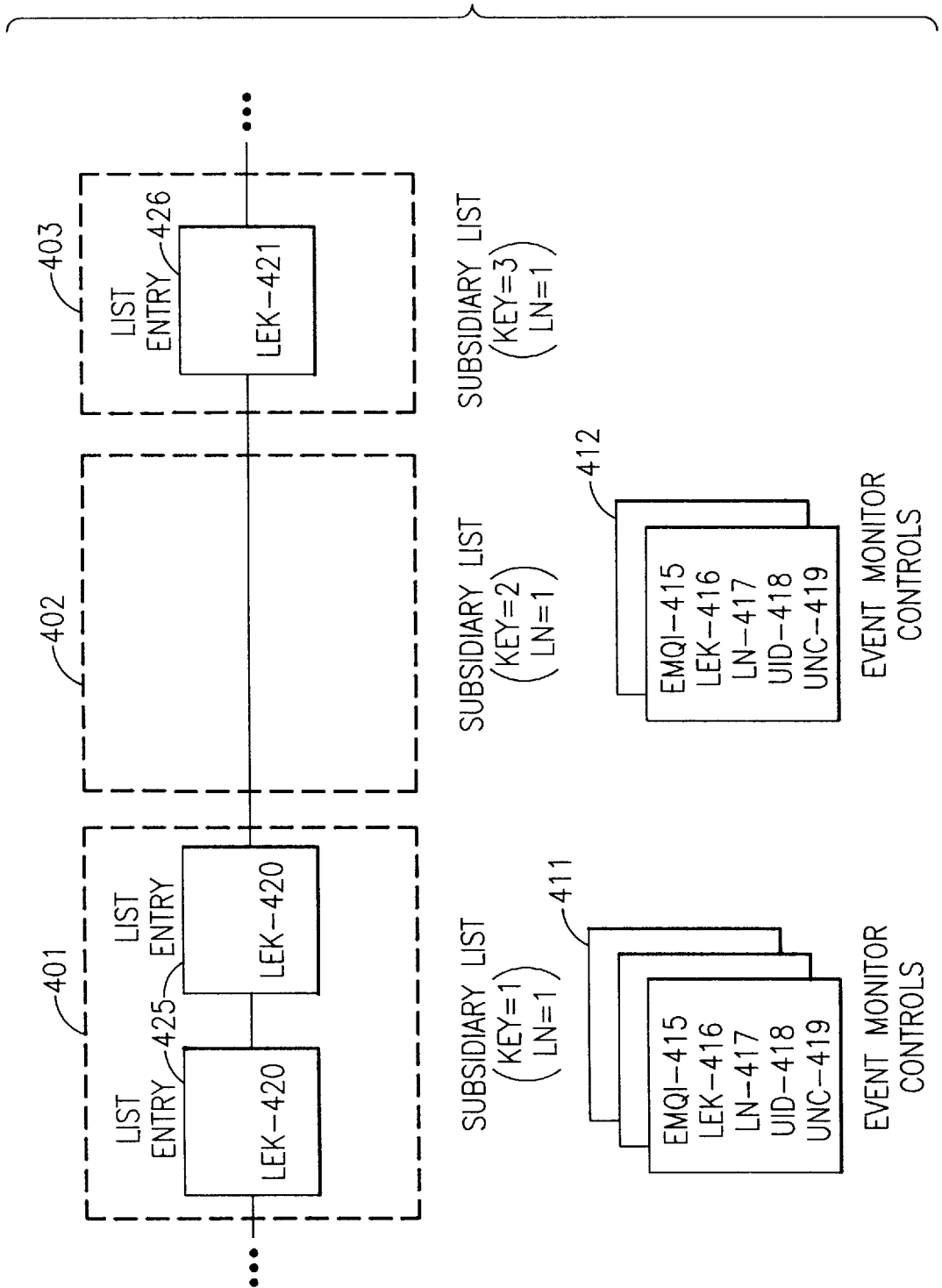

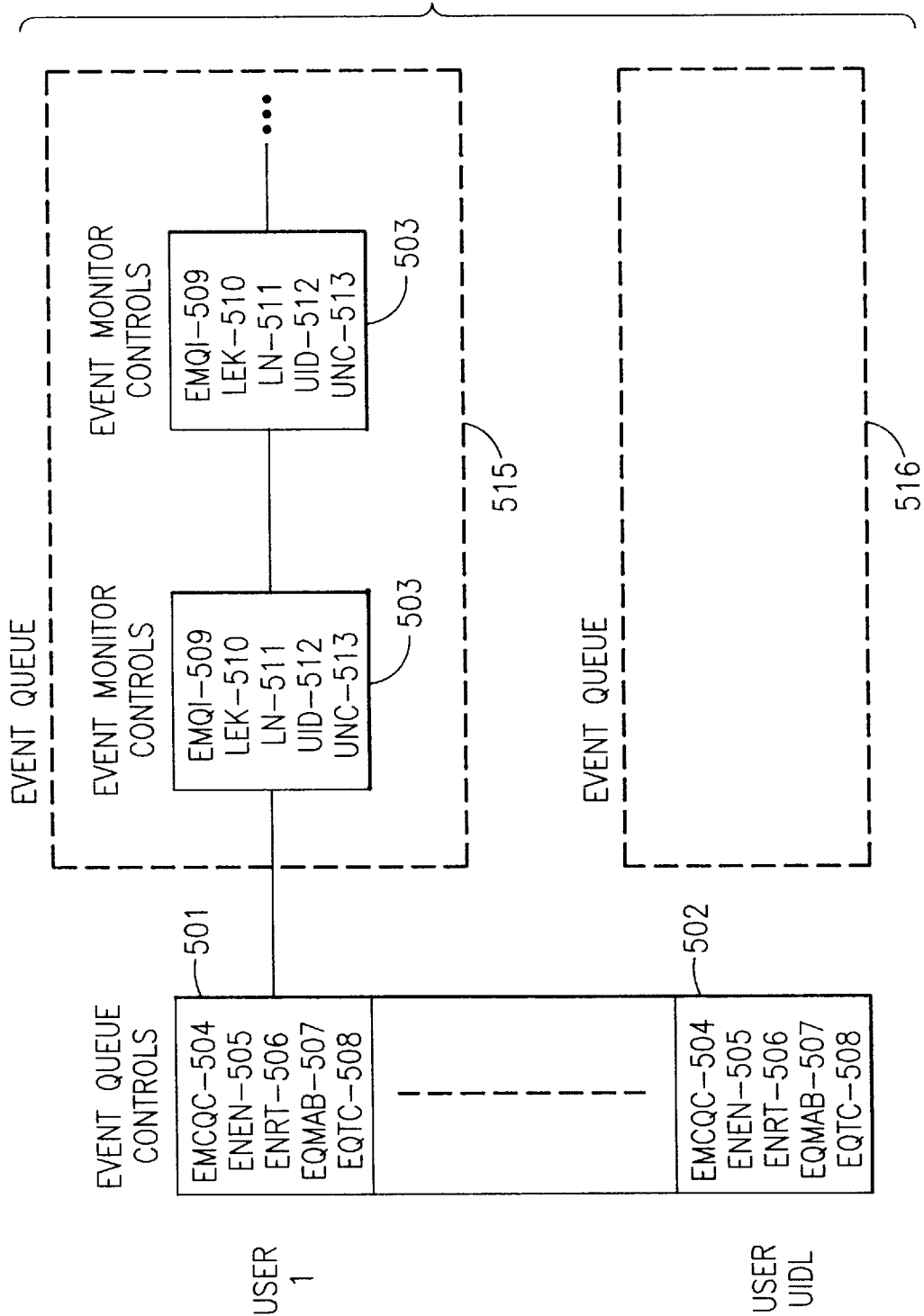

SYSTEM AND METHOD FOR MANAGEMENT OF OBJECT TRANSITIONS IN AN EXTERNAL STORAGE FACILITY ACCESSED BY ONE OR MORE PROCESSORS

CROSS REFERENCE TO RELATED APPLICATIONS

This application contains subject matter which is related to the subject matter of the following application which is assigned to the same assignee as this application. It is hereby incorporated by reference:

"Data Processing System and Method for Providing Notification in a Central Processor of State Changes For Shared Data Structure on External Storage" by J. A. Frey et al., U.S. Pat. No. 5,390,328, issued Feb. 14, 1995.

The subject matter in the following listed applications, which are assigned to the same assignee as this application, is also related to and is hereby incorporated by reference in the present application:

"Configurable, Recoverable Parallel Bus" by N. G. Bartow et al, U.S. Pat. No. 5,357,608 issued Oct. 18, 1994, (Docket No. PO9-91-066); Divisional case, U.S. Pat. No. 5,509,122 issued Apr. 16, 1995, (Docket No. PO9-91-066XA); Divisional case, Ser. No. 08/443,293 filed May 17, 1995, (Docket No. PO9-91-066XB);

"High Performance Intersystem Communications for Data Processing Systems" by N. G. Bartow et al., U.S. Pat. No. 5,412,803 issued May 2, 1995, (Docket No. PO9-91-067);

"Frame-Group Transmission and Reception for Parallel/Serial Buses", U.S. Pat. No. 5,267,240 issued Nov. 30, 1993 (Docket No. PO9-92-001); Continuation case, U.S. Pat. No. 5,455,831 issued Oct. 3, 1995, (Docket No. PO9-92-001X);

"Communicating Messages Between Processors and A Coupling Facility" by D. A. Elko et al., Ser. No. 07/860,380 abandoned (Docket No. PO9-91-006); Continuation case, Ser. No. 08/420,893 filed Apr. 11, 1995 (Docket No. PO9-91-006X);

"Sysplex Shared Data Coherency Method and Means" by D. A. Elko et al., U.S. Pat. No. 5,537,574 issued Jul. 16, 1996, (Docket No. PO9-91-052);

"Method and Apparatus for Distributed Locking of Shared Data, Employing a Central Coupling Facility" by D. A. Elko et al., U.S. Pat. No. 5,339,427 issued Aug. 16, 1994, (Docket No. PO9-91-059);

"Command Quiesce Function" by D. A. Elko et al., U.S. Pat. No. 5,339,405 issued Aug. 16, 1994, (Docket No. PO9-91-062);

"Storage Management for a Shared Electronic Storage Cache" by D. A. Elko et al., U.S. Pat. No. 5,457,793 issued Oct. 10, 1995, (Docket No. PO9-91-078);

"Management of Data Movement from a SES Cache to DASD" by D. A. Elko et al., U.S. Pat. No. 5,493,668 issued Feb. 20, 1996, (Docket No. PO9-91-079);

"Command Retry System" by D. A. Elko et al., U.S. Pat. No. 5,392,397 issued Feb. 21, 1995, (Docket No. PO9-92-002);

"Integrity of Data Objects Used to Maintain State Information for Shared Data at a Local Complex" by D. A. Elko et al., U.S. Pat. No. 5,331,673 issued Jul. 19, 1994, (Docket No. PO9-92-003);

"Management of Data Objects Used to Maintain State Information for Shared Data at a Local Complex" by J. A. Frey et al., U.S. Pat. No. 5,388,266 issued Feb. 7, 1995, (Docket No. PO9-92-004);

"Recovery of Data Objects Used to Maintain State Information for Shared Data at a Local Complex" by J. A. Frey et al., U.S. Pat. No. 5,394,542 issued Feb. 28, 1995, (Docket No. PO9-92-005);

"Message Path Mechanism for Managing Connections Between Processors and a Coupling Facility" by D. A. Elko et al., Ser. No. 07/860,646, abandoned (Docket No. PO9-92-006); Continuation case, U.S. Pat. No. 5,463,736 issued Oct. 31, 1995, (Docket No. PO9-92-006X).

"Data Processing System and Method for Providing Notification in a Central Processor of State Changes for Shared Data Structures" by J. A. Frey et al., U.S. Pat. No. 5,390,328 issued Feb. 14, 1995, (Docket No. PO9-92-007);

"Method and Apparatus for Performing Conditional Operations on Externally Shared Data" by J. A. Frey et al., Ser. No. 07/860,655 abandoned (Docket No. PO9-92-008); Continuation case, Ser. No. 08/383,532 filed Feb. 1, 1995, (Docket No. PO9-92-008X);

"Apparatus and Method for List Management in a Coupled Data Processing System" by J. A. Frey et al., U.S. Pat. No. 5,410,695 issued Apr. 25, 1995, (Docket No. PO9-92-009);

"Interdicting I/O and Messaging Operations in a Multi-System Complex" by D. A. Elko et al., U.S. Pat. No. 5,394,554 issued Feb. 28, 1995, (Docket No. PO9-92-010); and "Method and Apparatus for Coupling Data Processing Systems" by D. A. Elko et al., U.S. Pat. No. 5,317,739 issued May 31, 1994, Docket No. PO9-92-012).

INTRODUCTION

The present invention relates to general purpose computer applications, also referred to as users, which share data in one or more computer processsing complexes (CPCs) in a single or multi-system configuration, which may be in a Parallel Sysplex multi-system using a Parallel Sysplex coupling facility (Parallel Sysplex is a trademark owned by International Business Machines Corporation). More specifically, it relates to the managing of shared lists and subsidiary lists containing data in a SES facility which is coupled to each of the CPCs, and where the SES facility detects the change of a subsidiary list to a not-empty or empty state, and causes an event-monitor-controls (EMC) object to be queued to the event queue or withdrawn from the event queue of each user that has registered as interested in the state of that particular subsidiary list. It further relates to the managing of each user's event queue in the SES facility, where the SES facility detects the change of an event queue to a not-empty or empty state, and notifies the user who has registered as interested in the state of its event queue about such event-queue state transitions. It further relates to the actions taken by the notified user to efficiently retrieve information from the EMCs queued to its event queue, and to dequeue those EMCs from its event queue.

BACKGROUND OF THE INVENTION

Queueing or message passing as a general concept is basic to many programming protocols. A list of objects is a convenient means of representing work requests between a client and a server. The server is responsible to remove a work object from the list, service the request, and send a response back to the client indicating that the service has been completed. The response may be presented to the client by placing a response object onto a list which is processed by the client. In such a client-server system, the server accepts and processes requests until all requests have been processed and the list of service requests is exhausted. Typically when the list of service requests is exhausted, the server enters a wait state or performs lower priority work until some form of notification is received indicating that additional requests have been placed on the list for service.

In multiprocessing and coupled systems environments, the lists of work objects and response objects are processed by a multiplicity of processes (programs), which may operate in one or more Central Processor Complexes (CPCs) comprising a multi-system configuration. The lists must be accessible by each of the processes, resulting in problems related to the coordination of activity between the several processes executing on separate CPCs.

These problems grow in environments where two or more CPCs are each remotely coupled to a shared external memory, or facility, containing queues of work and response objects. The delay and overhead involved in accessing the lists put a high premium on minimizing accesses to the external facility, as well as minimizing the direct interprocessor communication (messaging) required for coordination.

Exemplary of these problems is the problem of substantially reducing or eliminating remote requests by a process directed towards list objects which do not exist, that is, attempting to process list entries on a list which is empty. Processes which rely on "polling" techniques, which work well in local queueing environments where the costs of periodic polling are low, will suffer unacceptable performance penalties if polling must instead be done to an external facility for which a substantial likelihood exists that the list being polled is empty.

In order to reduce this overhead, techniques have been developed by which a remote client or server is notified when a queue becomes empty (so that polling can be suspended) or transitions from an empty to not-empty state (so that polling can be resumed). Typically such notification is done in static, or tightly controlled environments, where the association between the queue and the process interacting with the queue is known, so that the determination of which CPC to signal is simple. Additionally, such multi-systems must contend with the overhead within the multi-systems containing the client or server processes of being interrupted when such notifications are received, and handling the notification in an appropriately serialized manner if in fact the notification was broadcast to multiple CPCs to be executed in parallel by processes executing concurrently on those various systems. Such difficulties may severely restrict the operating environments which can accommodate such notification mechanisms.

Frey et al. (U.S. Pat. No. 5,390,328) teaches that these difficulties may be overcome using a mechanism in which the client and server processes register to be notified by the SES facility of state transitions (empty to not-empty, or not-empty to empty) involving particular lists in a SES facility list structure. Such notifications are sent by the SES facility to all users who have registered an interest in the particular list which experienced the transition, and only to such interested users, reducing the overhead inherent in undirected "broadcast" notification. Because these notifications do not interrupt the remote CPC to which the notification is directed, they cause little or no disruption to processes executing there; the notification signal changes the state of a particular bit in a "list notification vector" which resides in the Hardware System Area (HSA) of the remote CPC to reflect the empty or not-empty state of the list with which the vector bit has been associated by the remote user. In the case of an empty to not-empty list state transition, the notification signal may also set summary indicators associated with the vector so that the modification of some bit in the vector may be more efficiently observed.

SUMMARY OF THE INVENTION

However, this prior art mechanism suffers a number of difficulties when a user has registered a monitoring interest in a very large number of lists within the list structure. (This might be the case, for example, in a protocol in which a list header contains entries representing a single type of transaction to be processed and the number of possible transaction types is large; or when a list header contains entries representing responses to be sent to a particular terminal and the number of possible terminals is large.) Once the user knows that some bit in the list-notification vector has been updated, the user must then test each of the bits in the vector which have been associated by the user with some monitored list, in order to determine which of the many lists that he is monitoring has in fact become not-empty. This may result in significant "vector scanning" overhead (though, since the list-notification vector is local to the CPC on which the user is executing, the resultant overhead is still much less than the overhead of accessing the shared storage facility directly to obtain this state information).

Furthermore, because the number of monitored lists is large, the frequency with which any one or more of the monitored lists transitions to not-empty is also likely to be large, with the result that this vector scanning process is likely to be executed with high frequency by each of the monitoring users, further increasing the associated overhead.

Additionally, the list notification vector space required to support the required one-to-one mapping between a list notification vector bit and a particular list being monitored in the SES facility may be substantial when the number of monitored lists is large.

Also, the mechanism provides no means to pass additional user-controlled information along with the notification signal to further describe or qualify the nature of the transition that has occurred; the only information regarding the transition is that which is encoded in the setting of the vector bit itself (that is, which particular list has transitioned, and whether it has transitioned from the empty to not-empty state or vice versa).

OBJECTS OF THE INVENTION

It is an object of the present invention to provide additional flexibility and granularity compared to the prior art, by allowing users to register monitoring interest in particular subsidiary lists in the SES facility list structure. A subsidiary list is defined as the set of contiguous list entries on a list which share a common list-entry key value. When the set of list entries is null for a particular list and key value, the subsidiary list is said to be in the empty state; when the set of list entries is not null for a particular list and key value, the subsidiary list is said to be in the not-empty state. The present invention allows monitoring at a granularity of a subsidiary list. This allows a large number of monitored objects to be more easily accommodated than monitoring with the coarser granularity of an entire list.

It is a further object of the present invention to eliminate the requirement to maintain a large number of list notification vector bits associated in a one-to-one manner with the individual monitored objects (lists or subsidiary lists), and thereby eliminate the overhead caused by the excessive amount of unproductive list-notification vector scanning which would have been necessary to determine which particular list(s) or subsidiary list(s) had transitioned, once the user had determined that one or more transitions has been reflected in its local list-notification vector.

It is a further object of the present invention to allow the user who registers an interest in monitoring a particular subsidiary list to define user-notification control information, meaningful to the application, which is stored in the SES facility along with other monitoring control information, and which can be efficiently retrieved from the SES facility as an integral part of the overall processing related to subsidiary list event monitoring. This user-notification control information must be made available to the notified user in a manner which has high reliability and integrity; that is, such that presentation of user-notification control information associated with a particular subsidiary list state transition is not impaired by temporary losses of connectivity between the SES facility and the CPC to which the list-notification is directed, nor by the inability to store or buffer the user-notification control data due to storage constraints anywhere in the configuration.

One or more operating systems (OSs) executing on one or more Central Processing Complexes (CPCs) are grouped together in a coupled configuration, and are also coupled to a separate Structured External Storage (SES) facility, which manages lists of data which are shared among the CPCs in the multi-system.

The SES facility maintains structures of list objects which reside in the SES, and which are further subdivided into groupings called subsidiary lists. A subsidiary list is defined as a set of contiguous list entries on a particular list which share a particular key value. When the set of list entries is null for a particular list and key value, the subsidiary list is in the empty state; when the set of list entries is not null, the subsidiary list is in the not-empty state. The SES facility also provides operations (or commands) which represent requests for the SES facility to perform one or more of its management functions on the list structures.

These commands permit programmed applications that reside on the CPCs to:

Allocate a list structure in the SES facility, at the same time indicating their desire to support list entry keys for the list structure, which in turn enables the use of subsidiary lists and establishes an event queue for each of the users of the list structure.

Identify themselves as users of a list structure.

Register their interest in being notified when a specified subsidiary list enters the empty or not-empty state, or when any of a specified set of subsidiary lists enters the empty or not-empty state. This monitoring is herein referred to as event monitoring. The users may associate a piece of user-defined data, the user-notification controls, with this registered interest in monitoring the state of a subsidiary list.

Register their interest in being notified when their event queue, associated with their use of the list structure, enters the empty or not-empty state. This monitoring is herein referred to as event queue monitoring.

Read, Create, Delete, Replace, and Move list entries to or from the subsidiary lists which reside in the SES facility list structure.

Retrieve and dequeue events which have been queued to their event queue as a result of particular subsidiary list transitions which have occurred as a result of the processing of list-entry commands by any of the users of the list structure.

Notification of subsidiary list state changes is initiated by the SES facility queueing or withdrawing an event-monitor-controls (EMC) object to or from the event queue of a user who is monitoring the subsidiary list. When the monitored subsidiary list transitions to the not-empty state, an EMC will be queued to the user's event queue; when the monitored subsidiary list transitions to the empty state, the EMC will be withdrawn from the user's event queue. This notification occurs for each of the user(s) having a registered monitoring interest for the particular subsidiary list at the time of the subsidiary list transition.

Notification of event queue state changes is initiated by a list-notification command sent by the SES facility and which is an unsolicited communication to the CPC of the user who is associated with the event queue. This communication is directed to a facility at each CPC, called the SES-Support Facility. It responds to the list-notification command from the SES by updating, in a non-disruptive manner, structures of list notification vectors and summary indicators which reside in the Hardware System Area (HSA) in the CPC, and which were associated by the user with the user's event queue which incurred the state transition. While the list-notification command, SES-Support Facility, and list notification vectors are described in prior art (Frey et al., U.S. Pat. No. 5,390,328), the use of these SES-Support Facility commands and facilities in the context of event queue state change notification is a part of the present invention.

When users observe an event queue empty to not-empty state transition via this list notification mechanism, they make use of a new SES command to efficiently retrieve event information from the event monitor controls objects that have been queued to their event queue. A single issuance of this command may process multiple EMCs, for various subsidiary lists in which the user has registered an event monitoring interest, and which have been queued to the user's event queue; the information returned for each EMC describes the particular subsidiary list which has transitioned to the not-empty state, and also contains the user-defined user-notification control information associated with the user's registered interest in the particular subsidiary list. This same command also dequeues these EMCs from the event queue as they are processed, ensuring that information from each EMC is retrieved only once for a particular occurrence of a subsidiary list transition.

BRIEF DESCRIPTION OF THE DRAWINGS

The detailed description includes preferred embodiments of the invention, together with advantages and features, by way of example with reference to the following drawings:

FIG. 4 is a block diagram illustrating the structure of subsidiary list objects in the SES facility, and illustrating the association of one or more users' event-monitor-controls (EMC) objects with those subsidiary lists.

FIG. 5 is a block diagram illustrating the structure of the event-queue controls, of the event queues, and of the event-monitor-controls objects which may be queued on the event queues.

FIG. 15A illustrates the steps in subsidiary list event-monitor-controls queueing, in which all of the event-monitor-controls objects associated with a particular subsidiary list are queued to their respective users' event queues. FIG. 15B illustrates the steps in single event-monitor-controls queueing, in which a particular event-monitor-controls object is queued to its user's event queue.

FIG. 18A illustrates the steps in subsidiary list event-monitor-controls withdrawal, in which all of the event-monitor-controls objects associated with a particular subsidiary list are withdrawn from their respective users' event queues. FIG. 18B illustrates the steps in single event-monitor-controls withdrawal, in which a particular event-monitor-controls object is withdrawn from its user's event queue.

FIG. 23A illustrates the steps in the command pertaining to event-monitor deregistration. FIG. 23B illustrates the steps in the command pertaining to event queue monitor deregistration.

FIGS. 28A and 28B illustrate the steps in the command pertaining to event-monitor registration. FIG. 28C illustrates the steps in the command pertaining to event queue monitor registration.

DESCRIPTION OF THE PREFERRED EMBODIMENT

Throughout this preferred embodiment, figure references refer to items in figures in the following manner. The first digit of a 3-digit figure reference, or the first two digits of a 4-digit figure reference, indicate which figure contains the item described by the figure reference. The last two digits of the figure reference uniquely identify the referenced item within that figure.

Also, in this preferred embodiment, generally only the new and changed list-structure objects, operands, processes and commands, relative to the cross-referenced applications (particularly Frey et al. U.S. Pat. No. 5,390,328) are described in detail in the present application.

Introduction

Figure 1:
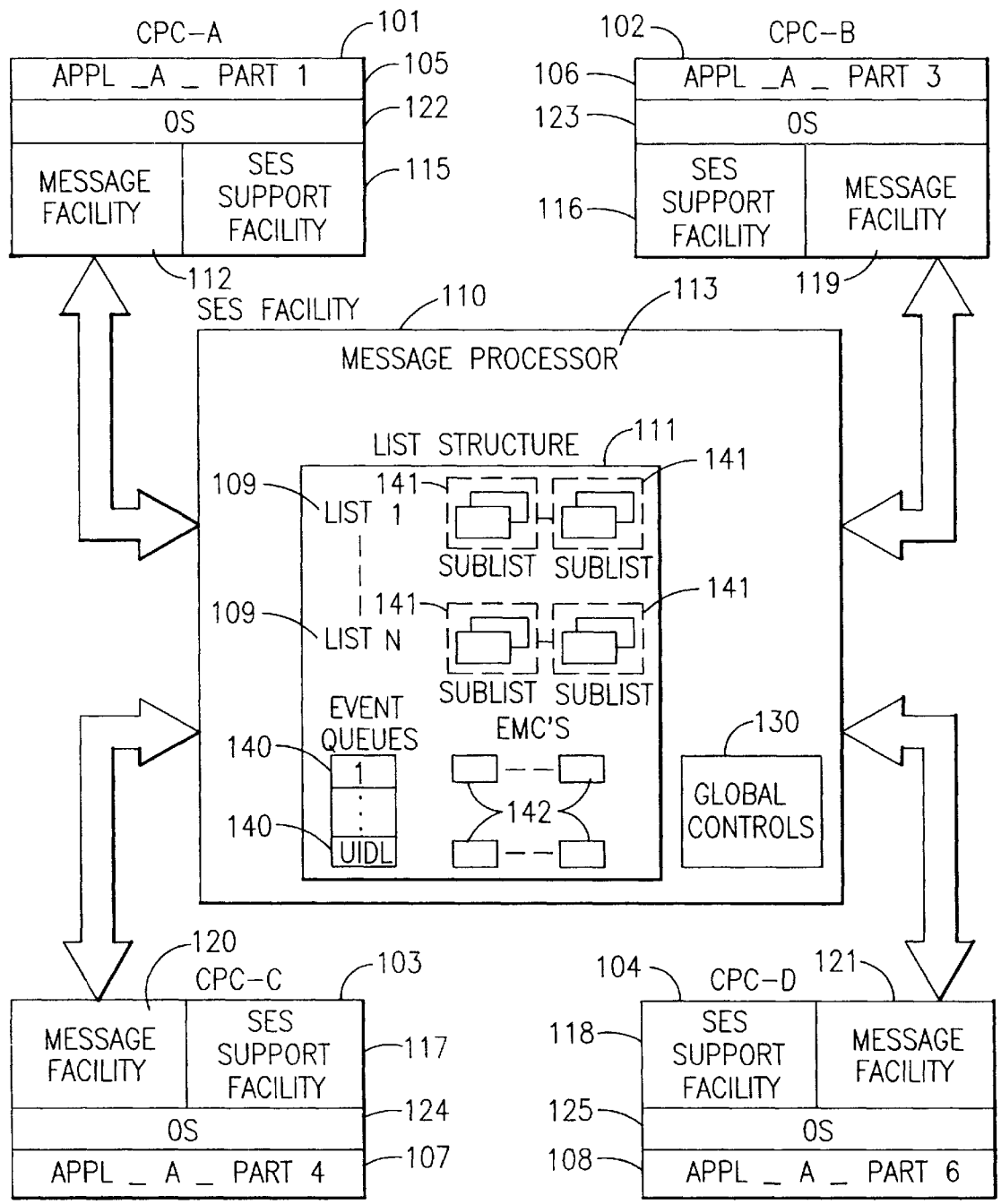
FIG. 1 is a block diagram illustrating the environment in which programmed applications in different CPCs are sharing a list structure in the SES facility, in which keyed list entries are supported and event queues exist for each user of the list structure.
Figure 2:
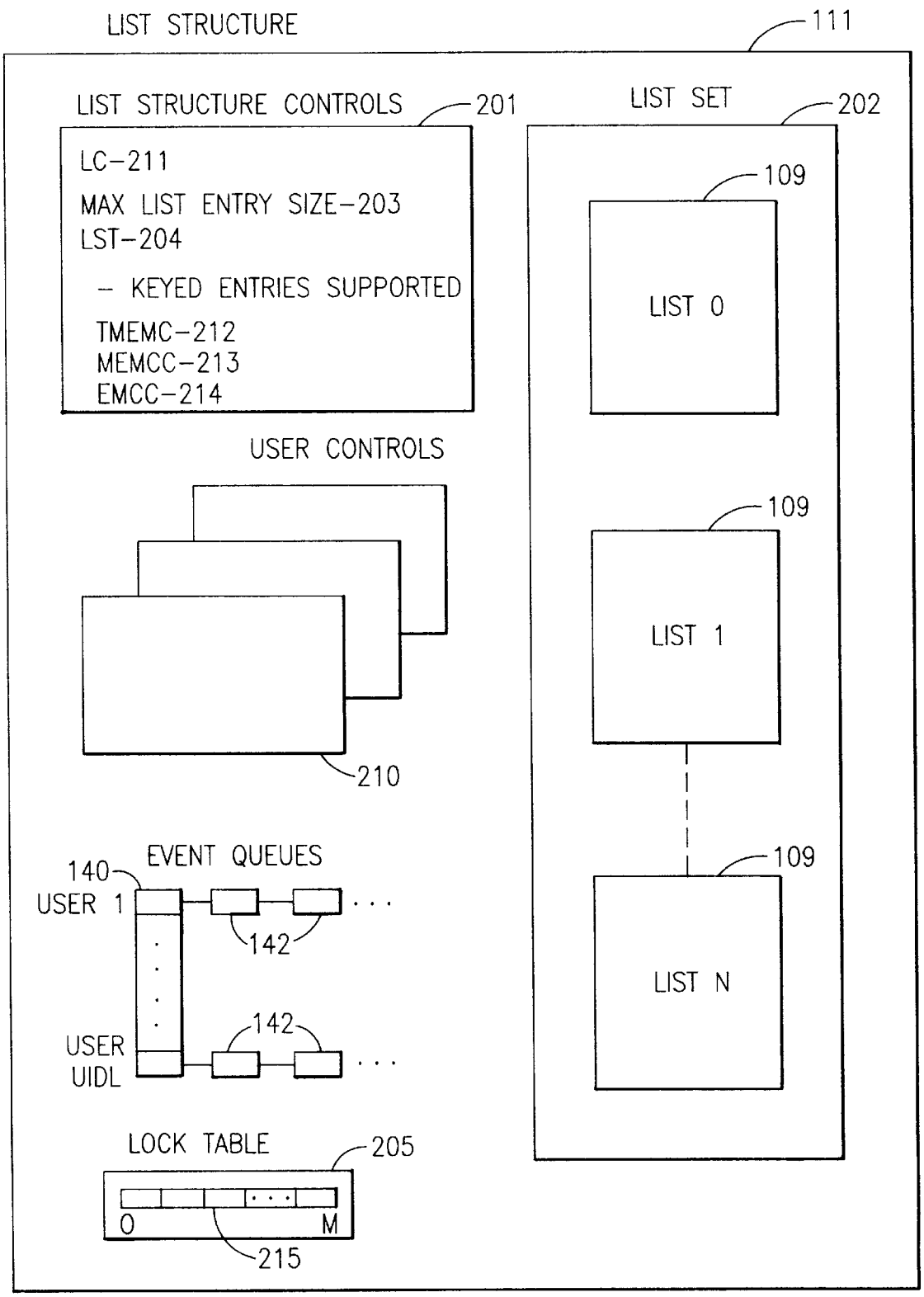
FIG. 2 is a block diagram illustrating the overview structure of a list structure in the SES facility, in which keyed list entries are supported, and event queues exist for each user.
Figure 3:
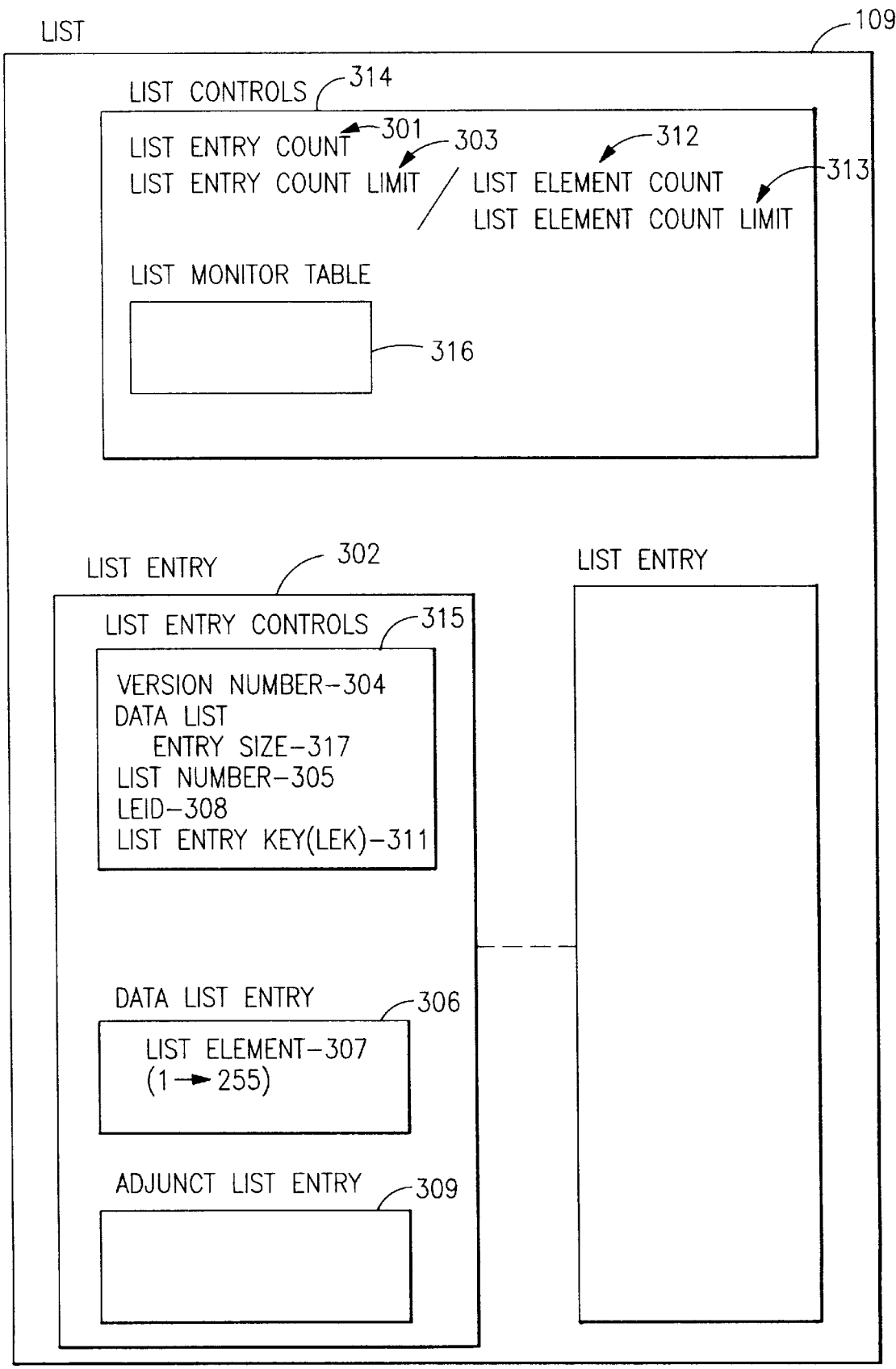
FIG. 3 is a block diagram illustrating the structure of a list object in the SES facility.

In FIG. 1, a configuration is described which enables a complex of CPCs (101–104) to issue requests to, and receive responses from, a structured external storage (SES) facility (110), also known as a coupling facility. Programming can request operations to be performed by the SES which are designed to operate upon data resident in the SES and return status information. The SES-list structure (111) is supported within the SES by necessary operations to facilitate the queueing of shared data objects (e.g., list entries) in such a multi-system configuration.

Clients and servers are exemplary applications (105–108), also referred to as users, which execute on a CPC (101–104).

The actions of placing or removing entries onto/from a list (109) causes the list at indeterminate times to transition from the empty state (no entries on the list) to the not-empty state (entries on the list), or from the not-empty state to the empty state.

List-state transitions, therefore, occur:
when a list changes from the empty state to the not-empty state, and/or
when a list changes from the not-empty state to the empty state.

Similarly, when the list structure supports the use of list-entry keys, the entries placed onto a list are further partitioned into subsidiary lists, also known as sublists (141), where the basis for such partitioning into subsidiary lists is the list-entry key assigned to the entries. Specifically, a subsidiary list is defined as the set of contiguous list entries on a particular list which have the same list-entry key value. The actions of placing or removing entries onto/from a subsidiary list causes the subsidiary list at indeterminate times to transition from the empty state (no entries on the subsidiary list) to the not-empty state (entries on the subsidiary list), or from the not-empty state to the empty state.

Subsidiary list-state transitions, therefore, occur:
when a subsidiary list changes from the empty state to the not-empty state, and/or
when a subsidiary list changes from the not-empty state to the empty state.

In this configuration, users may register at the SES as having an interest in monitoring the subsidiary list state transitions associated with one or more subsidiary lists in the list structure. Such registration is recorded in an event-monitor-controls object (EMC) (142) which is associated with the particular subsidiary list which is being monitored (described by its list number and list-entry key value), and the user who has requested such monitoring. Any number of users of the list structure may concurrently monitor the same subsidiary list, each monitoring user having its own event-monitor-controls object associated with the subsidiary list; similarly, a given user may concurrently monitor any number of individual subsidiary lists. Monitoring of subsidiary lists is also herein referred to as event monitoring.

Each possible user of the list structure also has an event queue (140) associated with its use of the structure. When a monitored subsidiary list in the structure transitions from the empty to the not-empty state, the event-monitor-controls objects associated with event monitoring for that particular subsidiary list are queued to the event queues of their respective owning users. When a monitored subsidiary list in the structure transitions from the not-empty to the empty state, the event-monitor-controls objects associated with event monitoring for that subsidiary list are withdrawn from the event queues of their respective owning users. These queueing and withdrawal actions are performed by the SES facility whenever subsidiary list state transitions occur, affecting a monitored subsidiary list, as a result of any command which causes such a transition to occur.

The actions of queueing or withdrawing event-monitor-controls objects onto/from a user's event queue causes event queues at indeterminate times to transition from the empty state (no EMCs on the event queue) to the not-empty state (one or more EMCs on the event queue), or from the not-empty state to the empty state.

Event-queue state transitions, therefore, occur:
when an event queue changes from the empty state to the not-empty state, and/or
when an event queue changes from the not-empty state to the empty state.

Since event-monitor-controls objects are queued onto event queues in response to the transition from the empty to not-empty of one or more monitored subsidiary lists, an event queue state transition is the direct result of one or more subsidiary list state transitions for subsidiary lists in which the user has registered event-monitoring interest. Information contained within the queued event-monitor-controls object describes the subsidiary list with which it is associated, as well as user-defined state information relevant to the monitoring interest. The event queue thus serves as a point of aggregation for information describing, for a given user, which of the various subsidiary lists that the user is monitoring have transitioned to the not-empty state. Users may register at the SES an interest in monitoring the state transitions of their event queue. The SES facility will notify the user of event queue state transitions via the issuance of list-notification commands (as previously described by Frey et al. U.S. Pat. No. 5,390,328).

Such event queue notifications serve as initiative for the user to retrieve the aggregated subsidiary-list information stored in the event-monitor-controls objects queued on its event queue, so that the user may thereby become aware of such subsidiary list state transitions and take whatever processing actions the users' application protocol requires to process the list entries residing on the subsidiary lists. Retrieving the event-monitor-controls information from the user's event queue also causes the EMC to be dequeued from the user's event queue, since its function of notifying the user of a subsidiary list state transition has been served.

In the present embodiment, objects, operands, processes, and commands are described whereby:

Application programs (users) register their interest in monitoring particular subsidiary list state transitions, and in monitoring the event queue state transitions of their event queue.

Management of subsidiary list state transitions and event queue state transitions is centralized entirely within the SES facility and the SES-Support Facilities (115–118) within each CPC. The SES Support Facility (SSF) (115–118) is a processing facility attached to each CPC (101–104) in the sysplex. Its function in list-state and event-queue state transition notification processing is to interface with the message facility (112, 119–121) to process list-notification commands from the SES. The commands instruct the SSF to update the list-notification vector objects in the CPC to reflect list-state or event-queue state transitions for a particular user and list, or user and event-queue, as specified in the operands on a list-notification command.

Notifications of list-state or event-queue state transitions from the SES are unsolicited and do not interrupt the programs executing on the target CPC.

Operating systems within each CPC, under which the registered application programs operate, are provided with efficient OS polling functions with which to observe updates to the list-notification objects in the CPC which reflect list-state or event queue state transitions.

In response to observing event-queue transitions to the not-empty state, application programs retrieve information from their event queue describing which particular monitored subsidiary lists have transitioned to not-empty, and take the necessary program actions to process list entries residing on those subsidiary lists.

In FIGS. 2 through 5, additional detail is provided on the objects comprising a list structure (111). A list structure consists of list-structure controls (201), user controls (210), and either a lock table (205), or a list set (202) with list controls, list-entry controls, and optionally, objects associated with monitoring events (140,142,411,412,501,503).

The list-structure controls (201) are initialized when the list structure is created; the user controls (210) are created and initialized when a list-structure user is attached.

Each lock table (205) consists of a sequence of one or more lock table entries (215), which are numbered consecutively starting at zero. The list-structure type (204) and the lock-table-entry size determine whether all the lock-table entries have a global-lock-manager object, a local-lock-managers object, or both.

Each list set (202) consists of one or more lists (109), which are numbered consecutively starting at zero. There are list controls (314) associated with each list.

Each list (109) consists of a sequence of zero or more list entries (302). The list-structure type (204) determines whether all the list entries in the list set have a data list entry (306), an adjunct list entry (309), or both. There are list-entry controls (315) associated with each list entry. When the list structure type indicates that keyed list entries are supported, the list entry controls contain a list-entry key (311) for each list entry, and the list-entry key is used as a basis for partitioning list entries on a list into subsidiary lists (401, 402,403). Each subsidiary list consists of a sequence of zero or more contiguous entries within a list, where each entry has the same list-entry key value (420,421).

Also, when the list structure type indicates that keyed list entries are supported, there is an event queue (515,516) and event-queue controls (501,502) associated with each user; event-monitor controls may be created and associated with any subsidiary list and user combination (411,412). The event-monitor controls contain both subsidiary-list (416, 417,510,511) and user identification (418,512) information, and also may contain user-defined user-notification-controls (419,513) regarding the registered event monitoring interest. Once they are created via event-monitor registration, event-monitor-controls objects remain associated with a particular subsidiary list and user until they are deregistered and deleted. In addition to this association, at any point in time these EMCs may or may not be queued to their owning user's event queue (503), as a result of queueing and/or withdrawal actions taken by the SES in response to subsidiary list state transitions.

FIG. 4 provides an example of subsidiary lists within a list, and their association with event-monitor-controls objects.

The subsidiary list of entries with list number 1 and list-entry key 1 (401) is currently in the not-empty state containing two list entries (425). Associated with that subsidiary list are three event-monitor-controls objects (411), representing the event monitoring interest of three users of the list structure, as indicated by the user identifier (418) in the respective EMCs. Since the subsidiary list is in the not-empty state, its associated event-monitor-controls objects (411) are either about to be queued to their respective users' event queues, or they have already been queued to the users' event queues and subsequently explicitly dequeued by the users.

The subsidiary list of entries with list number 1 and list-entry key 2 (402) is currently in the empty state, containing no list entries. Associated with that subsidiary list are two event-monitor-controls objects (412), representing the event monitoring interest of two users of the list structure. Should this subsidiary list transition to the not-empty state, the associated EMCs (412) will be queued by the SES to their respective users' event queues.

The subsidiary list of entries with list number 1 and list-entry key 3 (403) is currently in the not-empty state containing one list entry (426). Either no user of the list structure has registered interest in monitoring this subsidiary list, or all of the event-monitor-controls objects associated with the monitoring users for this subsidiary list have already been queued to their respective users' event queues.

FIG. 5 provides an example of event queue controls and the event queues associated with them. When the list-structure type (204) indicates that the structure supports keyed list entries, each user of the structure has an event queue controls object (501,502) and an event queue (515, 516). The event queue controls object (501,502) contains event-queue monitoring registration information and control information regarding the current state of the event queue. The event queue for each user is comprised of zero or more event-monitor-controls objects (503) which have been queued by the SES-list structure as a result of a subsidiary list transition to the not-empty state for a subsidiary list which is being monitored by that user.

Figure 6A:
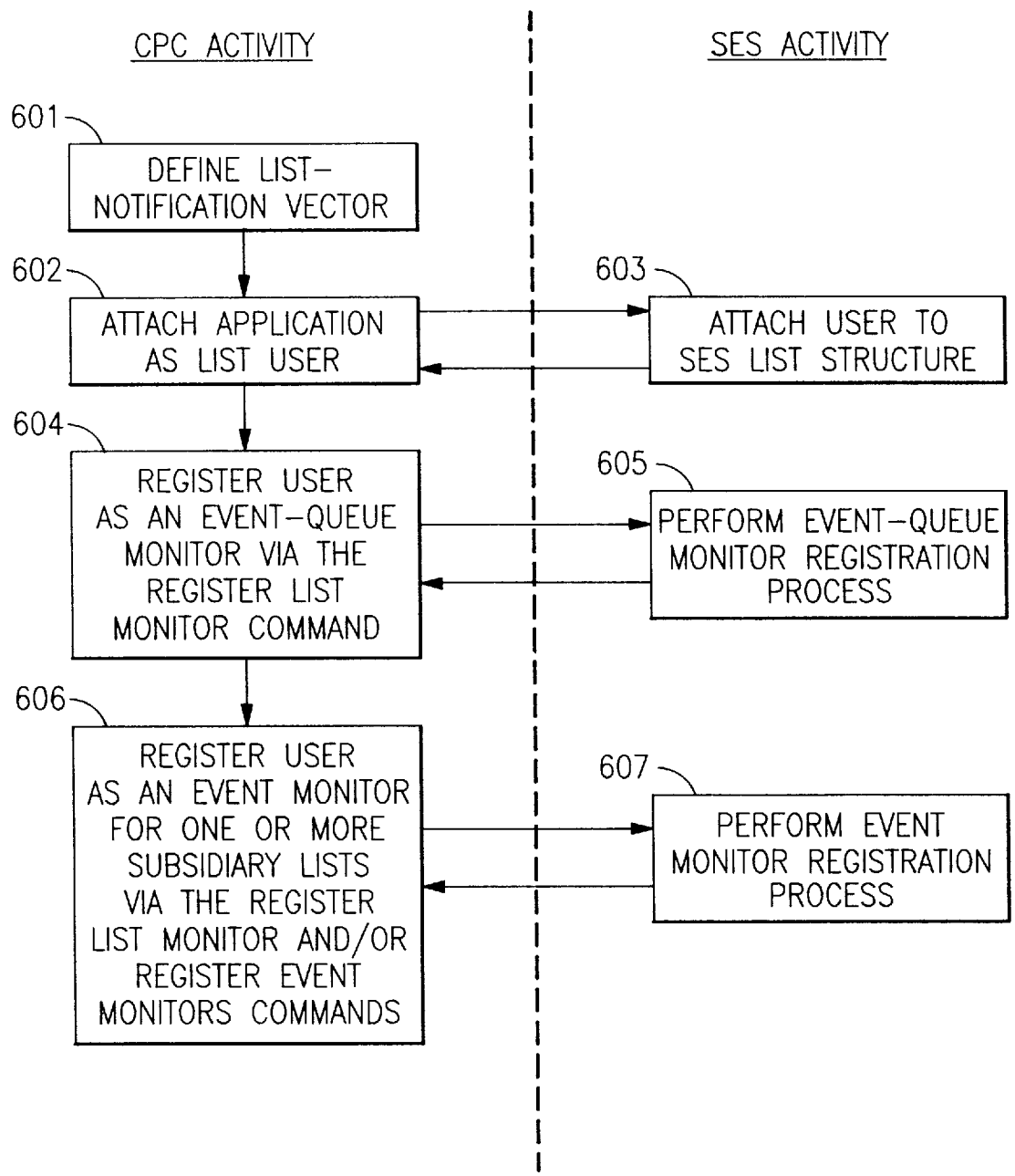
FIGS. 6A, 6B and 6C are flowcharts illustrating the steps in the overall process by which a programmed application acquires a list structure supporting event monitoring for subsidiary lists; by which the programmed application accesses and monitors subsidiary lists of data entries in the SES facility; by which the programmed application monitors its event queue of EMCs in the SES facility; and by which the programmed application uses information returned from the EMCs on its event queue to manipulate the specific subsidiary lists which have experienced transitions of interest to the application.
Figure 6B:
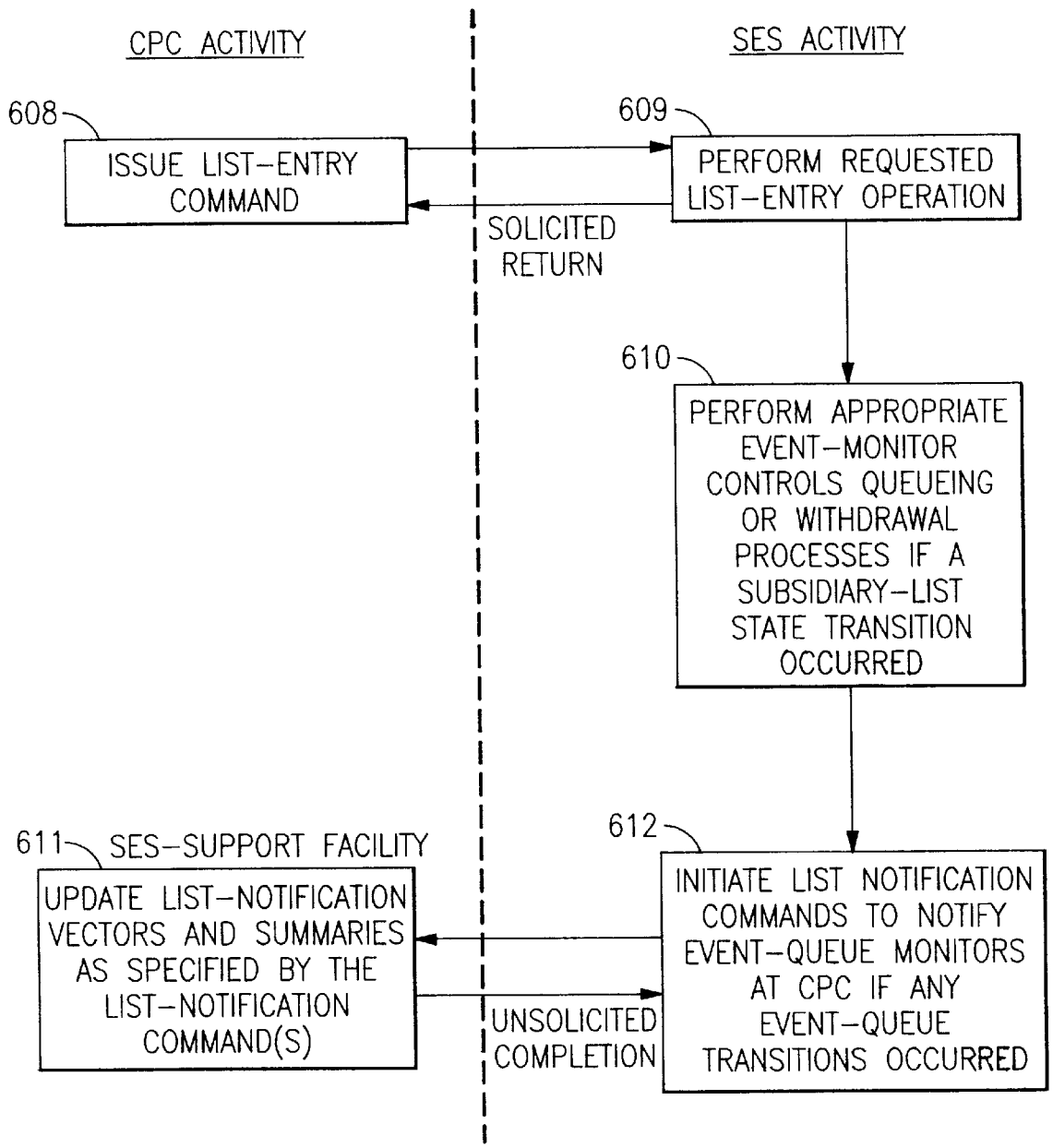
Figure 6C:
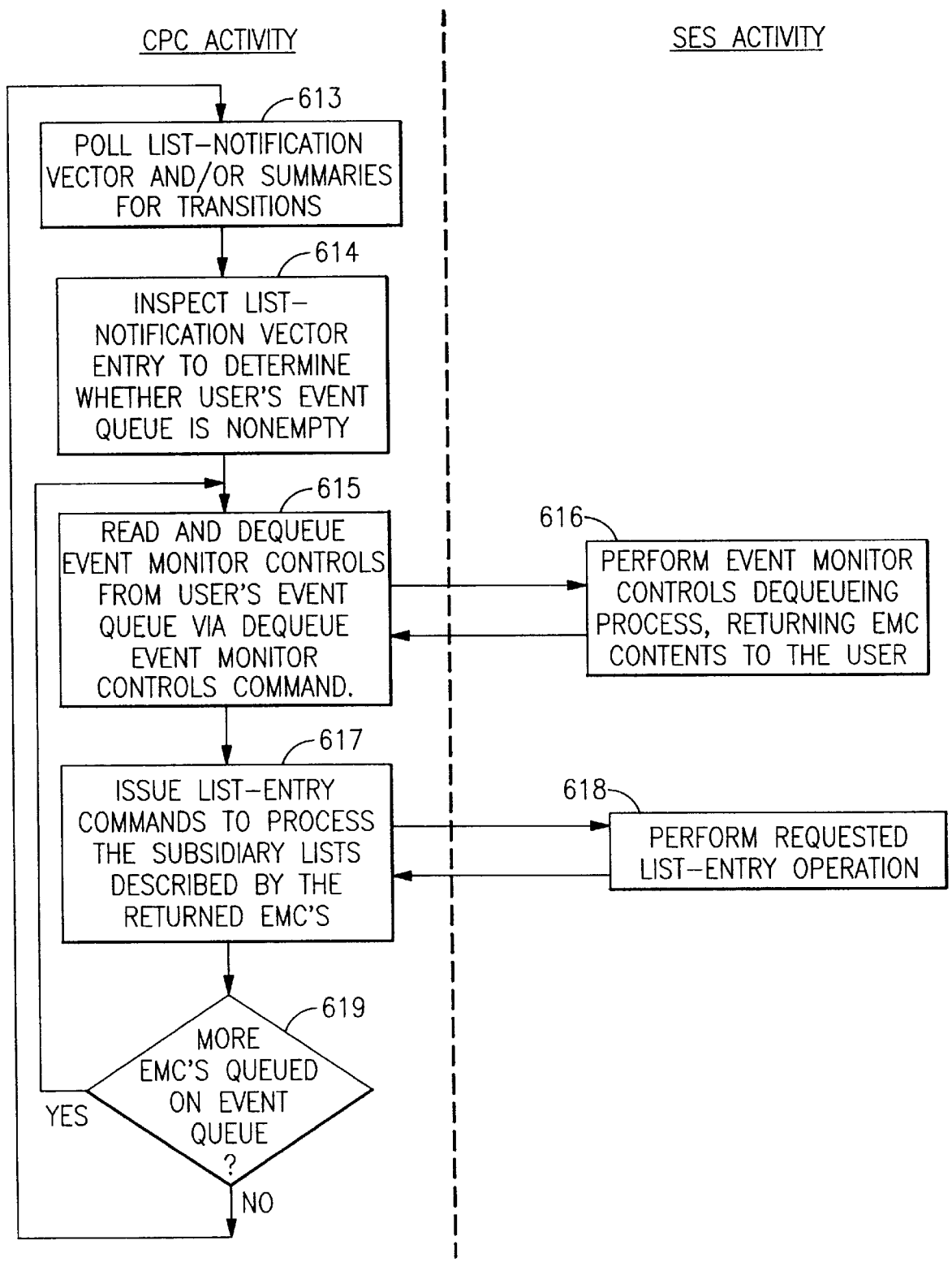
Figure 7:
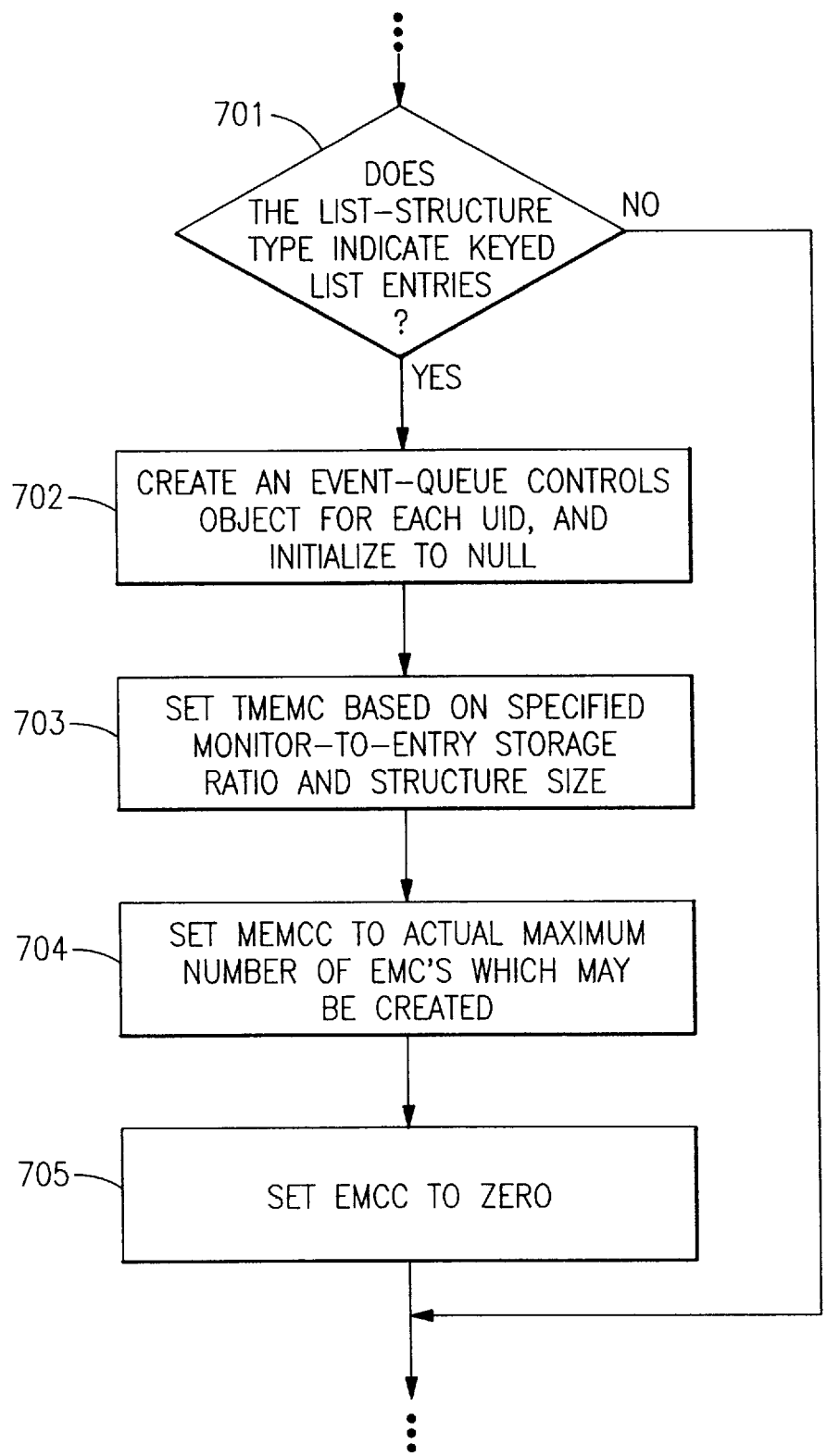
FIG. 7 is a flowchart illustrating the steps in the process of list structure creation which pertain to subsidiary list event monitoring and event queue monitoring.
Figure 8:
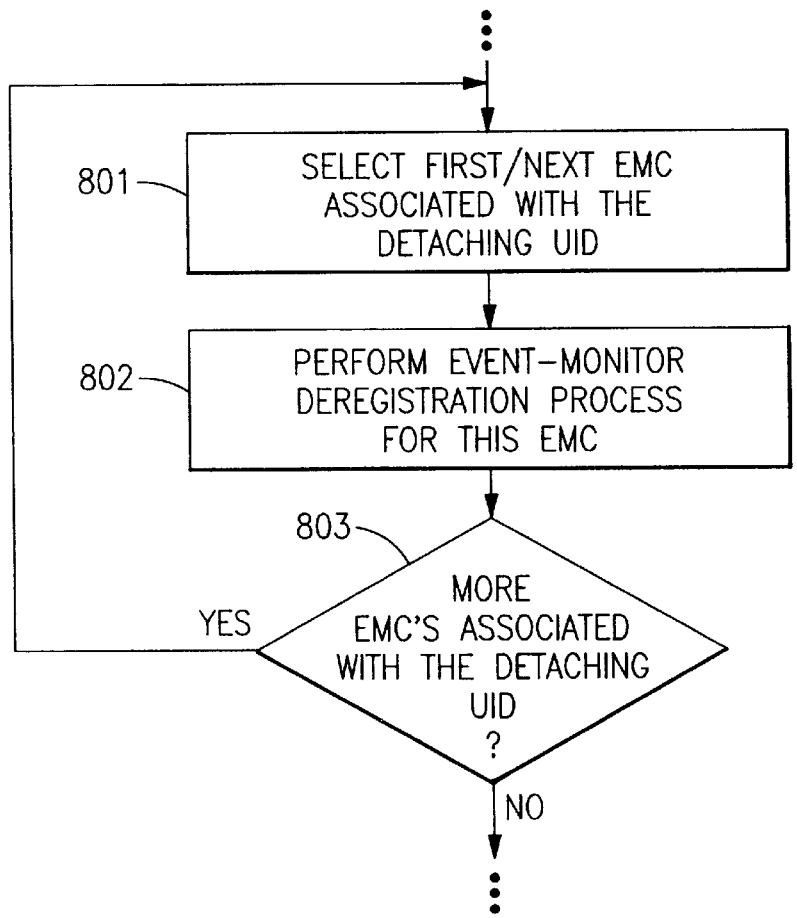
FIG. 8 is a flowchart illustrating the steps in the process of user detachment from a list structure which pertain to a structure supporting subsidiary list event monitoring and event queue monitoring.
Figure 10:
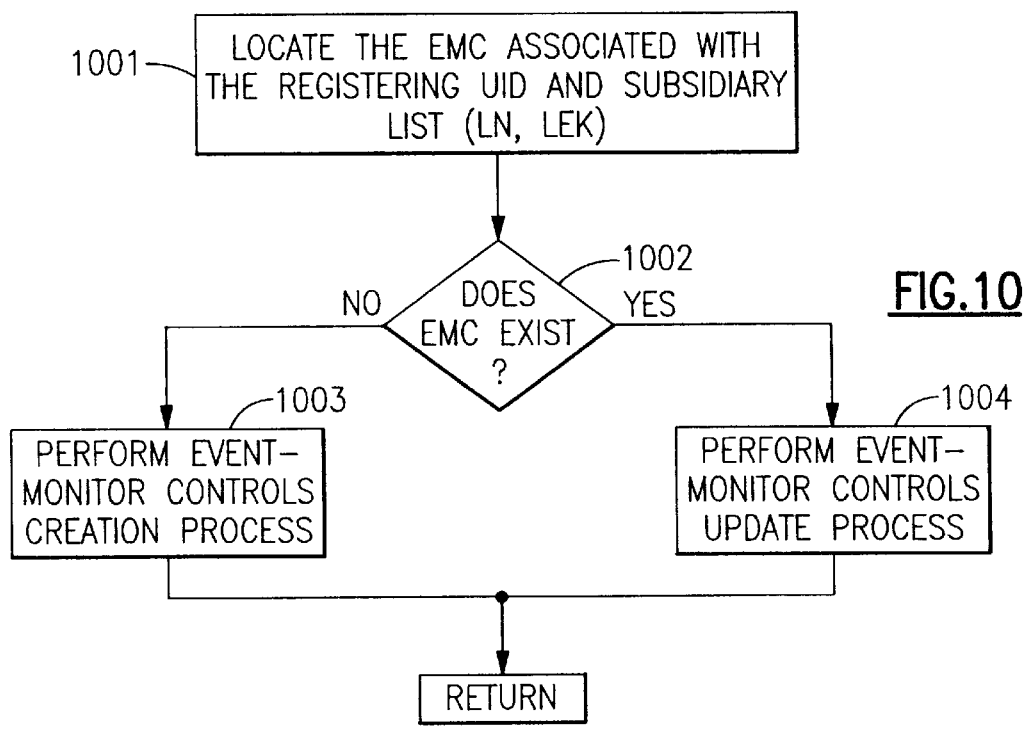
FIG. 10 is a flowchart illustrating the steps in the process of subsidiary list event monitor registration.
Figure 9:
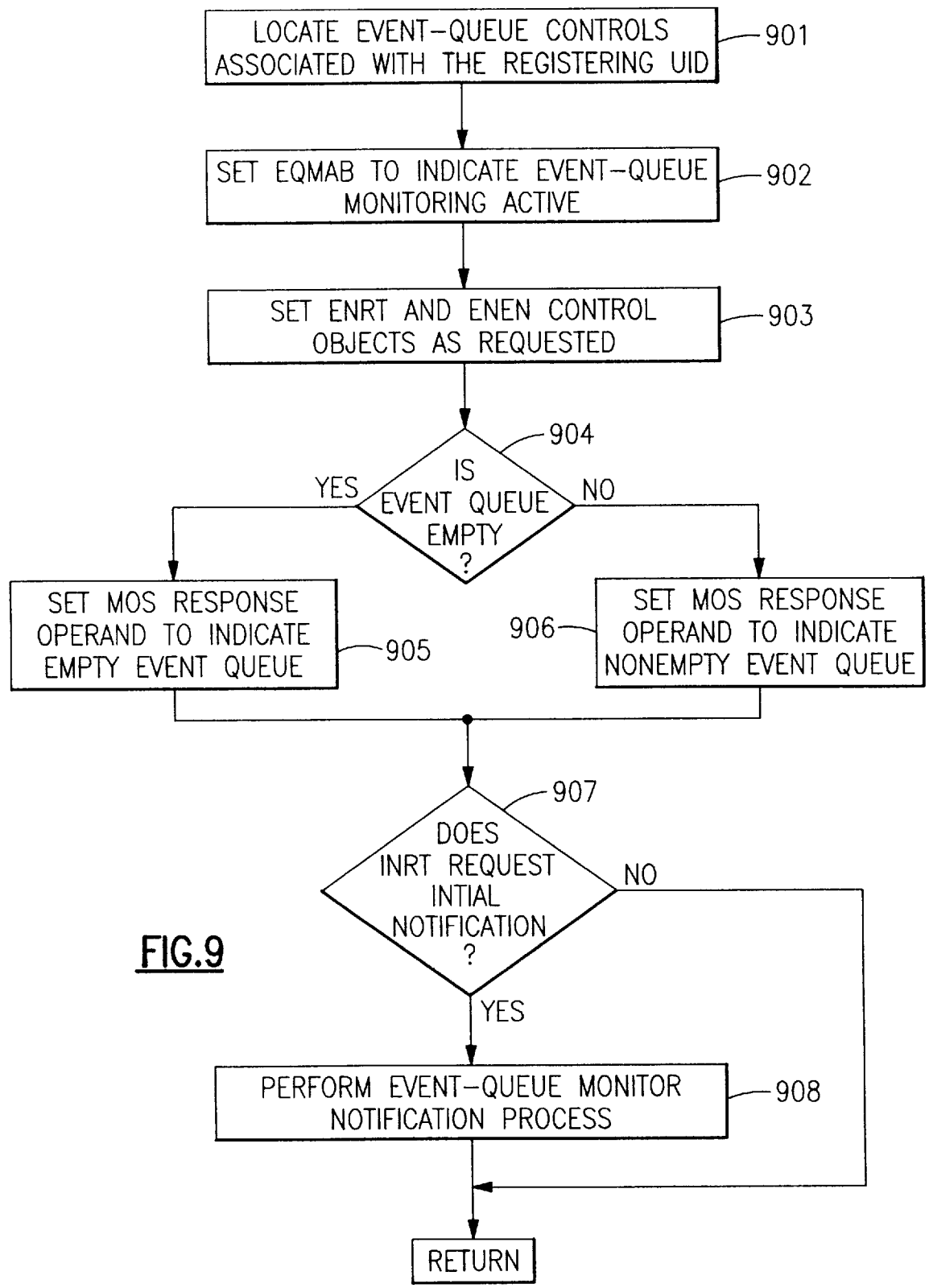
FIG. 9 is a flowchart illustrating the steps in the process of event queue monitor registration.
Figure 11:
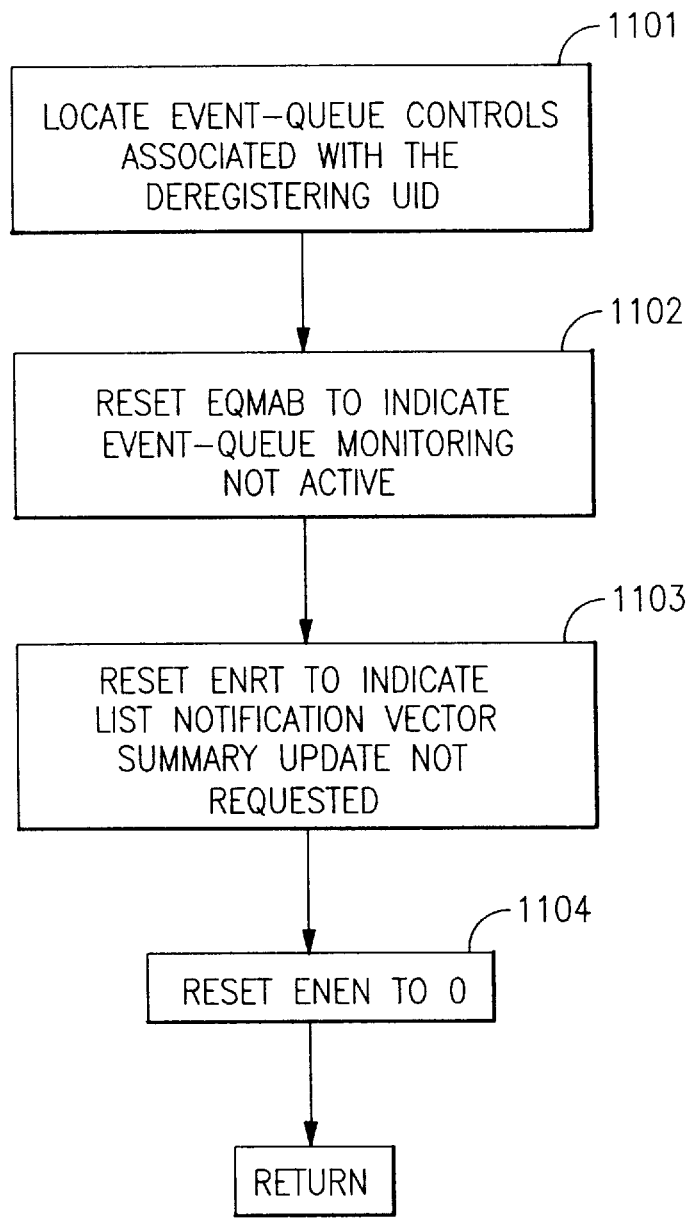
FIG. 11 is a flowchart illustrating the steps in the process of event queue monitor deregistration.
Figure 12:
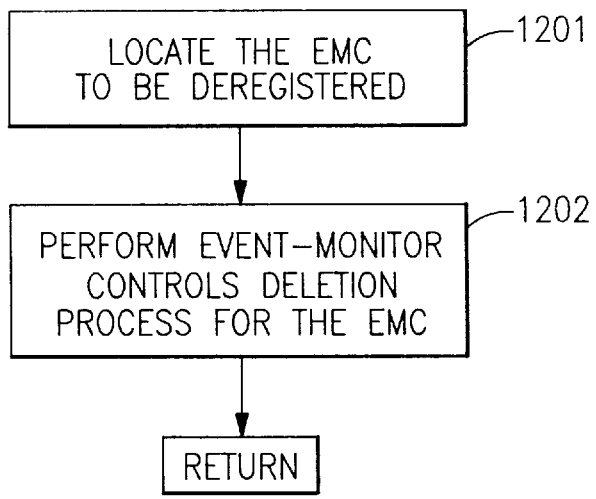
FIG. 12 is a flowchart illustrating the steps in the process of subsidiary list event monitor deregistration.
Figure 18A:
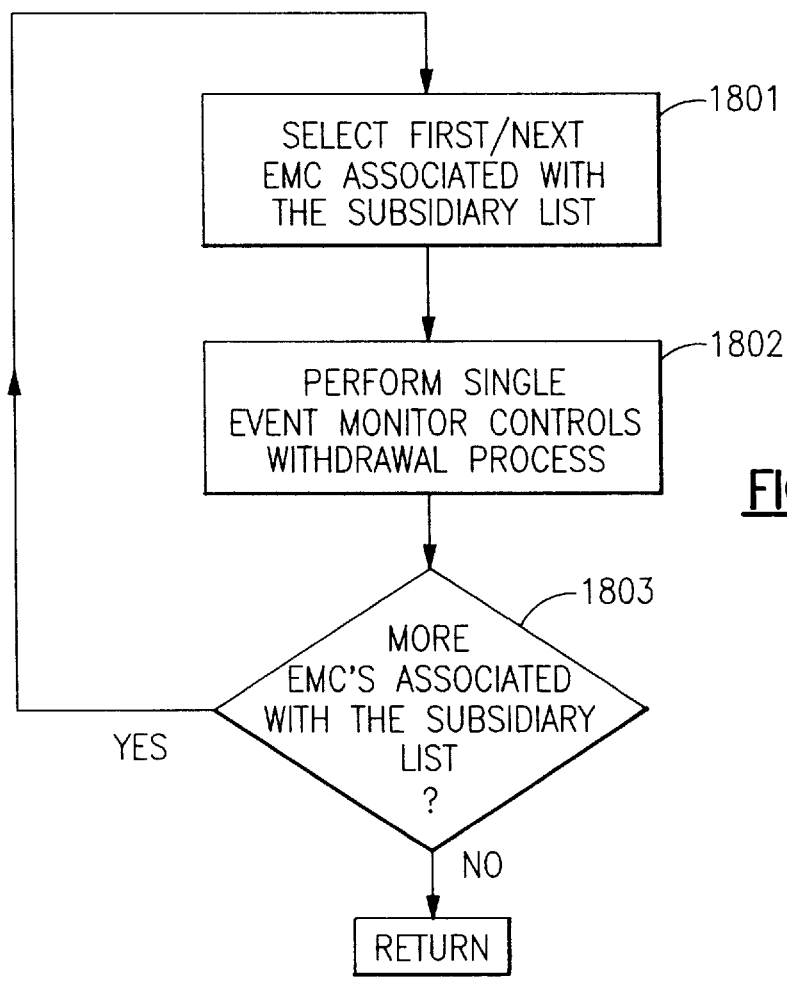
FIGS. 18A and 18B are flowcharts illustrating the steps in the process of event-monitor-controls withdrawal.
Figure 13:
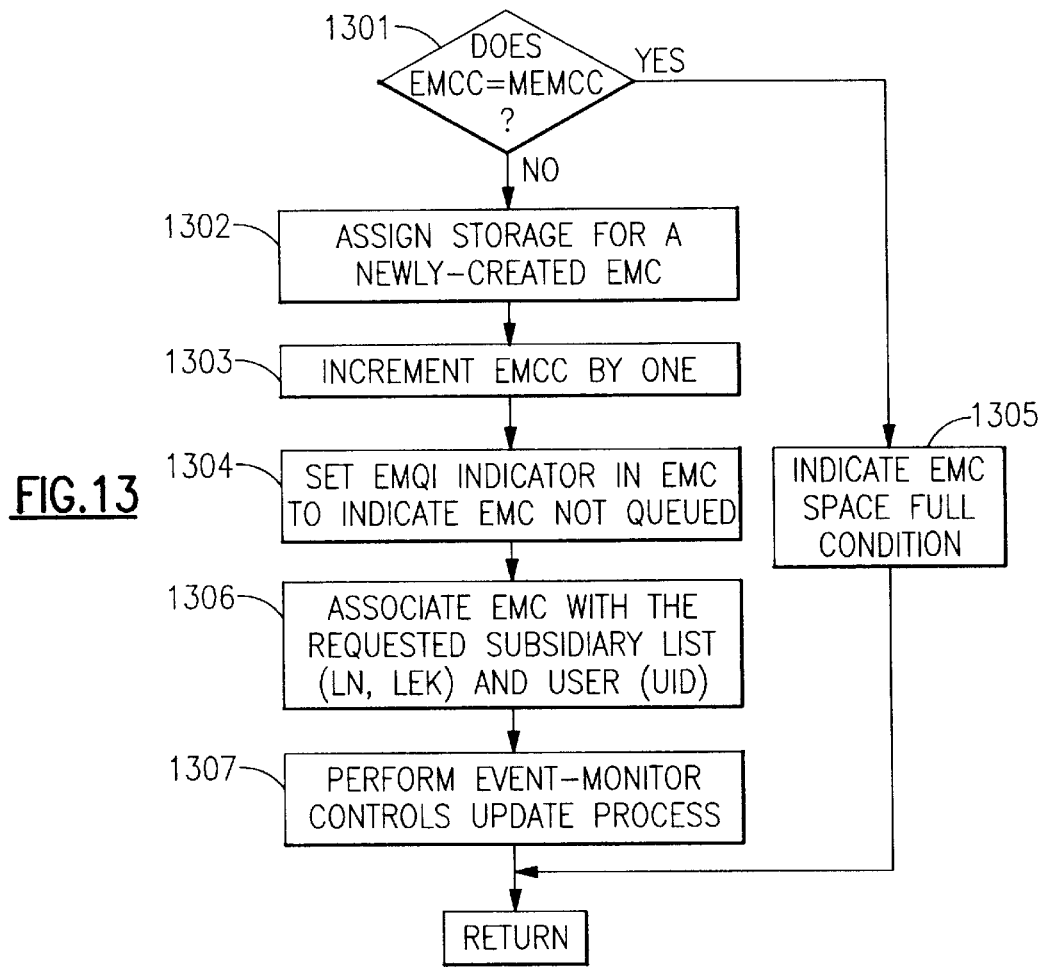
FIG. 13 is a flowchart illustrating the steps in the process of event-monitor-controls creation.
Figure 15A:
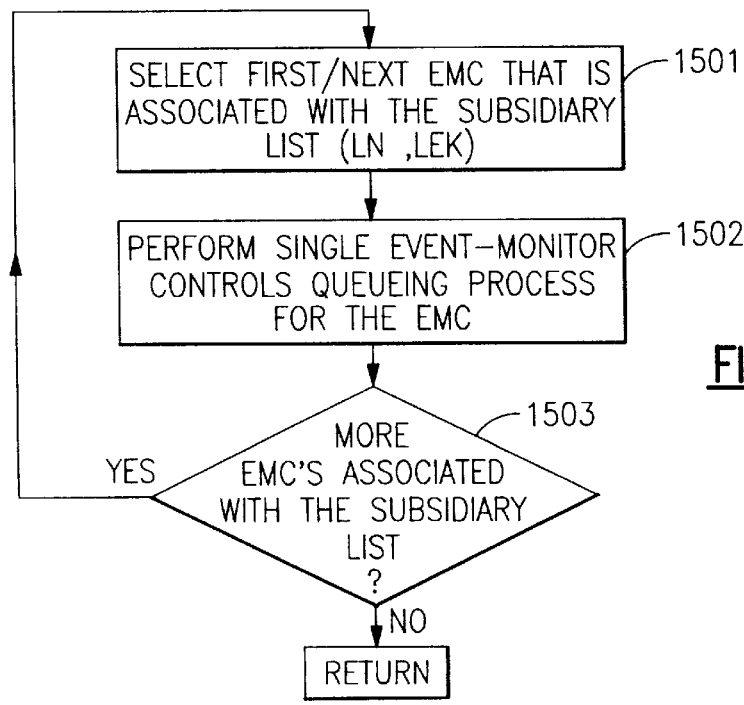
FIGS. 15A and 15B are flowcharts illustrating the steps in the process of event-monitor-controls queueing.
Figure 14:
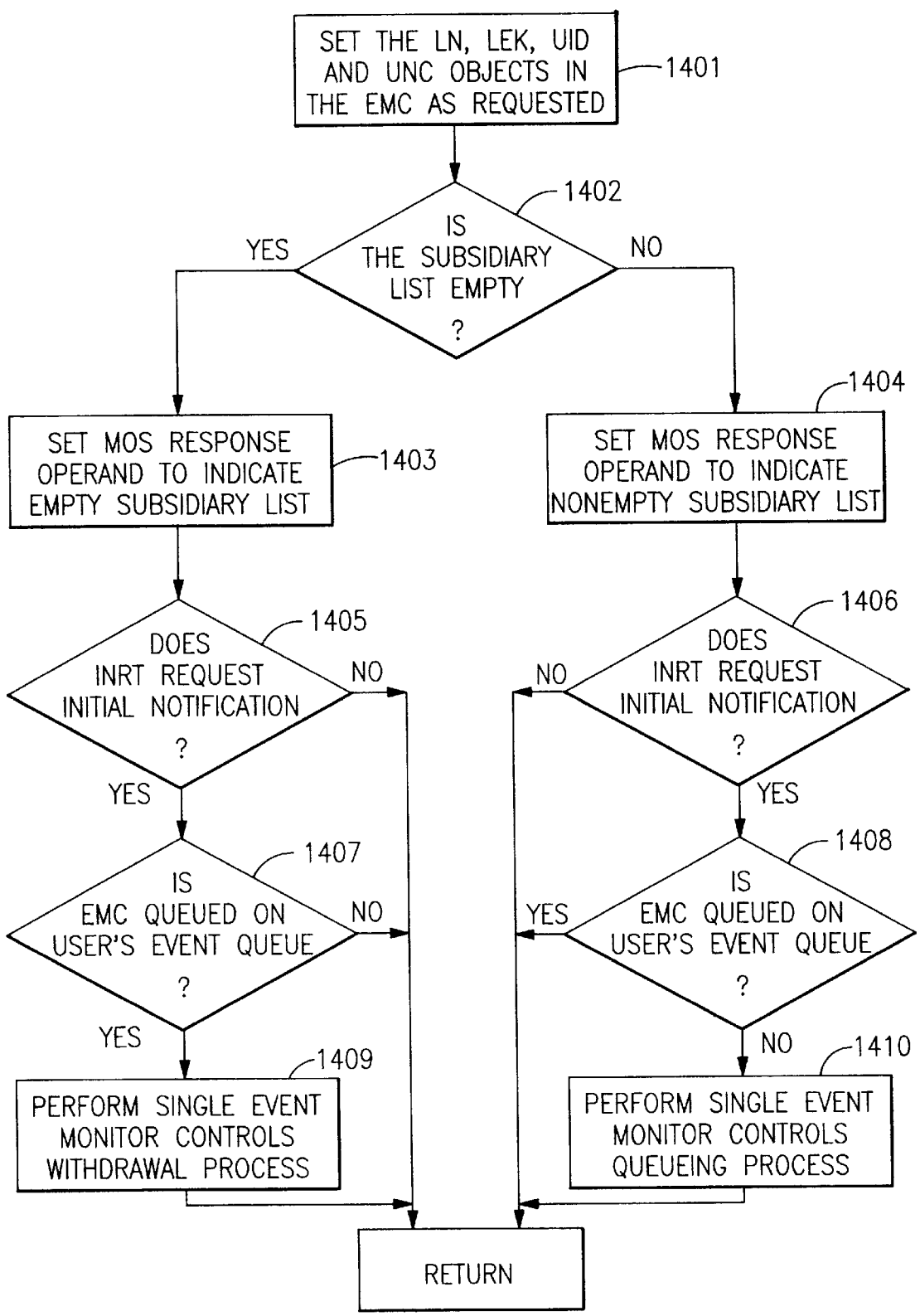
FIG. 14 is a flowchart illustrating the steps in the process of event-monitor-controls update.
Figure 15B:
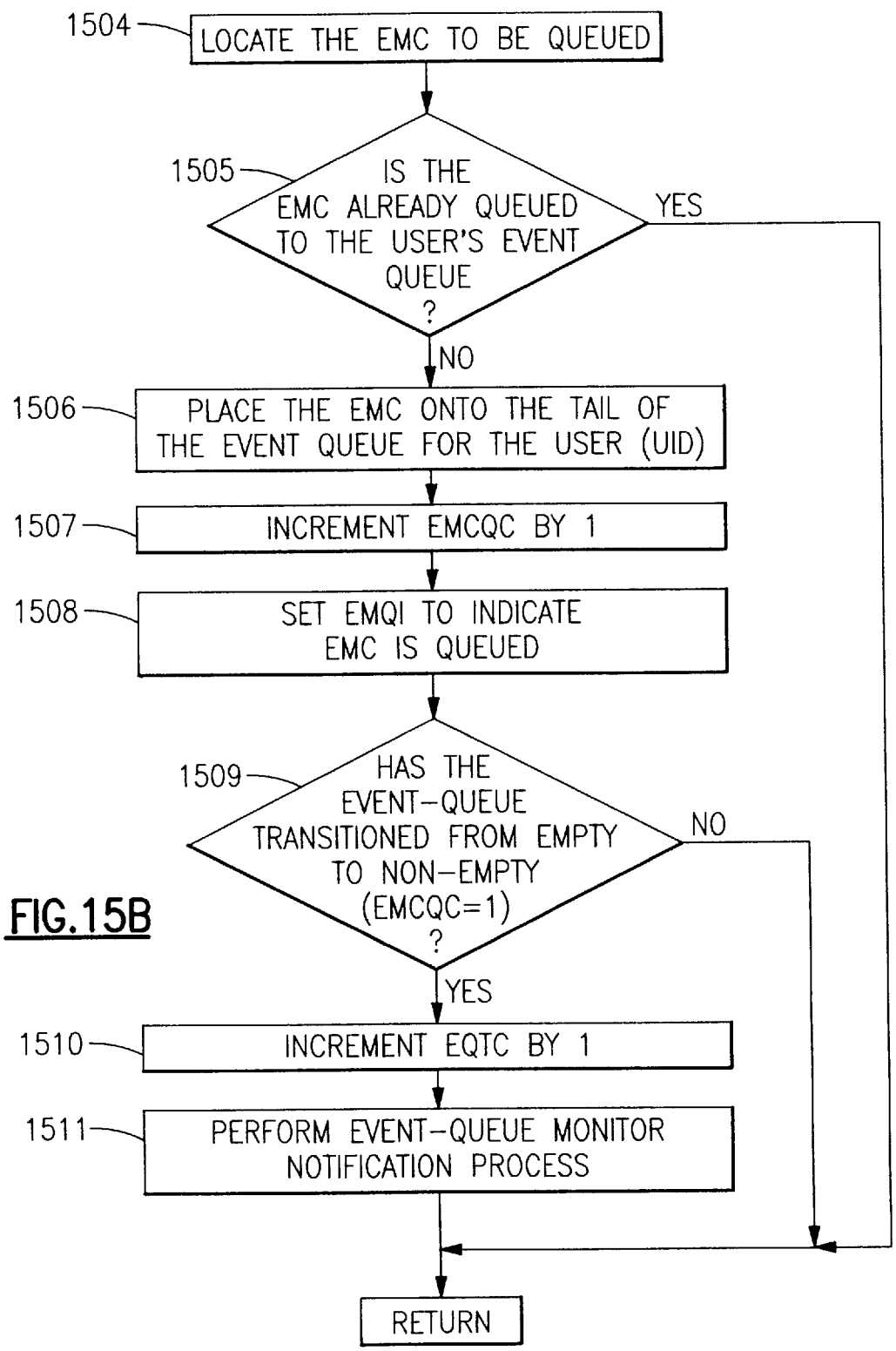
Figure 16:
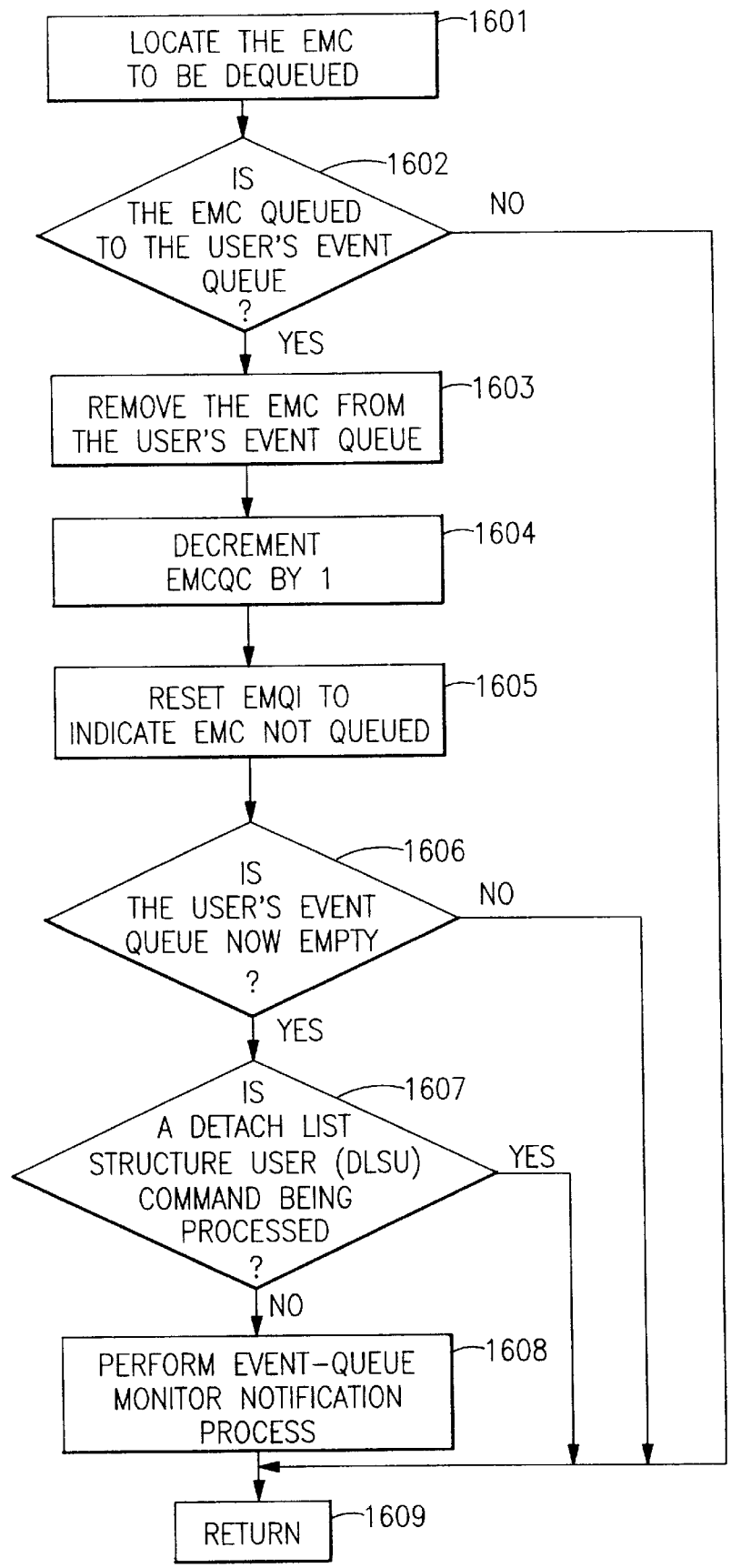
FIG. 16 is a flowchart illustrating the steps in the process of event-monitor-controls dequeueing, in which a particular event-monitor-controls object is dequeued from its user's event queue.
Figure 17:
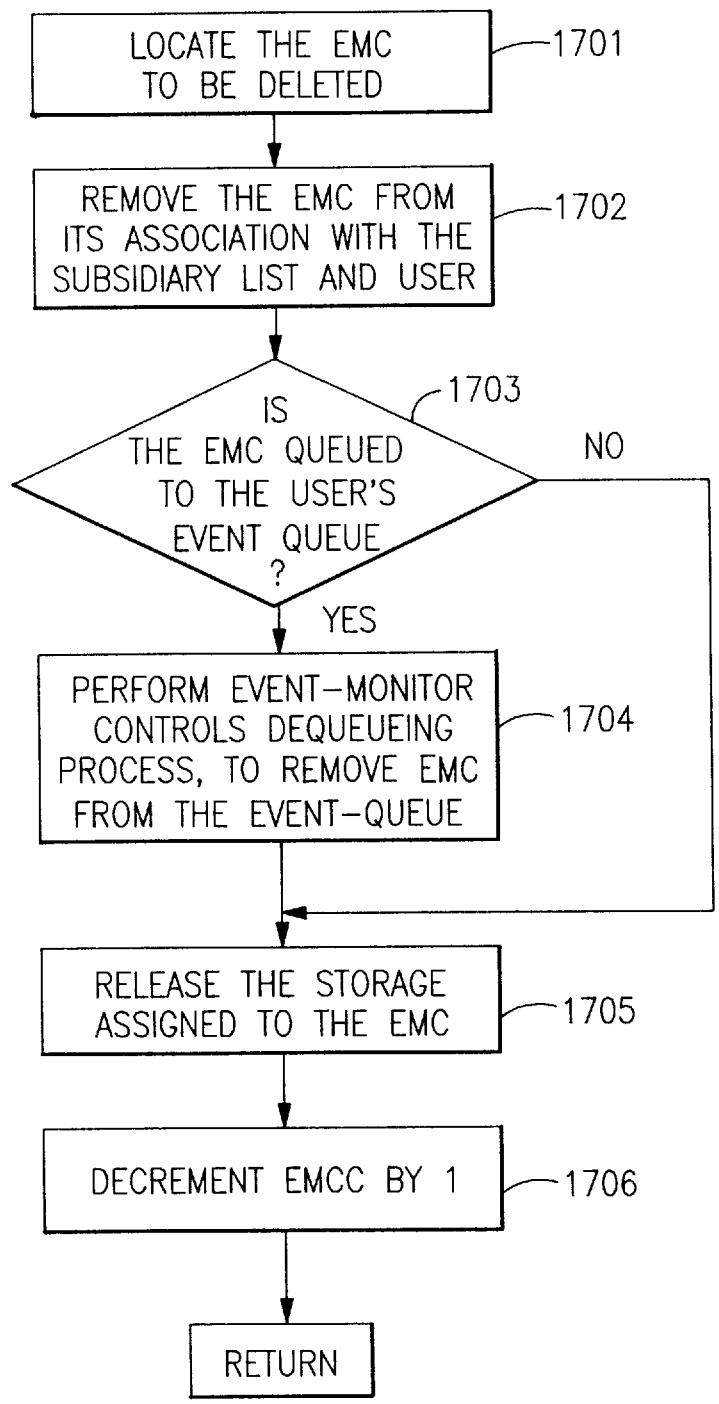
FIG. 17 is a flowchart illustrating the steps in the process of event-monitor-controls deletion.
Figure 18B:
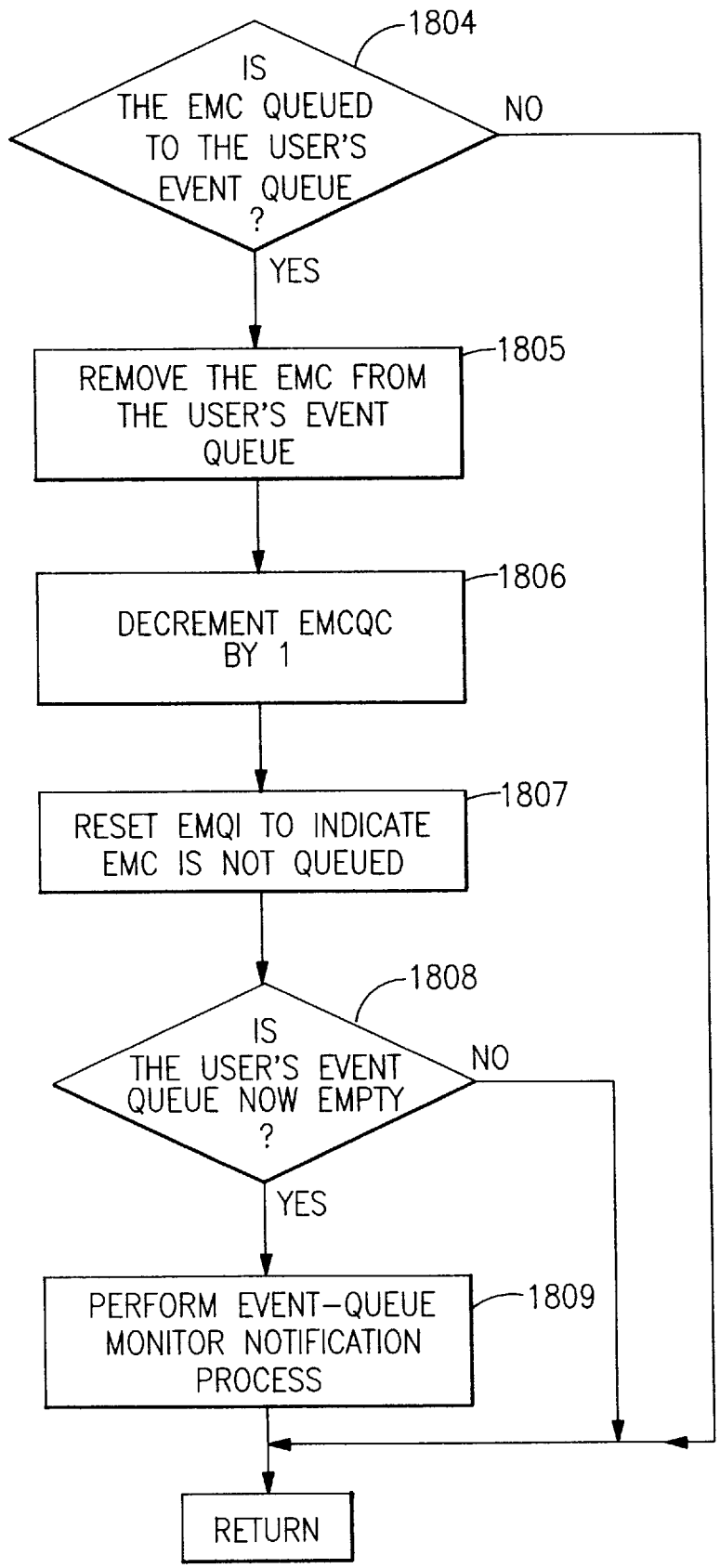
Figure 19:
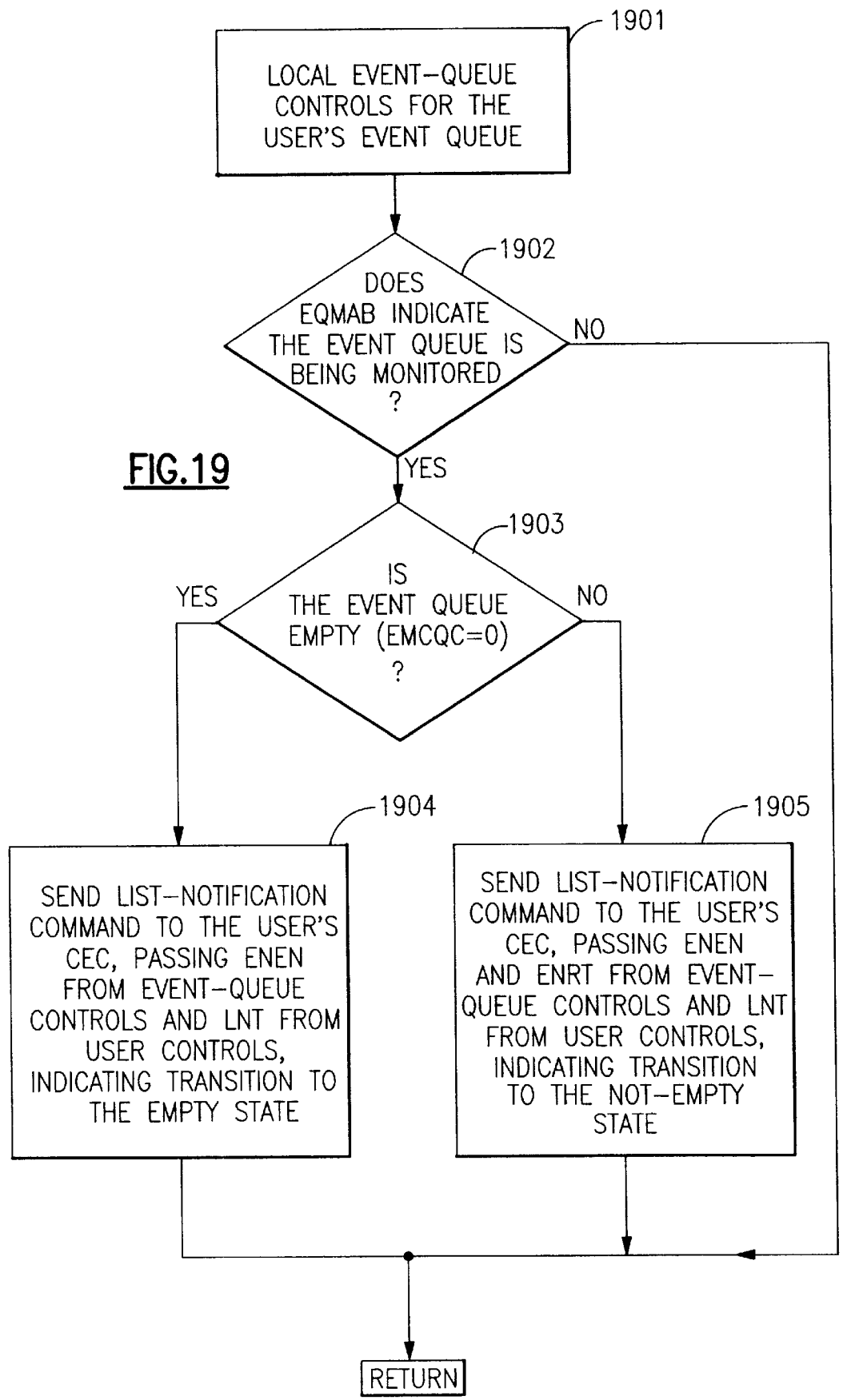
FIG. 19 is a flowchart illustrating the steps in the process of event queue monitor notification.
Figure 20:
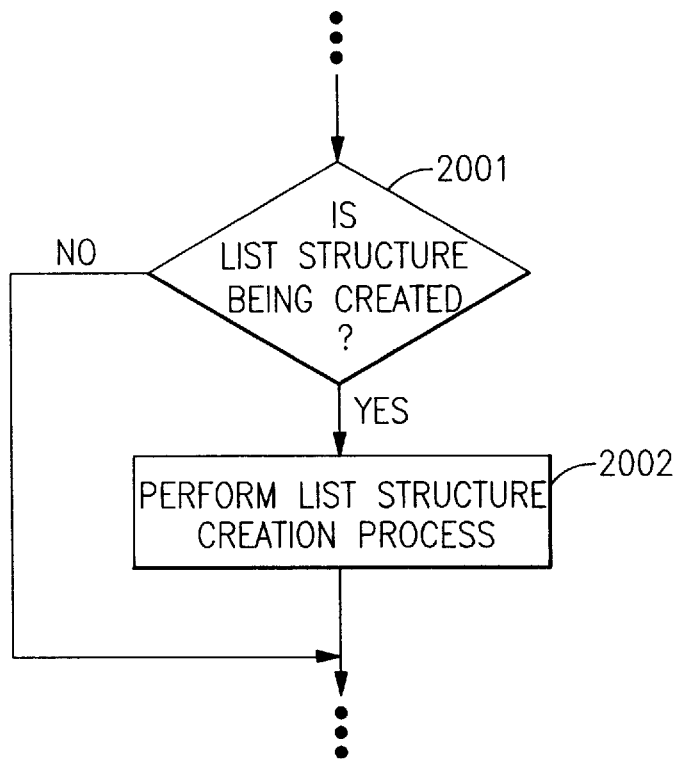
FIG. 20 is a flowchart illustrating the steps in the allocate-list-structure (ALST) command pertaining to subsidiary list event monitoring and event queue monitoring.
Figure 28B:
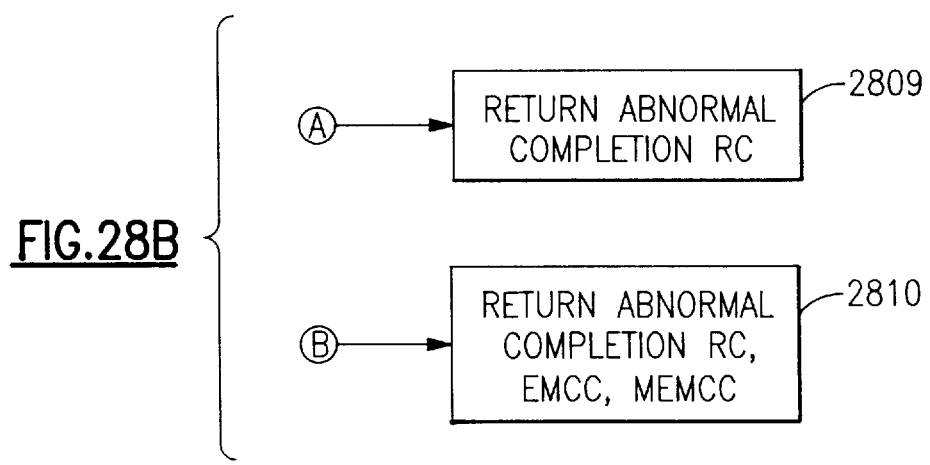
FIGS. 28A, 28B and 28C are flowcharts illustrating the steps in the register-list-monitor (RLM) command.
Figure 21:
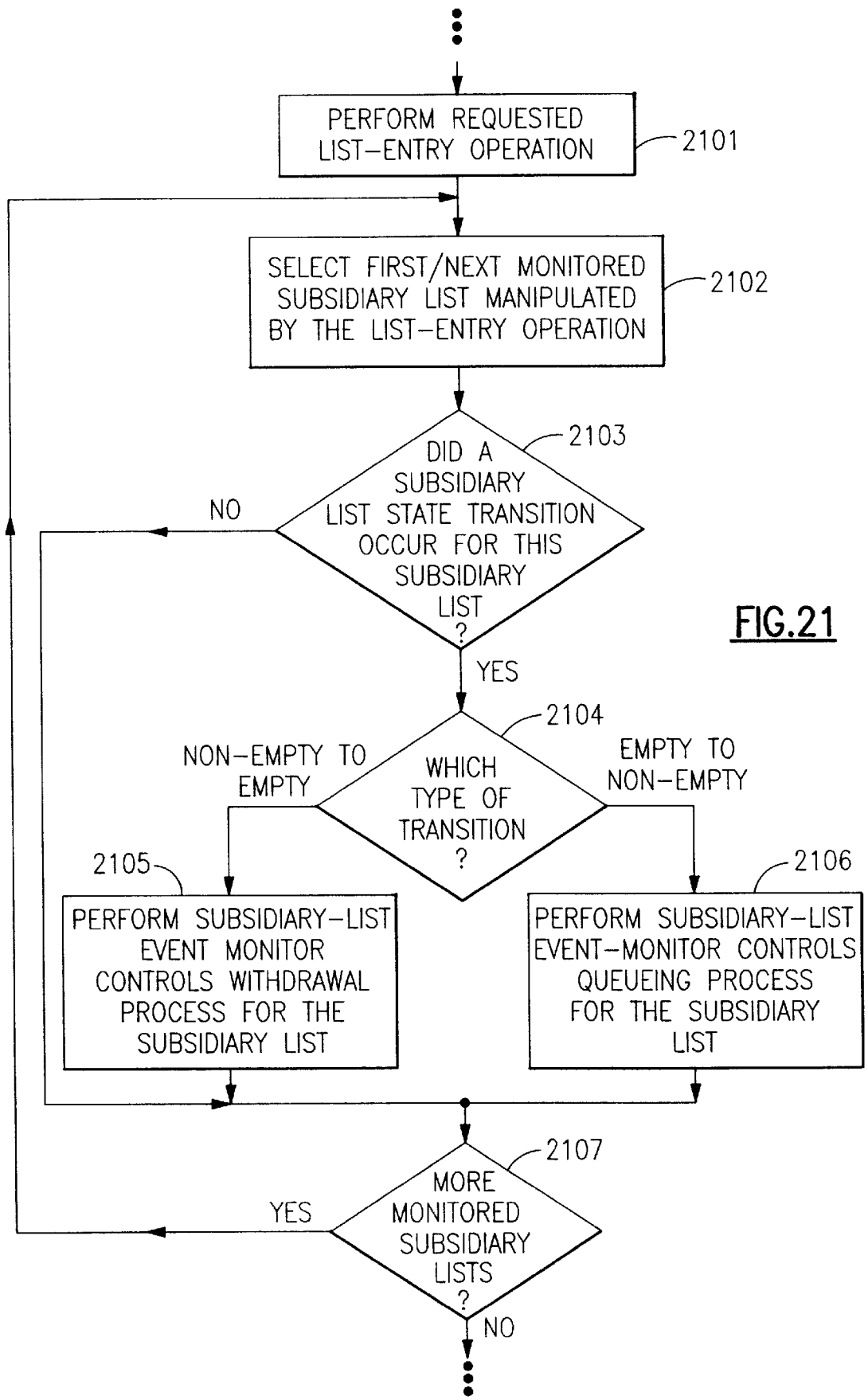
FIG. 21 is a flowchart illustrating the steps in the processing of all entry related list structure commands that pertain to detecting and reacting to subsidiary list state transitions that occurred as a result of the command.
Figure 22A:
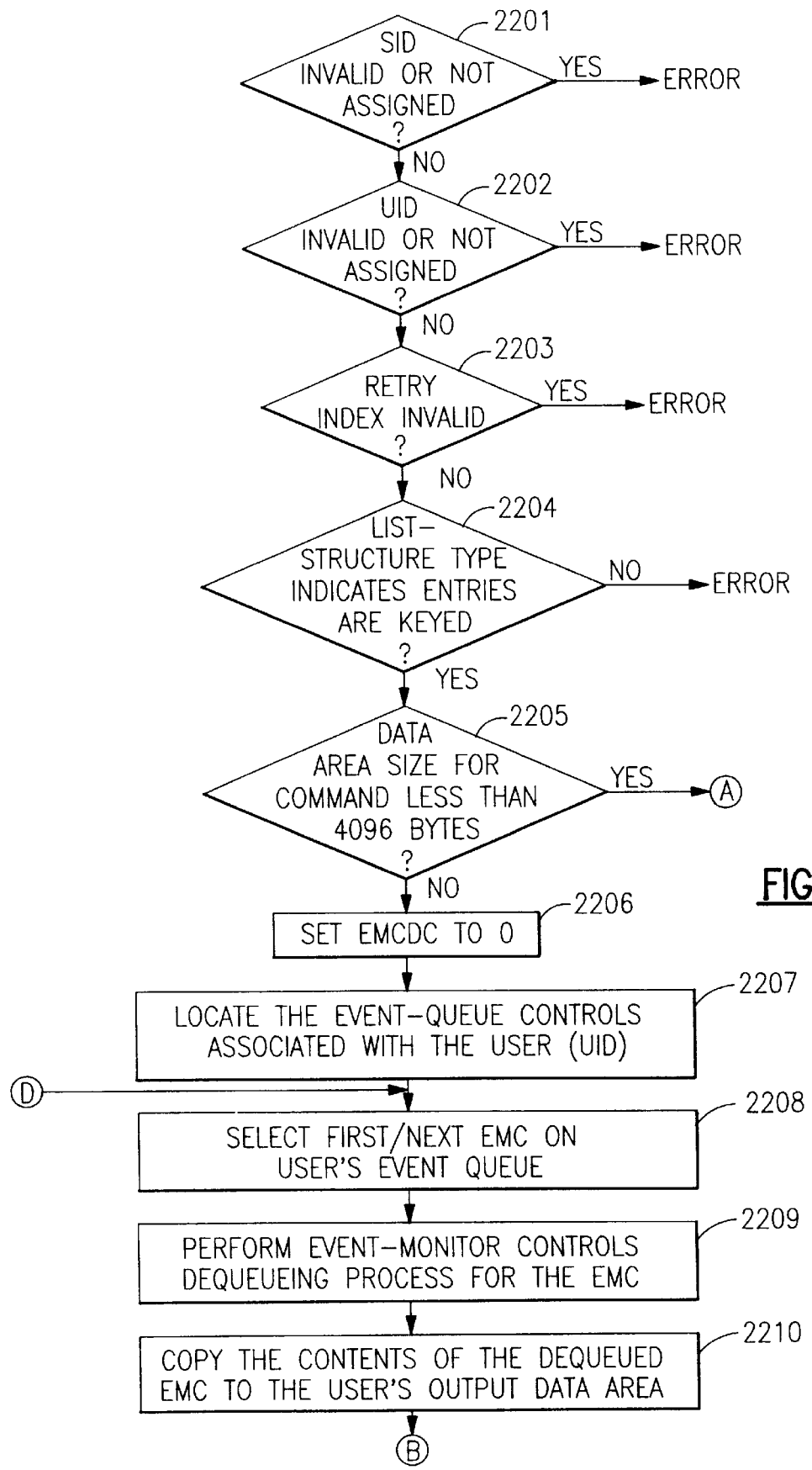
FIGS. 22A and 22B are flowcharts illustrating the steps in the dequeue-event-monitor-controls (DEMC) command.
Figure 22B:
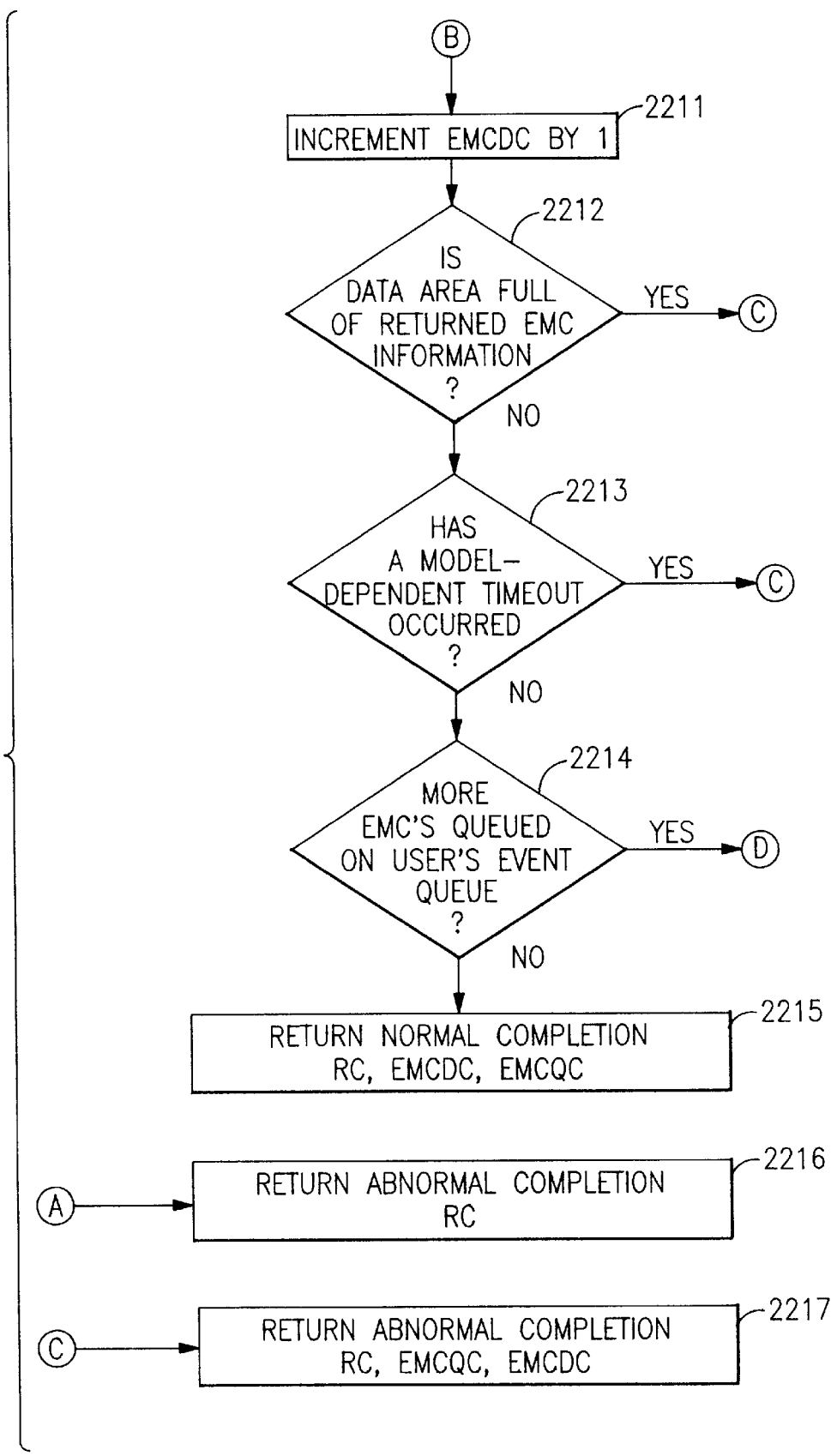
Figure 23A:
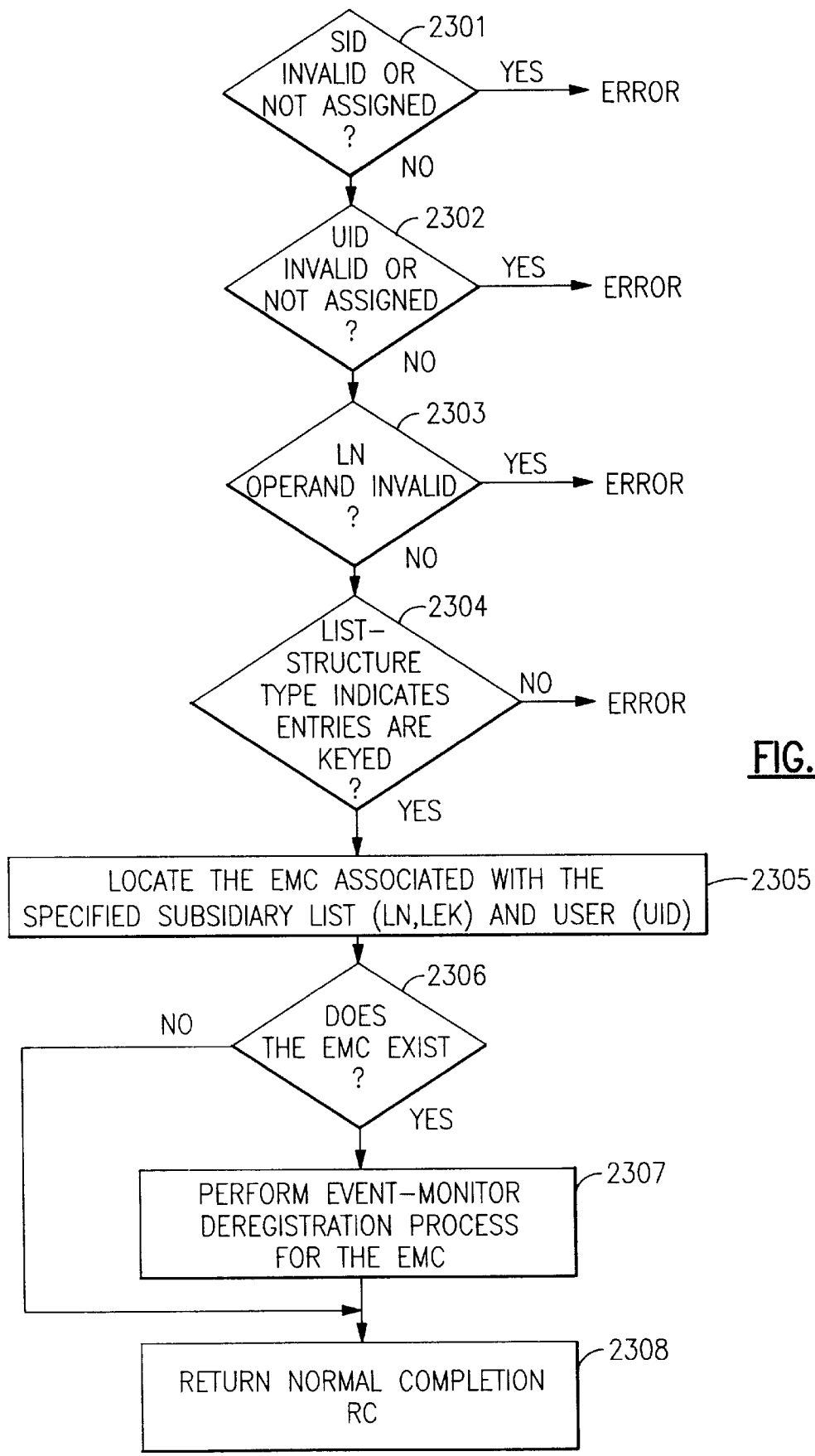
FIGS. 23A and 23B are flowcharts illustrating the steps in the deregister-list-monitor (DLM) command.
Figure 23B:
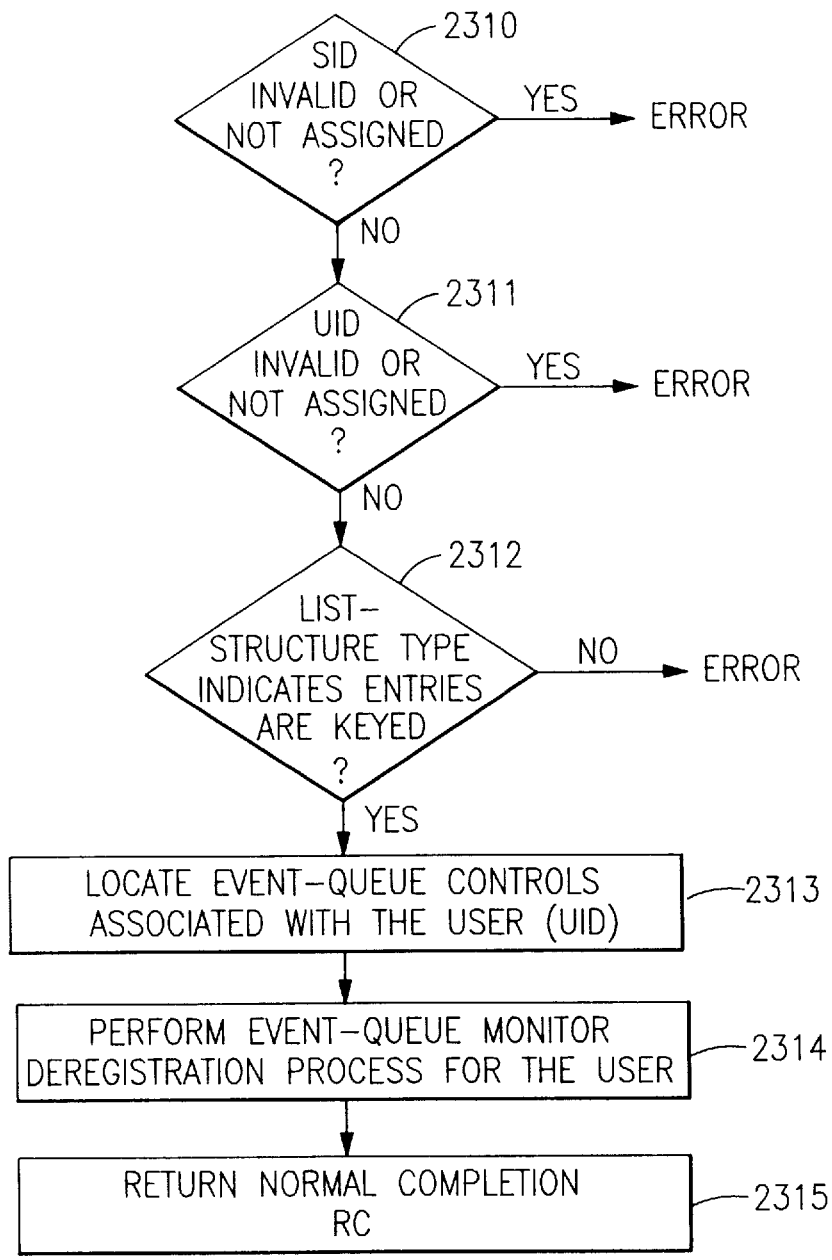
Figure 24:
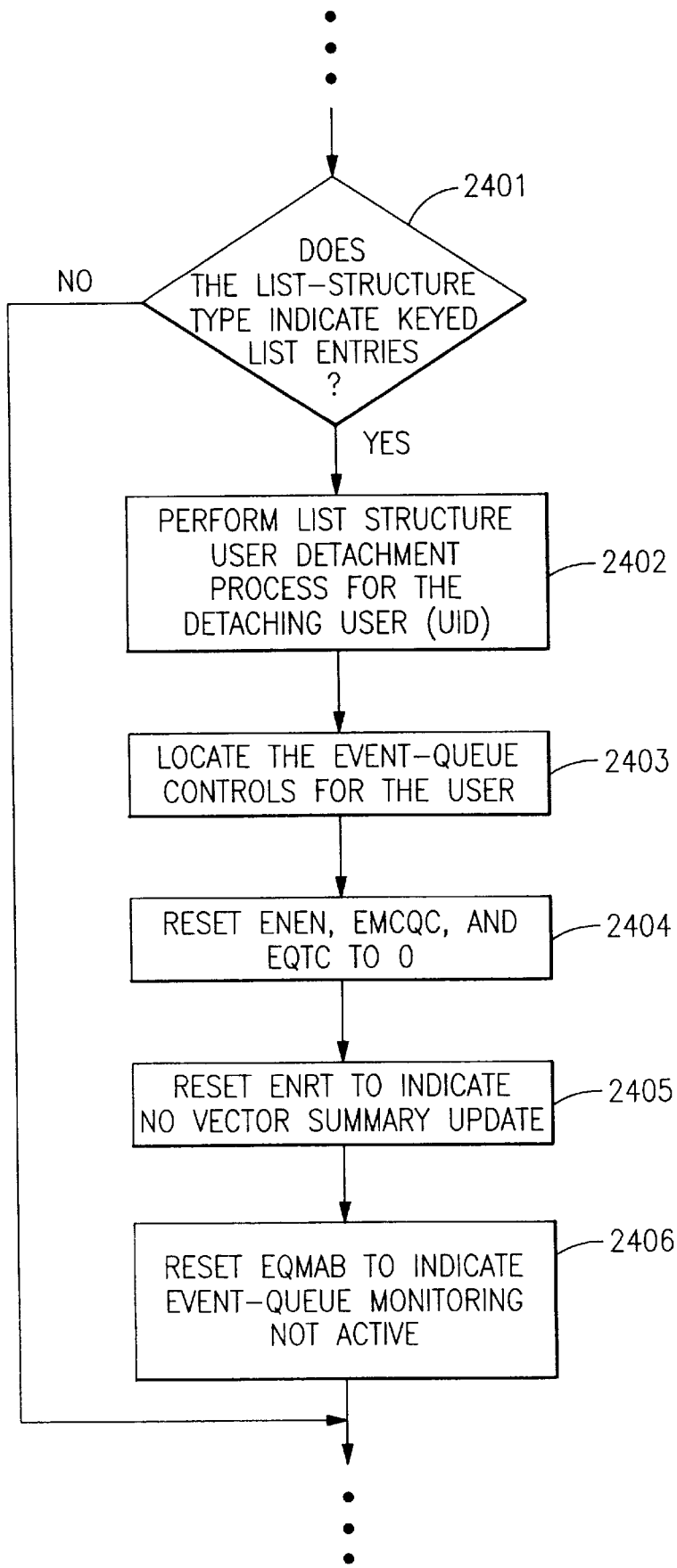
FIG. 24 is a flowchart illustrating the steps in the detach-list-structure-user (DLSU) command pertaining to subsidiary list event monitoring and event queue monitoring.
Figure 25:
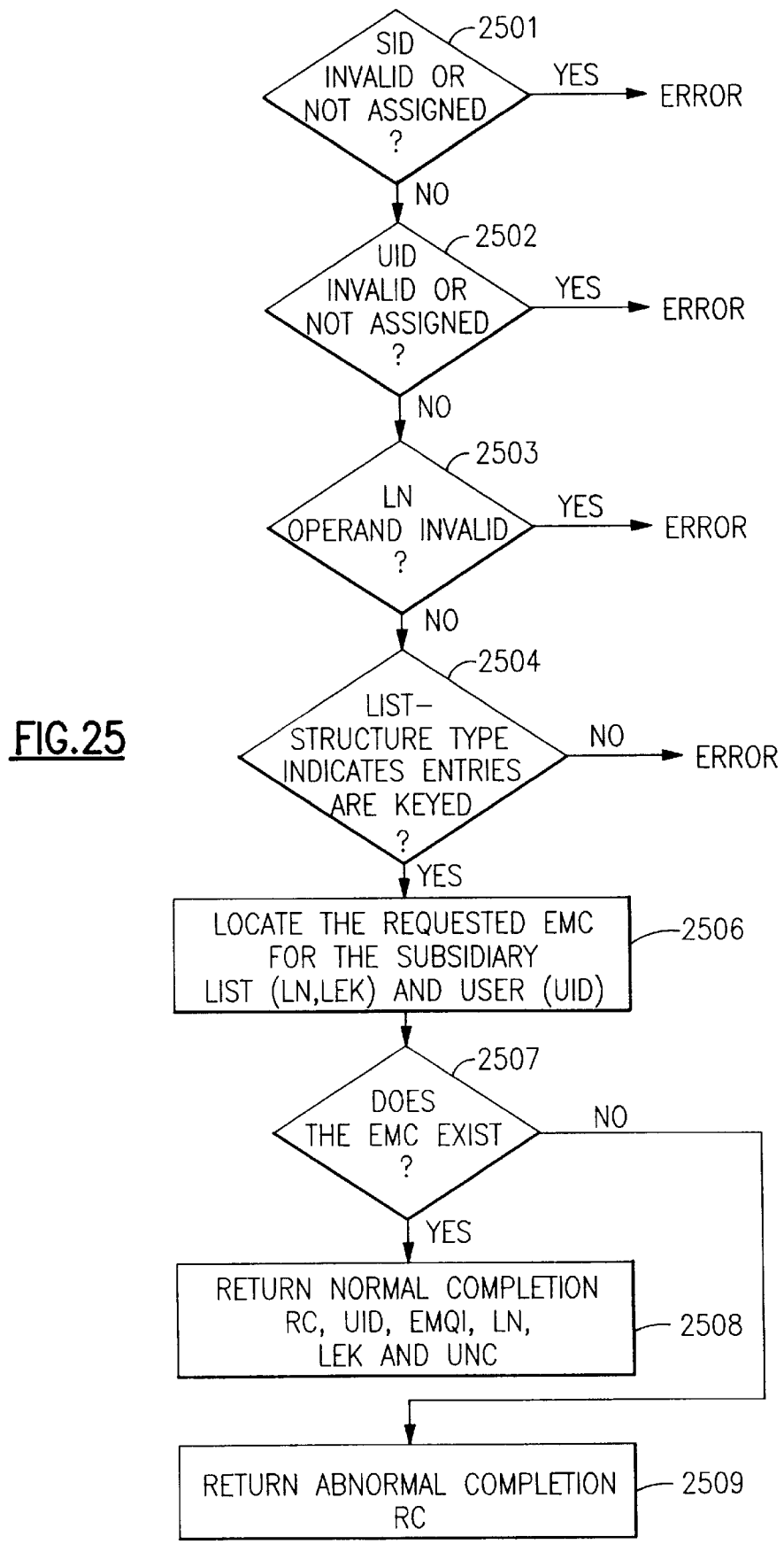
FIG. 25 is a flowchart illustrating the steps in the read-event-monitor-controls (REMC) command.
Figure 26:
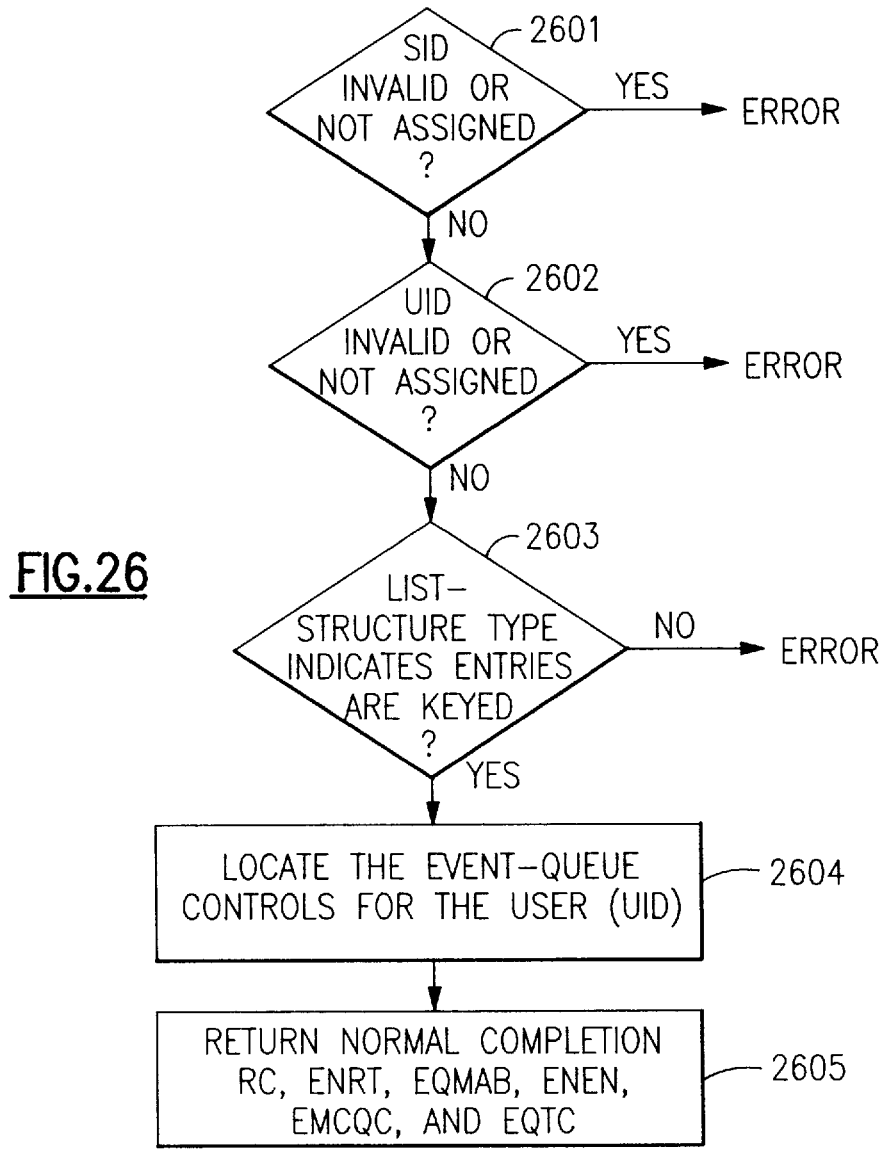
FIG. 26 is a flowchart illustrating the steps in the read-event-queue-controls (REQC) command.
Figure 27A:
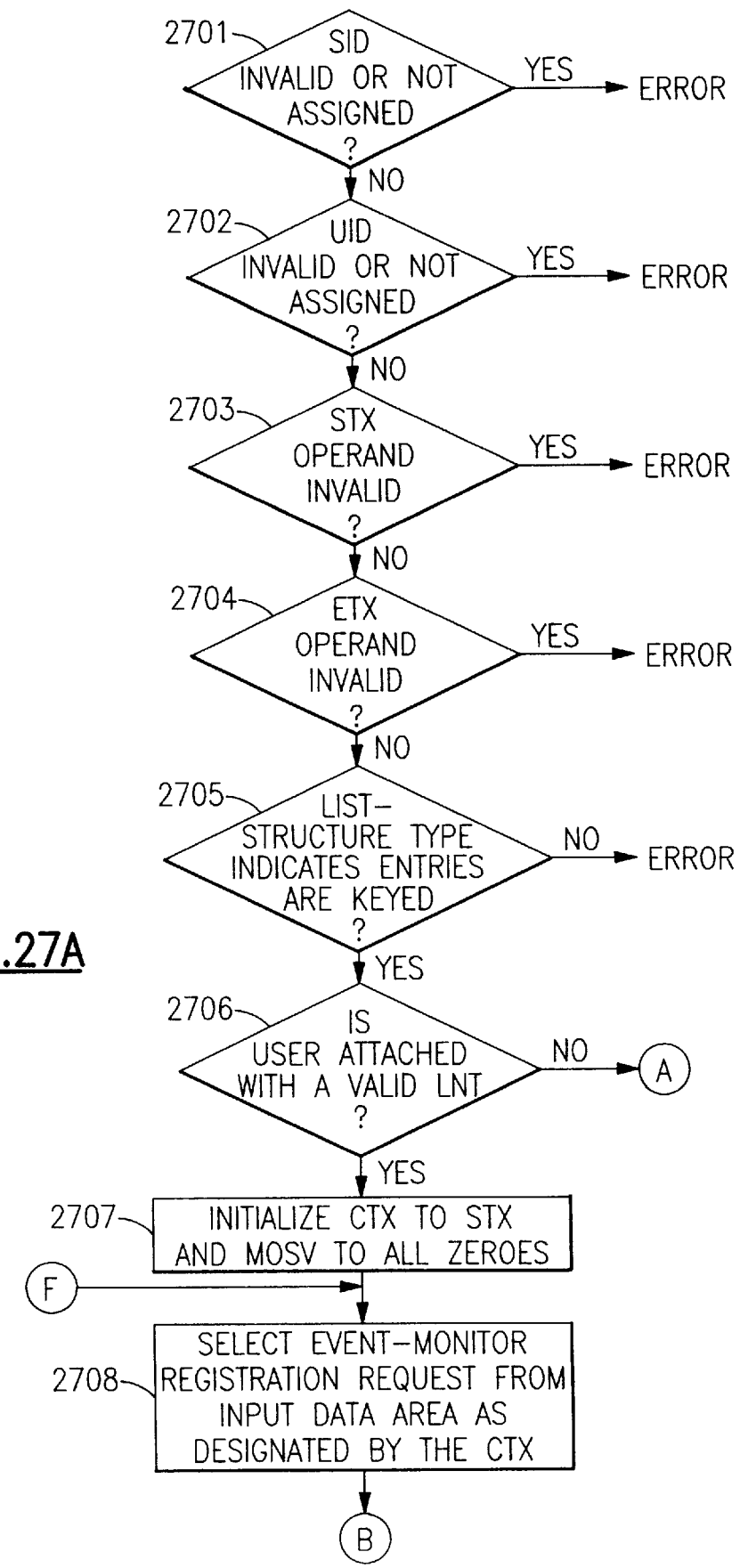
FIGS. 27A, 27B and 27C are flowcharts illustrating the steps in the register-event-monitors (REMS) command.
Figure 27B:
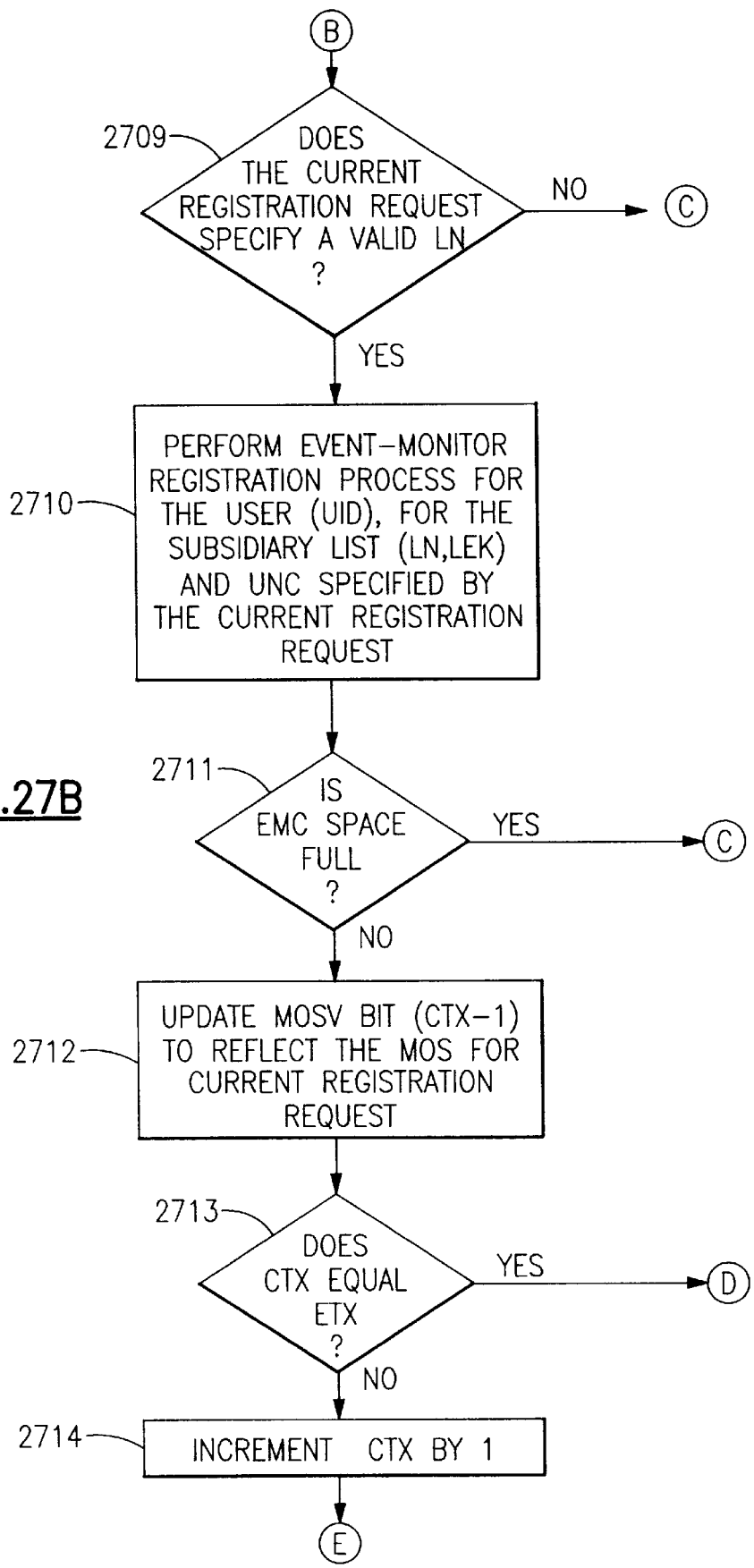
Figure 27C:
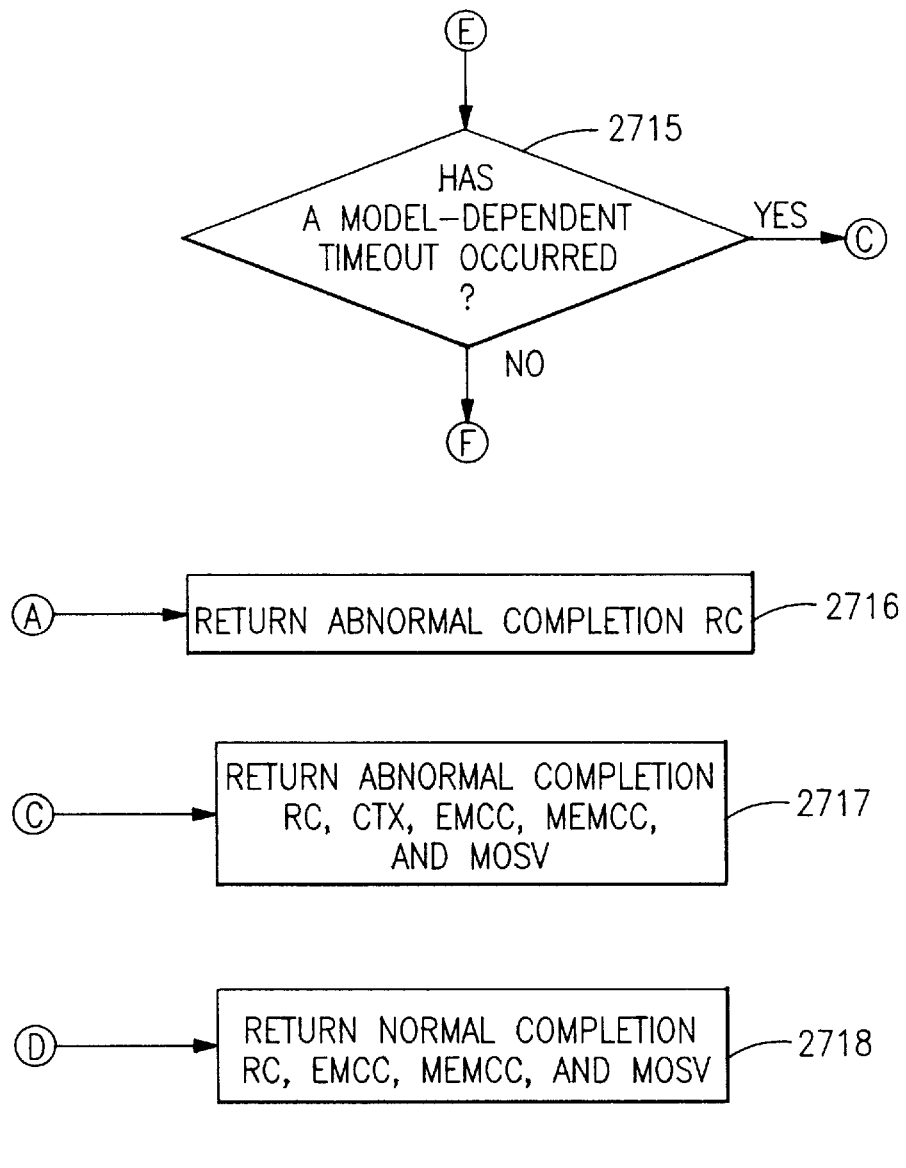
Figure 28A:
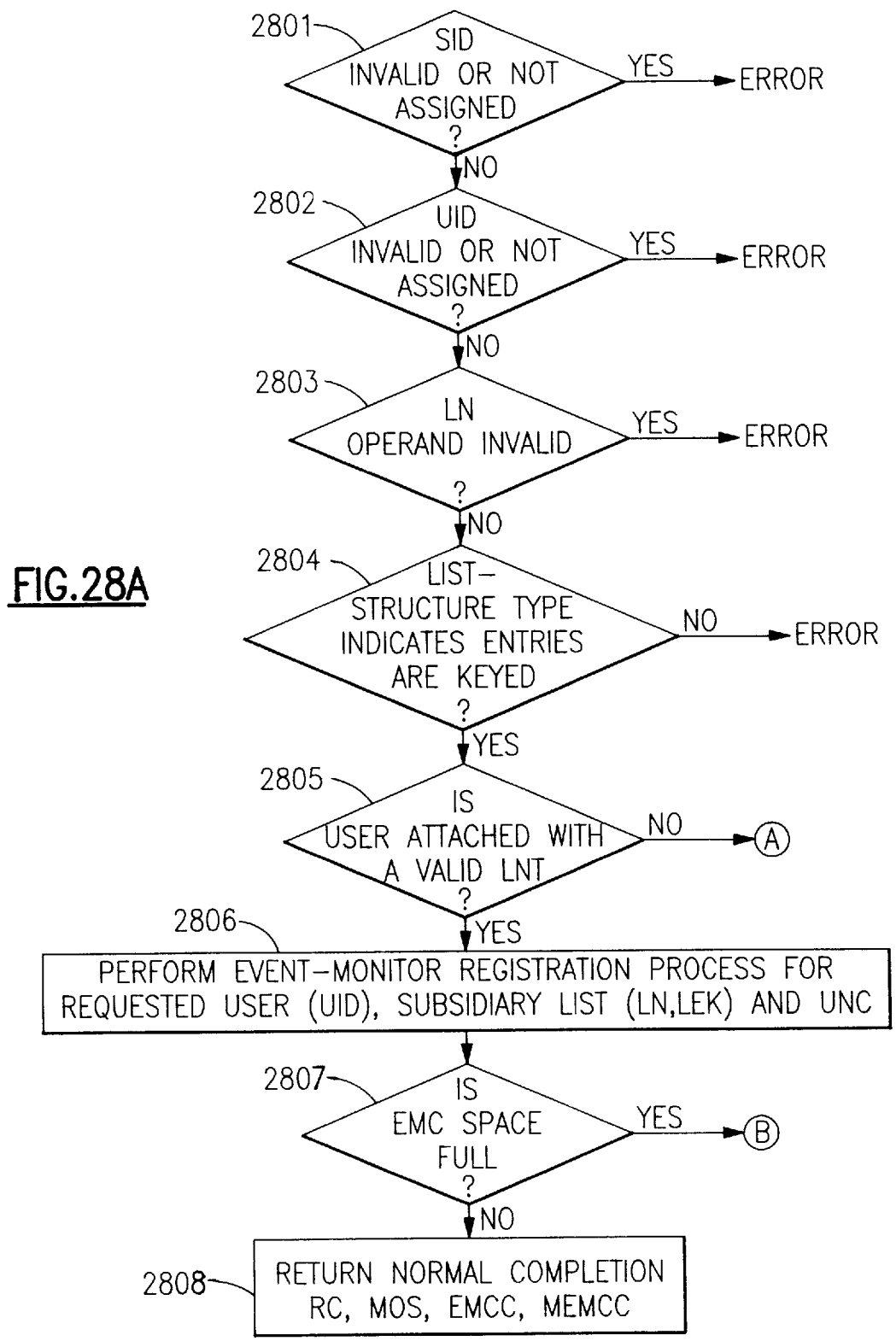
Figure 28C:
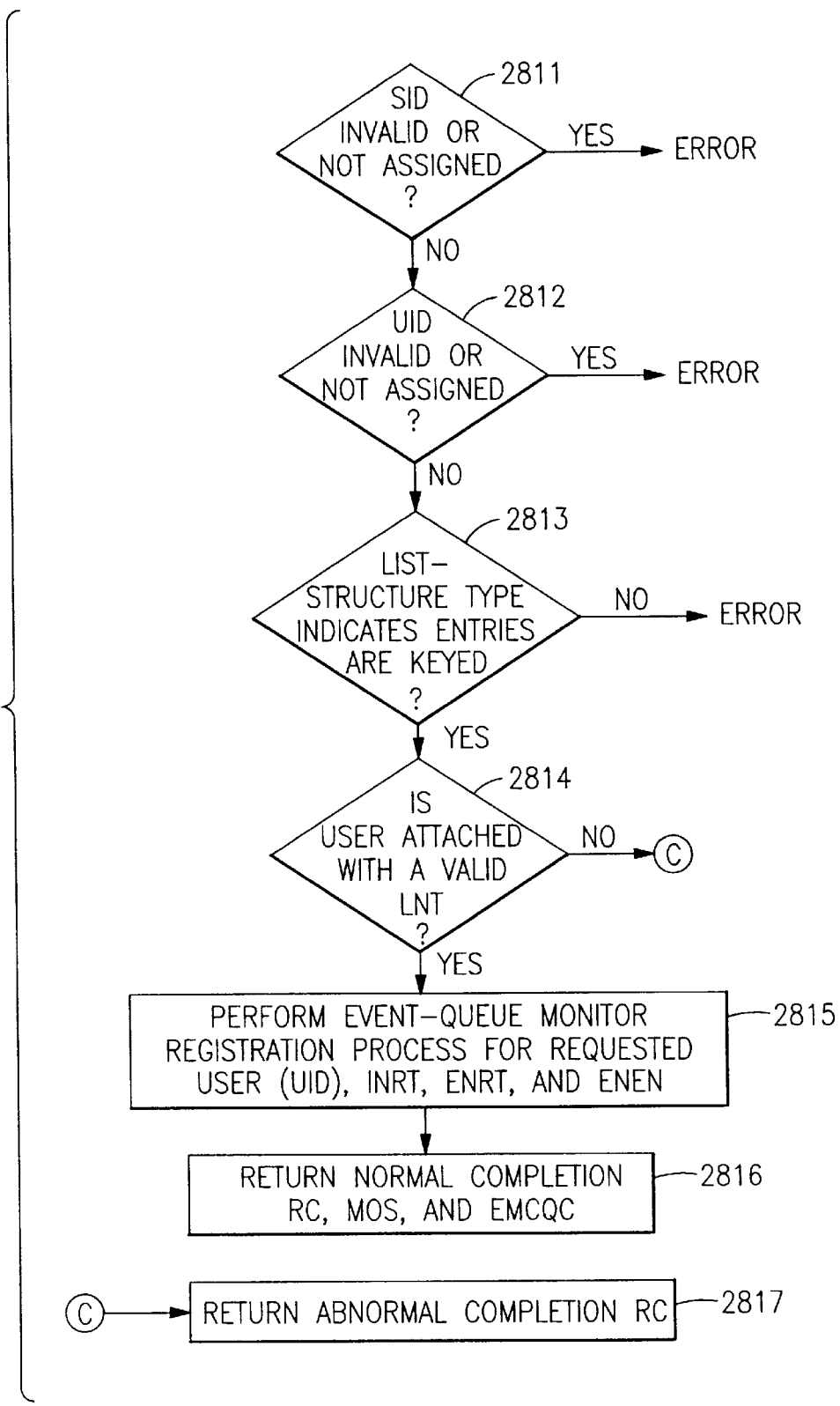

FIGS. 6A, 6B and 6C provide an overview and example of the processing performed by users of a list structure to make use of subsidiary list event monitoring and event-queue monitoring to efficiently be notified of the existence of, and process, the list entries associated with subsidiary lists in which they are interested. Each user defines a list-notification vector (601) associated with their use of the list structure, which will be used to reflect list state and/or event queue state information for the associated SES-list structure objects as directed by list-notification commands initiated by the SES facility. The list-notification vector resides in the user's CPC. The user attaches to the list structure (602) passing to the SES-list structure a list-notification token (LNT) uniquely identifying the user's list-notification vector to the SES facility, so that list-notification commands may be properly targeted by the SES facility to update the user's list-notification vector. This information is stored in the user controls (210) along with other user attachment information (603).

Once attached, the user registers interest in monitoring its event queue using the register-list-monitor (RLM) command (604). The user provides information on this command to designate which bit in the user's list-notification vector is to be associated with the user's event queue, and whether or not the user requires local vector summary bits to be updated by the list-notification commands that will be initiated by the SES-list structure in response to event queue transitions. This information is stored in the user's event queue controls (501,502) as part of the event-queue monitor registration process (605). The user may update this registration information at any time by reissuing the register-list-monitor (RLM) command.

The user may register interest in monitoring one or more particular subsidiary lists within the list structure, either via the register-list-monitor (RLM) or register-event-monitors (REMS) commands, or a combination of both commands (606). The user provides its user identifier, and information identifying the particular subsidiary list(s) which are to be monitored, and may also provide additional user-defined information (the user-notification controls) for each event-monitor. This registration information will be stored in an event-monitor-controls object (411,412) that is created and/or updated as part of the event-monitor registration process (607). The user may update this registration information at any time by reissuing the register-list-monitor (RLM) or register-event-monitors (REMS) commands.

The user's application protocols determine which particular subsidiary list(s) a given user may be interested in monitoring. For example, the user's protocol may map a particular subsidiary list to a particular class of work. Any application instance acting as a client may then submit a work request for that class of work by writing a list entry representing a work request into the list structure onto the associated subsidiary list, moving a list entry from elsewhere in the list structure onto the associated subsidiary list, etc.; or may cancel a work request for that class of work by deleting a list entry representing the work request from the associated subsidiary list, moving a list entry off of the subsidiary list to elsewhere in the list structure, etc. (608). When performance of the requested list-entry commands by the SES facility (609) results in subsidiary list state transitions for the subsidiary list(s) manipulated by the commands, the SES performs the appropriate event-monitor-controls queueing or withdrawal processes for the EMCs associated with the subsidiary list (610). These queueing or withdrawal processes in turn may result in event-queue state transitions for one or more users' event queues, and if so, the SES initiates list-notification commands to the users' CPCs to notify them of such event-queue transitions (612). Such notification does not interrupt the user's processing at the CPC; rather it results in the non-disruptive update of the users' list-notification vectors, and optionally vector summaries, at the CPC (611).

Similarly, any application instance acting as a server for one or more classes of work mapped to particular subsidiary lists within the list structure will have registered as a subsidiary list event monitor for those subsidiary lists (606), and as an event-queue monitor (604). Advantageously, such an application instance will register interest only in subsidiary lists representing classes of work which it is capable of serving, and will not monitor nor receive any notification of client work requests for any other classes of work. As a server, the application will poll the list-notification vector and/or vector summaries for event-queue transitions (613) when it has sufficient idle capacity or resources to accept new work requests. Advantageously, an event-queue transition may be observed by testing the state of a single list-notification vector bit (the bit associated with the user's registered monitoring interest for its event queue), regardless of how many subsidiary lists the user may be monitoring. When an event-queue transition to the not-empty state is observed by the user, (614), the user will read the contents of one or more event-monitor-controls which are queued on the user's event queue and also dequeue those EMCs from the user's event queue, using the dequeue-event-monitor-controls (DEMC) command. The returned EMC contents for each of the EMCs identifies the particular subsidiary list(s) for which the user had a registered event-monitoring interest and which have transitioned to the not-empty state, and also contains the user-notification-control information associated with the event monitor (616). The user then performs the appropriate list-entry commands to process the indicated subsidiary list(s) (617,618). For example, the user might read and delete list entries from the subsidiary list, initiating the processing of the work request each of the list entries represents. The user would continue processing in this manner until no more queued event-monitor-controls remained on the user's event queue (619).

Advantageously, if any user's processing of a subsidiary list (617,618) causes it to return to the empty state, the SES facility will withdraw all queued event-monitor-controls associated with the subsidiary list from their respective users' event queues. Such withdrawal may in turn cause users' event queues to transition back to the empty state, and initiate list-notification commands to update the user's list-notification vectors to indicate that their event queue is empty, such that the user's polling (613) may in fact never observe the event queue to be in the not-empty state at all; or such withdrawal may result in the EMCs not being returned by a user's subsequent dequeue-event-monitor-controls (DEMC) command. Either result reduces the amount of unnecessary work which might otherwise be performed by a user to process a subsidiary list which had previously transitioned to the not-empty state, but which had since returned to the empty state as a result of processing performed by any user of the structure.

Advantageously, once a user has successfully registered interest in subsidiary list event monitoring for a particular subsidiary list, it is always possible for the SES to report transitions of that subsidiary list to the monitoring user via the event-monitor-controls queueing and withdrawal processes. This mechanism is not subject to failures to report subsidiary list state transitions resulting from transient shortages of available resources (e.g., storage) at the SES facility. Additionally, should temporary losses of connectivity between a user's CPC and the SES facility temporarily preclude the user from reading and dequeueing EMC information from its event queue, no loss of subsidiary list state transition information will occur; EMCs representing this state information simply remain queued on the user's event queue indefinitely, until either the temporary loss of connectivity is resolved and the user is able to retrieve the EMC information, or the EMC(s) are withdrawn from the user's event queue as part of normal processing for list-entry commands manipulating subsidiary list(s). This mechanism therefore constitutes a robust and reliable notification mechanism for monitoring within a SES-list structure.

List-Structure Processes: The list commands provide a means for conditionally creating, reading, replacing, moving, or deleting a list entry. A number of comparisons may be requested during these processes. For example, a list-number comparison, a version-number comparison, a global-lock-manager comparison, or any combination of the preceding. A list entry may be moved from one list to another within the same structure or from one position to another within the same list.

The position of a list entry in a list is determined when it is created, and may be changed when any entry in the list is created, deleted or moved. A list entry or list-entry position is located within a list set by means of a list-entry identifier, an optional list-entry name, a list cursor, or by position.

A list-entry identifier is unique to a list set and is assigned by the SES facility. A list-entry name is unique to a list set at any particular instant and is provided by the program. A list cursor is used to designate a list entry or list-entry position in a specified list. Locating an entry by position is specified by means of a list number, a direction, and an optional list-entry key.

When list-entry keys exist, the keyed list entries are ordered by key with the lowest numerical key at the leftmost position.

When an unkeyed list entry is created or moved, the target list-entry position is always located by unkeyed position. When a keyed list entry is created or moved, the target list-entry position is always located by keyed position.

The list commands also provide a means for atomically writing and moving, moving and reading, or reading and deleting a list entry. In some cases, more than one list entry may be deleted atomically, and more than one data list entry or adjunct list entry may also be read atomically.

Monitoring is a SES facility list structure function which is optionally requested by a list-structure user by means of the attach-list-structure-user (ALSU) command, and the register-list-monitor (RLM) or register-event-monitors (REMS) command. The attach-list-structure-user (ALSU) command establishes the OS on which the list-structure user resides and the list-notification vector associated with the user for monitoring purposes. The register-list-monitor (RLM) command establishes a list-notification-vector entry for list monitoring or event-queue monitoring (505), establishes whether or not the user requires list-notification vector summaries to be updated (506), and allows the user to begin monitoring a list, an event, or an event queue. The register-event-monitors (REMS) command allows the user to begin monitoring a number of events.

When a user is monitoring an event, an event-monitor-controls object is queued or withdrawn from the event queue associated with the user, depending on the state associated with the event.

When a user is monitoring a list or event queue, the empty to not-empty and not-empty to empty state transitions of the list or event queue, result in the SES facility issuing a list-notification command to the OS which initiated the user attachment.

The list-notification command causes the specified list-notification-vector entry to be updated to reflect the empty or not-empty state of the monitored list or event queue. The list-notification command may also cause the specified list-notification-vector global summary and list-notification-vector local summary to be updated to reflect the not-empty state of the monitored list or event queue.

List States: A list is either in the empty or the not-empty state. A user may request a notification of the initial state of a list by means of the initial-notification-request type on the register-list-monitor (RLM) command.

Empty State: A list is in the empty state when there are no entries in the list.

Not-Empty State: A list is in the not-empty state when there are one or more entries in the list.

List-State Transitions: A user may register interest in the state transitions of a list by means of the register-list-monitor (RLM) command. A list may change either from the not-empty to the empty state or from the empty to the not-empty state.

Empty to Not-Empty List-State Transition: A list changes from the empty to the not-empty state when the list has no entries and an entry is created or moved to the list.

Not-Empty to Empty List-State Transition: A list changes from the not-empty to the empty state when the list has one entry and the entry is deleted or moved to another list.

Subsidiary-List States: A subsidiary list is either in the empty or the not-empty state. A user may request to queue or withdraw the event-monitor-controls object to reflect the initial state of a subsidiary list by means of the initial-notification-request type on the register-list-monitor (RLM) or register-event-monitors (REMS) command.

Empty State: A subsidiary list is in the empty state when there are no entries in the subsidiary list.

Not-Empty State: A subsidiary list is in the not-empty state when there are one or more entries in the subsidiary list.

Subsidiary-List-State Transitions: A user may register interest in the state transitions of a subsidiary list by means of the register-list-monitor (RLM) or register-event-monitors (REMS) command. A subsidiary list may change either from the not-empty to the empty state or from the empty to the not-empty state.

Empty to Not-Empty Subsidiary-List-State Transition: A subsidiary list changes from the empty to the not-empty state when the subsidiary list has no entries and an entry is created or moved to the subsidiary list.

Not-Empty to Empty Subsidiary-List-State Transition: A subsidiary list changes from the not-empty to the empty state when the subsidiary list has one entry and the entry is deleted or moved to another subsidiary list.

Event-Queue States: An event queue is either in the empty or the not-empty state. A user may request a notification of the initial state of an event queue by means of the initial-notification-request type on the register-list-monitor (RLM) command.

Empty State: An event queue is in the empty state when there is no event-monitor-controls object queued to the event queue.

Not-Empty State: An event queue is in the not-empty state when there are one or more event-monitor-controls objects queued to the event queue.

Event-Queue-State Transitions: A user may register interest in the state transitions of an event queue by means of the register-list-monitor (RLM) command. An event queue may change either from the not-empty to the empty state or from the empty to the not-empty state.

Empty to Not-Empty Event-Queue-State Transition: An event queue changes from the empty to the not-empty state when the event queue has no queued object and an event-monitor-controls object is queued to the event queue.

Not-Empty to Empty Event-Queue-State Transition: An event queue changes from the not-empty to the empty state when the event queue has one event-monitor-controls object queued and the object is dequeued, withdrawn, or deleted.

LIST STRUCTURE OBJECTS

The possible list-structure objects consist of:

List-structure controls (201)

User controls (210)

Event-monitor controls (411,412,503)

Event-queue controls (501,502)

Event queues (515,516)

List controls (314)

List-entry controls (315)

Lock table (205)

List set (202)

List-Structure Controls (201)

The fixed list-structure controls are initialized when the list structure is created and remain unchanged until it is deallocated.

The program-modifiable list-structure controls are initialized when the list structure is created. The program-modifiable control values may be changed by commands or SES facility processes.

The fixed list-structure controls are summarized in the following table:

| FIXED LIST-STRUCTURE CONTROLS | ACRONYM |
| --- | --- |
| List count | LC |
| List-Element | LELX |

| FIXED LIST-STRUCTURE CONTROLS | ACRONYM |
|---|---|
| Characteristic | |
| List-structure type | LST |
| Lock-table-entry characteristic | LTEX |
| Lock-table-entry count | LTEC |
| Maximum data-list-entry size | MDLES |
| Maximum structure size | MXSS |

List-Structure Type (LST) (204): A value that indicates the list objects created at list structure allocation. The field contains an element-count indicator (ECI), lock indicator (LI), data indicator (DI), adjunct indicator (AI), name indicator (NI), and a key indicator (KI).

The element-count indicator determines whether a list-entry count and list-entry-count limit, or a list-element count and list-element-count limit, are defined for the structure.

The lock indicator determines whether or not a lock table is created for the structure.

The data and adjunct indicators determine whether there is no list set created, or if a list set is created, whether the list entries have adjunct only, have data only, or have adjunct and data.

The name indicator determines whether or not the list entries are named.

The key indicator determines whether or not the list entries are keyed.

At least one of the lock, data or adjunct indicators must be indicated. The name indicator and the key indicator are mutually exclusive with one another; list entries may be either named, keyed, or neither, but not both.

For the dequeue-event-monitor-controls (DEMC), read-event-monitor-controls (REMC), read-event-queue-controls (REQC), and register-event-monitors (REMS) commands, and the register-list-monitor (RLM) and deregister-list-monitor (DLM) commands, when event monitor or event-queue monitor registration/deregistration are requested, the key indicator must indicate that the list entries are keyed; otherwise, the list-structure type is invalid and a request exception is recognized.

The program-modifiable list-structure controls are summarized in the following table:

| PROGRAM-MODIFIABLE LIST-STRUCTURE CONTROLS | ACRONYM |
|---|---|
| Entry-reapportionment-in-progress indicator | EREIPI |
| Event-monitor-controls count | EMCC |
| List-set-element count | LSELC |
| List-set-entry count | LSEC |
| Maximum event-monitor-controls count | MEMCC |
| Maximum list-set-element count | MLSELC |
| Maximum list-set-entry count | MLSEC |
| Marginal structure size | MRSS |
| Minimum apportionable structure size | MASS |
| Nonzero-lock-table-entry count | NLTEC |
| Pending entry-to-element ratio | PETELR |
| Structure authority | SAU |
| Structure size | SS |
| Structure-size-change indicator | SSCI |
| Target maximum-element count | TMELC |
| Target maximum-entry count | TMEC |
| Target maximum-event-monitor count | TMEMC |
| Target structure size | TSS |
| User-identifier vector | UIDV |
| User-structure control | USC |

Entry-Reapportionment-in-Progress Indicator (EREIPI): A value that indicates whether or not an entry-to-element-reapportionment process is currently active for the list structure. When indicated, the list structure entry-to-element ratio is being reapportioned. When not indicated, the list structure entry-to-element ratio is not being reapportioned.

Event-Monitor-Controls Count (EMCC) (214): A value that specifies the number of event-monitor-controls objects which currently exist in a list set. Valid values are from 0 to the maximum event-monitor-controls count (213).

Marginal Structure size (MRSS): A value that specifies the minimum number of 4K-byte units of SES facility storage that are required for the creation of the requested lock-table entries, lists, and associated controls for the list structure, independent of the storage-increment size, the requested target entry-to-element ratio, and the requested target monitor-to-entry storage ratio.

Maximum Event-Monitor-Controls Count (MEMCC) (213): A value that specifies the maximum number of possible event-monitor-controls objects which may be created in a list set. Valid counts are from 0 to 4,294,967,295 in integral multiples of the number of event-monitor controls that can be supported within the SES facility storage-increment size.

Minimum Apportionable Structure Size (MASS): A value that specifies the minimum number of 4K-byte units of SES facility storage that can be allocated for the list, in integral multiples of the SES facility storage increment, that are sufficient for creating the requested lock-table entries, lists, associated controls, enough event-monitor controls and list entries with their associated controls to substantially satisfy the target monitor-to-entry storage ratio, and enough entries and elements to substantially satisfy the target entry-to-element ratio.

Target Maximum-Event-Monitor Count (TMEMC) (212): A value that specifies the target for the maximum number of event-monitor-controls objects that may be created for registration of interest in subsidiary lists within the list set. Valid counts are from 0 to 4,294,967,295 in integral multiples of the number of event-monitor controls that can be supported within the SES facility storage-increment size.

Event-Monitor Controls (411,412,503)

There is an event-monitor-controls object for every user and subsidiary list combination for which a user has currently registered interest. The maximum number of possible event-monitor controls, from one to 4,294,967,295, is determined when the list structure is created.

An event-monitor-controls object is created when a user initially registers interest in a subsidiary list, and is deleted when a user deregisters interest in a subsidiary list or detaches from the list structure.

All the event-monitor controls except the event-monitor-queued indicator (415,509) are initialized to the values provided as request operands during registration.

The event-monitor controls are summarized in the following table:

| EVENT-MONITOR CONTROLS | ACRONYM |
|---|---|
| Event-monitor-queued indicator | EMQI |
| List-entry key | LEK |
| List number | LN |
| User identifier | UID |
| User notification control | UNC |

Event-Monitor-Queued Indicator (EMQI) (415,509): A value that indicates whether or not the event-monitor-controls object is queued to the event queue associated with the user identifier contained within the object.

List-Entry Key (LEK) (416,510): A value which, in conjunction with the list number, partially designates the subsidiary list.

List Number (LN) (417,511): A value which, in conjunction with the list-entry key, partially designates the subsidiary list. Valid values are from zero to the list count less one.

User Identifier (UID) (418,512): A value that identifies a user of the list structure. Valid user identifiers are from one to the user-identifier limit (UIDL).

User Notification Control (UNC) (419,513): A value in the event-monitor controls whose meaning is determined by the user of the structure.

Event-Queue Controls (501,502)

There is an event-queue-controls object for each event queue (515,516) in a list structure. There is one event queue per user of the list structure, when the structure is created with keyed list entries. All of the event-queue controls of an event queue are initialized to zero when the event queue is created or when the associated list-structure user is detached.

The event-queue controls are summarized in the following table:

| EVENT-QUEUE CONTROLS | ACRONYM |
|---|---|
| Event-monitor-controls-queued count | EMCQC |
| Event-notification-entry number | ENEN |
| Event-notification-request type | ENRT |
| Event-queue-monitoring-active bit | EQMAB |
| Event-queue-transition count | EQTC |

Event-Monitor-Controls-Queued Count (EMCQC) (504): A value that specifies the number of event-monitor controls currently queued to the event queue.

Event-Notification-Entry Number (ENEN) (505): A value that specifies a list-notification-vector entry associated with an event queue.

Event-Notification-Request Type (ENRT) (506): A value that indicates whether or not the list-notification-vector summaries are to be updated when an empty to not-empty state transition occurs for an event queue.

Event-Queue-Monitoring-Active Bit (EQMAB) (507): A value that specifies whether or not the user associated with the event queue is monitoring the event queue.

Event-Queue-Transition Count (EQTC) (508): A value that specifies the number of empty to not-empty event-queue transitions that have occurred for the event queue.

List Controls (314)

There is a list-controls object for every list created in a list structure. All the list controls except the list-entry-count limit (303) or the list-element-count limit (313) are initialized to zero when the list structure is created.

List-Monitor Table (316)

The list-monitor table contains information used to process the list-notification vector of each user who has registered interest in the state transitions of the list.

List-Monitoring-Active Bit (LMAB): A value that specifies whether or not the user associated with the list-monitor-table entry is monitoring the list.

List-Notification-Entry Number (LNEN): A value that specifies a list-notification-vector entry associated with a monitored list.

Event Queue (515,516)

An event queue is a sequence of objects called event-monitor controls (503). The event queue associated with a particular list-structure user is created when a list structure is allocated and the list entries are keyed, and is deleted when the associated list structure is deallocated.

An event-monitor-controls object (503) is always queued to the right-most position on the event queue. An event-monitor-controls object may be withdrawn from any location on the event queue. When dequeued as a result of execution of a dequeue-event-monitor-controls (DEMC) command, an event-monitor-controls object is dequeued from the left-most position on the event queue; however, when dequeued as part of an event-monitor-controls deletion process, an event-monitor-controls object may be dequeued from any location on the event queue.

An event-monitor-controls object may be queued when an empty to not-empty state transition occurs for a monitored subsidiary list (401) or when notification of the initial subsidiary-list state is requested on registration. An event-monitor-controls object may be withdrawn when a not-empty-to-empty state transition occurs for a monitored subsidiary list (402) or when notification of the initial subsidiary-list state is requested on registration. An event-monitor-controls object may be dequeued by means of the dequeue-event-monitor-controls (DEMC) command, or as part of the event-monitor-controls deletion process. An event-monitor-controls object may be deleted when a user deregisters interest in the subsidiary list or detaches from the list structure.

List Set (202)

The list set is a sequence of objects, called lists (109). The number of lists is determined when a list set is created, and is from one to 4,294,967,296. The lists are numbered from zero to the list count less one.

Subsidiary List (401,402,403)

A subsidiary list is a contiguous subset of the list entries within a list, in which all list entries have the same list-entry key value. A subsidiary list may only exist when a list set is created and the list entries are keyed.

LIST STRUCTURE OPERANDS

This section defines the list-structure operands, except for those operands that are common to more than one command type or response operands that are also objects.

The list-structure operands are summarized in the following table:

| LIST-STRUCTURE OPERANDS | ACRONYM |
|---|---|
| Adjunct list entry | ALE |
| Allocation type | AT |
| Apportionment priority | API |

-continued

| LIST-STRUCTURE OPERANDS | ACRONYM |
|---|---|
| indicator | |
| Assignment-key increment | AKI |
| Assignment-key-request type | AKRT |
| Assignment-key-update type | AKUT |
| Comparative global-lock manager | CGLM |
| Comparative list authority | CLAU |
| Comparative structure authority | CSAU |
| Comparative user authority | CUAU |
| Comparative version number | CVN |
| Current event index | CTX |
| Current data index | CDX |
| Cursor direction | CDIR |
| Data-block size | DBS |
| Data list entry | DLE |
| Date-list-entry size | DLES |
| Delete-entries-locator type | DELT |
| Delete-list-entries count | DLEC |
| Detachment-request type | DRT |
| Direction | DIR |
| Element-toleration factor | ELTF |
| Event-monitor-controls-dequeued count | EMCDC |
| Ending data index | EDX |
| Ending event index | ETX |
| Entry-locator type | ELT |
| Entry-toleration factor | ETF |
| Event-notification-entry number | ENEN |
| Event-notification-request type | ENRT |
| Initial-notification-request type | INRT |
| Key-comparison type | KCT |
| Key-request type | KRT |
| List authority | LAU |
| List-authority-comparison type | LAUCT |
| List-authority-replacement type | LAURT |
| List-control type | LCT |
| List count | LC |
| List-cursor request type | LCURT |
| List-cursor-update type | LCUT |
| List-element characteristic | LELX |
| List-element count limit | LELCL |
| List-entry-count limit | LECL |
| List-entry identifier | LEID |
| List-entry key | LEK |
| List-entry name | LEN |
| List-entry type | LET |
| List-monitoring-active bit | LMAB |
| List-notification-entry number | LNEN |
| List-notification-request type | LNRT |
| List-notification token | LNT |
| List number | LN |
| List-number comparison type | LNCT |
| List-structure type | LST |
| Local-lock managers | LLM |
| Local-lock bit | LLB |
| Lock-manager-update type | LMUT |
| Lock-request type | LRT |
| Lock-table entry | LTE |
| Lock-table-entry characteristic | LTEX |
| Lock-table-entry count | LTEC |
| Lock-table-entry number | LTEN |
| Maximum data-list-entry size | MDLES |
| Maximum structure size | MXSS |
| Monitor-request type | MRT |

-continued

| LIST-STRUCTURE OPERANDS | ACRONYM |
|---|---|
| Monitored object state | MOS |
| Monitored-object-state vector | MOSV |
| Move-entry-locator type | MELT |
| Nonzero-lock-table-entry count | NLTEC |
| Read-list-entries count | RLEC |
| Read-list type | RLT |
| Restart token | RT |
| Retry index | RX |
| Retry version number | RVN |
| Starting data index | SDX |
| Starting event index | STX |
| Structure authority | SAU |
| Target direction | TDIR |
| Target entry-to-element ratio | TETELR |
| Target list-entry key | TLEK |
| Target monitor-to-entry storage ratio | TMTESR |
| Target list number | TLN |
| Target structure size | TSS |
| User-attachment control | UAC |
| User authority | UAU |
| User identifier | UID |
| User list control | ULC |
| User notification control | UNC |
| User state | US |
| User structure control | USC |
| Version-comparison-request type | VCRT |
| Version number | VN |
| Version-request type | VRT |
| Write-request type | WRT |
| Write result | WRES |

Allocation Type (AT): A value that indicates what action an allocate-list-structure (ALST) command should take. The value is comprised of an entry-to-element-ratio indicator (ETELRI), a structure-size indicator (SSI), and a user-structure-control indicator (USCI).

An allocation type which does not request any of these specifies that all list-allocation processes are to be check-pointed and stopped.

The entry-to-element-ratio indicator indicates whether or not to initiate or continue reapportionment as specified by the target-entry-to-element-ratio request operand.

The structure-size indicator indicates whether or not to initiate or continue expansion or contraction as specified by the target-structure-size request operand, and, if ETELRI is not specified, resume reapportionment as specified by the pending entry-to-element ratio.

The user-structure-control indicator indicates whether or not to update the user structure control.

The structure authority is always compared and conditionally replaced.

The allocation type is ignored unless the initial-allocation process is complete. When the data indicator (DI) in the list-structure-type (LST) object indicates that data is not supported, the entry-to-element-ratio indicator (ETELRI) must not be requested.

Current Event Index (CTX): A value that indexes to the current registration request in the data block for the register-event-monitors (REMS) command.

Ending Event Index (ETX): A value that indexes to the last registration request in the data block for the register-event-monitors (REMS) command. Valid indices are from the STX to a maximum such that 64 times ETX is less than or equal to 64K.

Event-Monitor-Controls-Dequeued Count (EMCDC): A value that specifies the number of event-monitor-controls objects dequeued by means of the dequeue-event-monitor-controls (DEMC) command.

Event-Notification-Entry Number (ENEN): A value that specifies a list-notification-vector entry. This request operand is ignored unless the monitor-request type indicates an event-queue monitor.

Event-Notification-Request Type (ENRT): A value that indicates whether or not the list-notification-vector summaries are to be updated when an empty to not-empty state transition occurs on a monitored event queue. This request operand is ignored unless the monitor-request type indicates an event-queue monitor.

Event-Queue-Monitoring-Active Bit (EQMAB): A value that specifies whether or not the user associated with the event queue is monitoring the event queue.

Initial-Notification-Request Type (INRT): A value that indicates whether or not to notify a monitor of the initial state of the monitored object.

When the monitor-request type specifies a list monitor, the initial-notification-request type indicates whether or not to notify the list monitor.

When the monitor-request type specifies an event-queue monitor, the initial-notification-request type indicates whether or not to notify the event-queue monitor.

When the monitor-request type specifies an event monitor, the initial-notification-request type indicates whether or not to queue or withdraw the event-monitor-controls object to or from the event queue.

List-Entry Key (LEK): A value that partially specifies a list-entry position or an event-monitor-controls object. This request operand is ignored unless the list entries are keyed, and one or more event monitors are registered, event-monitor controls are read, or an entry is located by keyed position.

List-Monitoring-Active Bit (LMAB): A value that specifies whether or not the user associated with the list-monitor-table entry is monitoring the list.

List-Notification-Entry Number (LNEN): A value that specifies a list-notification-vector entry. This request operand is ignored unless the monitor-request type indicates a list monitor.

List Number (LN): A value that designates a list in a list set. Valid numbers are from 0 to the list count less one. This request operand is ignored unless the entry is located by keyed position, unkeyed position, or cursor, list-number comparison is requested, list controls or event-monitor controls are read, or a list monitor or one or more event monitors are registered or deregistered.

Monitored Object State (MOS): A value that indicates the state of the monitored object.

When the monitor-request type indicates a list monitor, the monitored object state indicates whether the list is empty or not-empty.

When the monitor-request type indicates an event-queue monitor, the monitored object state indicates whether the event queue is empty or not-empty.

When the monitor-request type indicates an event monitor, the monitored object state indicates whether the subsidiary list is empty or not-empty.

Monitored-Object-State Vector (MOSV): A bit string where the bit positions start at 0 and increase sequentially to 1K-1. The bit at position (i) in the string is set to one when the corresponding event monitor as specified in the registration request in the data block of the register-event-monitors (REMS) command is registered as a result of the command execution and the corresponding subsidiary list is not empty (i equals the event index minus one). Bit positions CTX-1 to ETX-1, and, when STX is greater than one, bit positions 0 to STX-2 are zero regardless of the state of the corresponding subsidiary list. Bit positions ETX to 1K-1 are reserved.

Monitor-Request Type (MRT): A value that indicates what type of monitor to register or deregister. It may indicate to register or deregister a list monitor, an event-queue monitor, or an event monitor.

A monitor-request type which indicates a list monitor is only valid when a list set is allocated. A monitor-request type which indicates an event-queue monitor or an event monitor is only valid when a list set is allocated and the list entries are keyed.

Starting Event Index (STX): A value that indexes to the first registration request in the data block for the register-event-monitors (REMS) command. Valid indices are from 1 to the ending event index.

Target Monitor-to-Entry Storage Ratio (TMTESR): A value comprised of two numbers that specify the target for the relative amount of storage available for event-monitor controls versus list entries and their associated controls.

The first number divided by the sum of the two numbers represents the fraction of the target structure size less the marginal structure size that is dedicated to event-monitor controls. The second number divided by the sum of the two numbers represents the fraction of the target structure size less the marginal structure size that is dedicated to list entries and their associated controls.

When the first number is zero, the second number is assumed to be 100. This operand is ignored unless a list set is being created.

User Identifier (UID): A value that identifies a user.

Valid user identifiers are from one to the UIDL when a user is attached or detached, must identify an attached UID when a user is registered, and must identify an assigned UID when a user is deregistered, or user controls, event-monitor controls, or event-queue controls are read, or event-monitor controls are dequeued.

This request operand is ignored unless a valid lock-request type is specified or an attach-list-structure-user (ALSU), detach-list-structure-user (DLSU), register-list-monitor (RLM), deregister-list-monitor (DLM), dequeue-event-monitor-controls (DEMC), register-event-monitors (REMS), read-event-monitor-controls (REMC), read-event-queue-controls (REQC), or read-user-controls (RUC) command is issued.

User Notification Control (UNC): A value in the event-monitor controls defined by the user.

LIST STRUCTURE PROCESSES

The following processes may be invoked by the list-structure commands:

Allocating a List Structure

The user structure control is conditionally updated on the allocate-list-structure (ALST) command. A list structure is created on the first successful invocation of the allocate-list-structure (ALST) command for a structure that does not already exist (2001,2002). A list structure is initially allocated, expanded, contracted, or reapportioned after one or more successful invocations of the allocate-list-structure (ALST) command. These operations are referred to generically as list-allocation processes.

Expansion, contraction, and reapportionment are initiated subsequent to the completion of the initial-allocation process. Initiation of one or more allocation processes merges the requested allocation processes with the in-progress ones.

A list-allocation process is successful when a successful or timeout response code is returned.

When the structure-size-change, or entry-reapportionment-in-progress indicator indicate that these processed are not in progress, the associated list-allocation process is stopped. This can happen when (1) the process is completed, (2) the allocation type requesting all allocation processed to be stopped is requested before the process is completed, or (3) the SES facility cannot make any progress to complete the process. In the latter two cases, the process is said to be suspended. A suspended entry-to-element-reapportionment process can be resumed with the pending entry-to-element ratio by executing an allocate-list-structure (ALST) command with the entry-to-element-ratio indicator not requested, and the structure-size indicator requested. There is no mechanism to resume a suspended expansion or contraction process.

Creating a List Structure: When a list structure is created (2002), the list-structure type (204) determines the attributes of the created structure. The list-structure type has indicators for each of the following: counters, locks, data, adjunct, name, and key.

When the element-count indicator in the list-structure type indicates that list-entry counts and list-entry-count limits are defined and allocation is successful, the list controls for each list contain a list-entry count and a list-entry-count limit. When the element-count indicator in the list-structure type specified indicates that list-element counts and list-element-count limits are defined and allocation is successful, the list controls for each list contain a list-element count and a list-element-count limit.

When the lock indicator in the list-structure type requests a lock table and allocation is successful, a lock table is created with a width as specified by the lock-table-entry characteristic and a length as specified by the lock-table-entry count.

When the data indicator in the list-structure type requests data elements and allocation is successful, storage is allocated for the creation of list elements. The size of the list elements is specified by the list-element characteristic.

When the adjunct indicator in the list-structure type requests adjunct data and allocation is successful, each list entry created in the structure has an adjunct list entry.

When the name indicator in the list-structure type indicates that list entries are to be named and allocation is successful, each list entry created in the structure has a list-entry name associated with it.

When the key indicator in the list-structure type (204) indicates that list entries are to be keyed (701) and allocation is successful, every possible user identifier has event-queue controls (140) created (702) for it, and each list entry (302) created in the structure has a list-entry key (311) associated with it.

When a list structure is created, (1) the free-space and free-control-space global controls are updated, (2) the appropriate created bit in the structure-identifier vector is set to one, and (3) the list-structure and list controls are initialized, including the update of the target-structure-size and target-count objects.

When a list structure is created, the maximum-structure-size object is initialized to the largest storage size that the model can support given the structure size and is equal to or smaller than the maximum-structure-size equest operand rounded up to the nearest integral multiple of the SES facility storage increment.

Specifying a target structure size which is smaller than the marginal structure size will cause the allocation to complete with an indicative response code.

Updating the Target-Structure-Size Object: When a list structure is created, the target-structure-size object is set equal to the largest storage size available that (1) supports objects that may be referenced given the target entry-to-element and monitor-to-entry storage ratios, (2) is equal or less than the target-structure-size request operand rounded up to the nearest integral multiple of the SES facility storage increment, and (3) is within the range specified by the marginal and maximum structure sizes.

When the target-structure-size request operand is within the range specified by the marginal and maximum structure-sizes and an expansion or contraction request is successful, the target-structure-size object is set to the target-structure-size request operand rounded up to the nearest integral multiple of the SES facility storage increment.

When a reapportionment request is initiated without a corresponding expansion or contraction request and the structure-size-change indicator indicates that a structure size change is not in progress, the target-structure-size object is replaced by the structure-size object value prior to updating the target-count objects. When a reapportionment request is initiated without a corresponding expansion or contraction request and the structure-size-change indicator indicates that a structure size change is in progress, the target-structure-size object is not changed.

When the target-structure-size request operand is larger than the maximum-structure-size object and an expansion request is successful, the target-structure-size object is set equal to the maximum-structure-size object.

When the target-structure-size request operand is smaller than the marginal structure size, and a contraction request is successful, the target-structure-size object is set equal to the marginal structure size.

Updating the Target-Count Objects: The target-count objects are the target-maximum-event-monitor-count object (212), the target-maximum-element-count object and the target-maximum-entry-count object.

When a creation request is successful, the target structure size is larger than or equal to the minimum apportionable structure size, and no conflicts exist in target-object assignments, the target counts are updated such that (1) the ratio of the new target maximum-entry count to the new target maximum-element count is substantially equal to the ratio as specified by the target-entry-to-element-ratio request operand, the inverse ratio is greater than zero and smaller than or equal to the maximum data-list-entry size, (2) the ratio of the storage associated with the target maximum-event-monitor count (212) to the storage associated with the target maximum-entry and target maximum-element counts is substantially equal to the ratio specified by the target monitor-to-entry-storage-ratio request operand (703), and (3) the target counts are the largest counts possible given the target structure size.

When a creation request is successful, but the target structure size is smaller than the minimum apportionable structure size, the ratio of the new target counts are the best possible, but may vary significantly from the pending entry-to-element ratio.

When a reapportionment request is successful, the target structure size is larger than or equal to the minimum apportionable structure size, and no conflicts exist in target-object assignments, the target counts are updated such that the ratio of the new target maximum-entry count to the new target maximum-element count is substantially equal to the ratio as specified by the target-entry-to element-ratio request operand, the inverse ratio is greater than zero and smaller than or equal to the maximum data-list-entry size and the target counts are the largest counts possible given the target structure size.

When an expansion or contraction request is successful, the target structure size is larger than or equal to the minimum apportionable structure size, and no conflicts exist in target-object assignments, the target counts are updated such that the ratio of the new target maximum-entry count to the new target maximum-element count is substantially equal to the pending entry-to-element ratio, the inverse ratio is greater than zero and smaller than or equal to the maximum data-list-entry size and the target counts are the largest counts possible given the target structure size.

When an expansion or contraction request is successful, but the target structure size is smaller than the minimum apportionable structure size, the ratio of the new target counts are the best possible, but may vary significantly from the pending entry-to-element ratio.

Checkpointing a List-Allocation Process: An allocate-list-structure (ALST) command is always checkpointed when a successful or timeout response code is returned. Also, an allocation process may be checkpointed anytime during the execution of a successful allocate-list-structure (ALST) command or when background processing continues as a result of a successful allocate-list-structure (ALST) command. Background processing of a successful allocate-list-structure (ALST) command stops when a successful response code is returned.

When a list-allocation process is checkpointed, the maximum event-monitor-controls count (213), maximum-list-set-entry-count, maximum-list-set-element-count, minimum-apportionable-structure-size, structure-size-change-indicator, entry-reapportionment-in-progress-indicator, and structure-size list-structure objects and the free-space and free-control-space global objects are updated. In addition, the list-element-count or list-entry-count limits may also be updated. The new structure-size object is within the range of the previous structure-size object and the target-structure-size object.

In the absence of conflicts, or when conflicts are present but the apportionment-priority indicator indicates that priority is to be given to maintaining an accurate ratio, (1) the ratio of the new maximum-list-set-entry-count object to the new maximum-list-set-element-count object is within the range of the ratio of the previous maximum-list-set-entry-count object to the maximum-list-set-element-count object and the ratio of the target-maximum-entry-count object to the target-maximum-element-count object and (2) the new maximum-event-monitor-controls-count object (213) is within the range of the previous maximum-event-monitor-controls-count object and the target-maximum-event-monitor-count object (212).

If conflicts are present and the apportionment-priority indicator indicates that priority is to be given to maximizing structure storage utilization, the new ratios may lie outside these ranges. When a timeout response code is returned, the maximum event-monitor-controls count (213), the maximum list-set-entry count and maximum list-set-element count need not be the largest counts possible.

Completing a List-Allocation Process: The initial-allocation process is complete when (1) commands may be processed against structure objects, or (2) a list structure is not created because there is insufficient storage available to create a marginally-sized structure. A successful response code is returned.

When initial allocation is complete, the maximum event-monitor-controls count (213,704), maximum list-set-entry count and maximum list-set-element count are the largest counts possible given the structure size. The event-monitor-controls count (214) is zero (705).

When a list structure is not created but the initial allocation is complete, the maximum event-monitor-controls count (213), maximum-list-set-entry-count, maximum-list set-element-count, structure-size, and maximum-structure-size response operands are each set to zero. The minimum-apportionable-structure-size response operand is set equal to the calculated minimum apportionable structure size.

When all allocation processes are complete, the maximum event-monitor-controls count (213,704), maximum list-set-entry count and maximum list-set-element count are the largest counts possible given the structure size and given the current resource constraints. The event-monitor-controls count (214) is zero (705). A successful response code is returned.

Detaching a List-Structure User

A list-structure user is detached after one or more successful invocations of the detach-list-structure-user (DLSU) command.

When a list-structure user is detached, the user is deregistered from all objects being monitored, all event-monitor-controls objects associated with the user are deregistered (801,802,803), the event-queue-controls object is initialized (2404,2405,2406), and the user is placed in the detached state. The user controls may also be deleted and the appropriate assigned bit in the user-identifier vector may be set to zero, depending on the detachment-request type.

Comparing Event-Monitor-Controls Counts

The maximum event-monitor-controls-count object is compared with the event-monitor-controls-count object whenever an event monitor is registered and event-monitor-controls creation is requested (1003). The event-monitor-controls object space is full when the maximum event-monitor-controls object equals the event-monitor-controls object (1301,1305).

Registering a Monitor

A monitor is registered by means of the register-list-monitor (RLM) or register-event-monitors (REMS) command. A list-structure user may register as a monitor when the user is attached with a nonzero list-notification token (LNT).

The register-list-monitor (RLM) command can be used to register any of the following three types of monitors: list, event queue, and event monitors. The monitor-request-type operand is provided to specify the monitor type. The register-event-monitors (REMS) command is used to register a number of event monitors.

When the monitor-request-type operand specifies a list monitor, the list-monitoring-active bit is set to indicate that list monitoring is active, and the list-notification-request type and list-notification-entry number are updated in the list-monitor-table entry of the specified list and user.

When the monitor-request-type operand specifies an event-queue monitor, the event-queue-monitoring-active bit (507) is set to indicate that event queue monitoring is active (902), and the event-notification-request type (506) and event-notification-entry number (505) are updated in the specified event-queue controls (903).

When the monitor-request-type operand specifies an event monitor or a register-event-monitors (REMS) command is executed, the event-monitor-controls object (411,412) of each specified subsidiary list and user is created if it does not exist (1003), and is updated if it does exist (1004).

Registering a Monitor

A monitor is deregistered by means of the deregister-list-monitor or detach-list-structure-user (DLSU) command. The monitor-request-type operand is provided by the deregister-list-monitor (DLM) command to specify the monitor type to be deregistered. Execution of the detach-list-structure-user (DLSU) command deregisters all monitors for the specified user.

When a list monitor is deregistered, the list-monitoring-active bit is reset to zero in the list-monitor-table entry of the specified list and user.

When an event-queue monitor is deregistered, the event-queue-monitoring-active bit (507), the event-notification-request type (506), and event-notification-entry number (505) are reset (1102,1103,1104).

When an event monitor is deregistered, the event-monitor-controls object (411,412) associated with the user and subsidiary list are deleted (1202).

Handling of Event-Monitor Controls

This section describes processes of creating, updating, queueing, dequeueing, deleting, and withdrawing an event-monitor-controls object.

Creating Event-Monitor Controls: When a user registers interest in a subsidiary list by means of executing a register-list-monitor (RLM) or register-event-monitors (REMS) command, if the associated event-monitor-controls object (411,412) does not exist (1002), then an event-monitor-controls object is created for the user and the specified subsidiary list (1003).

Event-monitor-controls counts are compared to determine whether EMC object space is full (1301). If so, an EMC space full condition is indicated (1305) and the creation is unsuccessful. Otherwise, storage for a new event-monitor-controls object is assigned (1302), the event-monitor-controls-count (214) is incremented by one (1303), the event-monitor-queued indicator (415) is set to indicate that the EMC is not queued on an event queue, and an association is formed between the EMC and the subsidiary list (1306).

The list-number (417), list-entry-key (416), and user-notification controls (419) objects within the EMC are updated as requested (1401). If the subsidiary list with which the EMC has been associated is empty (1402), the monitored-object state operand is set to indicate an empty subsidiary list (1403). If the subsidiary list is not-empty, the monitored-object state operand is set to indicate a not-empty subsidiary list (1404); additionally, if the initial-notification request type operand requests initial notification (1406), the EMC is queued to the user's event queue (503,1410).

Updating Event-Monitor Controls: When a user registers interest in a subsidiary list by means of executing a register-list-monitor (RLM) or register-event-monitors (REMS) command, if the associated event-monitor-controls object (411,412) already exists (1002), then the object is updated (1004).

The list-number (417), list-entry-key (416), and user-notification controls (419) objects within the EMC are updated as requested (1401). If the subsidiary list with which the EMC has been associated is empty (1402), the monitored-object state operand is set to indicate an empty subsidiary list (1403), and if the initial-notification request type operand requests initial notification (1405) and the EMC is currently queued on the user's event queue (1407), the EMC is withdrawn from the user's event queue (1409). If the subsidiary list is not-empty, the monitored-object state operand is set to indicate a not-empty subsidiary list (1404), and if the initial-notification request type operand requests initial notification (1406), and the EMC is not currently queued to the user's event queue (1408), the EMC is queued to the user's event queue (1410).

Queueing Event-Monitor Controls: The event-monitor-controls-queueing process may be for all of the event-monitor-controls objects associated with a subsidiary list, or for a single event-monitor controls object.

When an event monitor is registered by means of the register-list-monitor (RLM) or register-event-monitors (REMS) command, if the initial-notification-request-type operand indicates that initial notification is requested (1406), the designated subsidiary list is not-empty (1402), and the designated event-monitor-controls object is not queued (1408), then a single event-monitor-controls-queueing process is performed to queue the designated event-monitor-controls object to the event queue of the user (1410).

When execution of a command causes an empty-to-not-empty subsidiary-list-state transition (2103,2104), a subsidiary-list event-monitor-controls-queueing process is initiated for the subsidiary list (2106). Execution of a subsidiary-list event-monitor-controls-queueing process queues every event-monitor-controls object that exists at that time and is associated with the designated subsidiary list to the event queue of the user specified in the event-monitor-controls object (1501,1502,1503). No action is taken for those designated event-monitor-controls objects that are already queued (1505). If no designated event-monitor-controls object exists, no action is taken and the process execution is complete.

Execution of an event-monitor-controls queueing process is complete before execution of a subsequent withdrawal process targeted to the same event-monitor-controls object begins.

When an EMC is to be queued, if it is not already queued to the user's event queue (1505), the EMC is placed on the tail of the user's event queue (1506), the event-monitor-controls-queued count (504) is incremented by one (1507), the event-monitor-queued indicator (509) is set to indicate that the EMC is queued (1508); also, if the event queue transitions from the empty to not-empty state (1509) as a result of the EMC being queued, the event-queue-transition count (508) is incremented by one (1510) and event queue monitor notification is performed (1511). If the EMC to be queued is already queued on the user's event queue, no action is taken.

Dequeueing Event-Monitor Controls: The event-monitor-controls objects of a user are dequeued from the event queue by means of the dequeue-event-monitor-controls (DEMC) command.

When an EMC is to be dequeued, if it is queued to the user's event queue (1602), the EMC is removed from the the user's event queue (1603), the event-monitor-controls-queued count (504) is decremented by one (1604), the event-monitor-queued indicator (509) is reset to indicate that the EMC is not queued (1605); also, if the event queue transitions from the not-empty to empty state as a result of the EMC being dequeued (1606), event queue monitor notification is performed (1608). If the EMC to be dequeued is not queued on the user's event queue, no action is taken.

Deleting Event-Monitor Controls: When a user is detached by means of executing a detach-list-structure-user (DLSU) command, all event-monitor-controls objects of the user are deregistered and deleted. When a user deregisters an event monitor via the deregister-list-monitor (DLM) command, the associated event-monitor-controls object are deregistered and deleted.

When an EMC is deleted, it is removed from its association with a particular subsidiary list (1702). If the EMC is currently queued to the user's event queue (1703), it is dequeued (1704). The storage assigned to the EMC is released (1705), and the event-monitor-controls count (214) is decremented by one (1706).

Withdrawing Event Monitor Controls: The event-monitor-controls-withdrawal process may be for all of the event-monitor-controls objects associated with a subsidiary list, or for a single event-monitor-controls object.

When an event monitor is registered by means of the register-list-monitor (RLM) or register-event-monitors (REMS) command, if the initial-notification-request-type operand indicates that initial notification is requested (1405), the designated subsidiary list is empty (1402), and the designated event-monitor-controls object is queued (1407), then a single event-monitor-controls-withdrawal process is performed to withdraw the designated event-monitor-controls object from the event queue of the user (1409).

When execution of a command causes a not-empty-to-empty subsidiary-list-state transition (2103,2104), a subsidiary-list event-monitor-controls-withdrawal process is initiated for the subsidiary list (2105). Execution of a subsidiary-list event-monitor-controls withdrawal process withdraws every event-monitor-controls object that is associated with the designated subsidiary list from the event queue of the user specified in the event-monitor-controls object (1801,1802,1803). No action is taken for those designated event-monitor-controls objects that are not queued (1804). If no designated event-monitor-controls object is queued to any event queue, no action is taken and the process execution is complete.

Execution of an event-monitor-controls-withdrawal process is complete before execution of a subsequent queueing process targeted to the same event-monitor-controls object begins.

When an EMC is to be withdrawn, if it is currently queued to the user's event queue (1804), the EMC is removed from the user's event queue (1805), the event-monitor-controls-queued count (504) is decremented by one (1806), the event-monitor-queued indicator (509) is reset to indicate that the EMC is not queued (1807); also, if the event queue transitions from the not-empty to empty state (1808) as a result of the EMC being withdrawn, event-queue monitor notification is performed (1809). If the EMC to be withdrawn is not queued on the user's event queue, no action is taken.

Notifying an Event-Queue Monitor

When an event-queue-state transition occurs, one or more list-notification commands are generated for the event queue.

When registration of an event-queue monitor is performed and the initial-notification-request-type operand indicates that initial notification is requested (907), one or more list-notification commands are performed for the user (908). When the specified event queue is empty (1903), a list-notification command indicating a not-empty-to-empty queue-state transition is performed (1904); when the specified event queue is not-empty (1903), a list-notification command indicating an empty-to-not-empty queue-state transition is performed (1905).

If performance of an event-monitor-controls-queueing process (1509) or event-monitor-controls-withdrawal process (1808) causes the designated event queue to change its state, then one or more event-queue monitor notification processes are performed (1511,1809). This in turn may initiate one or more list-notification commands (1904,1905).

If performance of an event-monitor-controls-dequeueing process or event-monitor-controls-deletion process causes the designated event queue to change its state (1606), then one or more event-queue monitor notification processes are performed (1608). This, in turn, may initiate one or more list-notification commands (1904,1905). The only exception is that the event-monitor-controls-deletion processes initiated by the detach-list-structure-user (DLSU) command do not initiate any list-notification command (1607).

Execution of a List-Notification Command

The list-notification command provides the information necessary for the designated OS to update one list-notification-vector entry or event-notification-vector entry and, when requested, the associated summaries, to reflect the current state of the list or event queue.

When a pending list-notification command is executed, the command is issued to each user who has registered interest at the time of command execution. If no one has registered interest at that time, the command execution is complete and no other action is taken. If there are two or more pending commands for the event queue or the list, only the most recently initiated one that reflects the current state of the queue or list needs to be executed and all previous pending commands may be purged.

Execution of a pending list-notification command to indicate a list-state or event-queue-state transition may be complete without notifying the user if the most recent notification received by the same user for the same list or event queue since last registration also indicated the same transition.

Execution of a list-notification command for a user is completed when (1) a message-response block is received at the SES facility in response to the command, (2) all message paths in the path group are inactive at the time of path selection, (3) the associated user is deregistered, or (4) the state of all of the active message paths to the associated OS is made error state pending by the OS and inactive by the SES facility. All list-notification commands are ensured to complete.

When a list-notification command is executed for a user, the command execution is complete before execution of another list-notification command on behalf of the same list or event queue and user that specifies the opposite list-state or event-queue-state transition begins.

LIST STRUCTURE COMMANDS

Allocate List Structure (ALST)

The user structure control is updated when (1) a list structure is created or (2) the initial-allocation process is complete, the structure authority comparison is successful, and the user-structure-control indicator in the allocation-type request operand indicates that update of the user-structure-control is requested.

The allocate-list-structure (ALST) command creates a list structure (2001) when (1) the specified created bit of the structure-identifier vector is zero, (2) the structure-authority comparison succeeds, and (3) the target-structure-size operand is sufficient for creating the requested lock-table entries, lists and associated controls, (4) the target-structure-size operand is less than or equal to the maximum-structure-size operand, and (5) there is sufficient storage available to create a list structure of a marginal size.

When a list structure is created (2002), the pending entry-to-element ratio is set to the value of the target-entry-to-element-ratio request operand.

The allocate-list-structure (ALST) command continues the initial allocation of a list structure when (1) the specified created bit of the structure-identifier vector is one, (2) the structure-authority comparison succeeds, and (3) initial allocation of the structure has not completed.

The allocate-list-structure (ALST) command initiates or continues expansion of a list structure when (1) initial allocation of the structure has been completed, (2) the structure-authority comparison succeeds, (3) the structure-size indicator indicates that a size change is requested, and (4) the specified target structure size is greater than or equal to the value of the structure-size object.

The allocate-list-structure (ALST) command initiates or continues contraction of a list structure when (1) initial allocation of the structure has been completed, (2) the structure-authority comparison succeeds, (3) the structure-size indicator indicates that a size change is requested, and (4) the specified target structure size is smaller than the value of the structure-size object.

When expansion or contraction is initiated or continued, the structure-size-change indicator is set to indicate that a structure size change is in progress in the list-structure controls.

The allocate-list-structure (ALST) command initiates or continues entry-to-element reapportionment of a list structure when (1) initial allocation of the structure has been completed, (2) the structure-authority comparison succeeds, (3) the entry-to-element ratio indicator indicates that entry-to-element reapportionment is requested, and (4) the target entry-to-element ratio results in target counts where the ratio of the target maximum-entry count to the target maximum-element count differs from the ratio of the maximum list-set-entry count to the maximum list-set-element count.

When entry-to-element reapportionment is initiated or continued, the entry-reapportionment-in-progress indicator is set to indicate that entry-to-element reapportionment is in progress, and the pending entry-to-element ratio is set to the value of the target-entry-to-element-ratio request operand.

The allocate-list-structure (ALST) command resumes entry-to-element reapportionment of a list structure when (1) initial allocation of the structure has been completed, (2) the structure-authority comparison succeeds, (3) the structure-size indicator indicates that a size change is requested, (4) the entry-to-element ratio indicator indicates that entry-to-element reapportionment is not requested, and (5) the pending entry-to-element ratio results in target counts where the ratio of the target maximum-entry count to the target maximum-element count differs from the ratio of the maximum list-set-entry count to the maximum list-set-element count.

When entry-to-element reapportionment is resumed, the entry-reapportionment-in-progress indicator is set to indicate that entry-to-element reapportionment is in progress.

The list-structure processes are checkpointed and stopped at the established checkpoint when (1) initial allocation of the structure has been completed, (2) the structure-authority comparison succeeds, and (3) none of the indicators in the allocation type are requested.

When (1) the allocation processes are completed all the allocation processes are checkpointed, and the entry-reapportionment-in-progress and structure-size-change indicators are set to indicate that their respective processes are not in progress in the list-structure controls, or (2) the user structure control is updated, or both, then the maximum event-monitor-controls count (213), maximum list-set-entry count, maximum list-set-element count, maximum structure size, minimum apportionable structure size, marginal structure size, structure size, target maximum-event-monitor count (212), target structure size, target maximum entry count, target maximum element count, and a successful response code are returned in the response operands.

When a model-dependent time period has elapsed before the allocation processes are completed, the processes are checkpointed, and the maximum event-monitor-controls count (213), maximum list-set-entry count, maximum list set-element count, maximum structure size, minimum apportionable structure size, marginal structure size, structure size, entry-reapportionment-in-progress indicator, structure-size-change indicator, target maximum-event-monitor count (212), target structure size, target maximum entry count, target maximum element count, and a timeout response code are returned in the response operands.

When the structure-authority comparison fails, the structure authority, the user structure control, and an indicative response code are returned in the response operands.

When the list structure does not exist and the target structure size specified is (1) insufficient to allow for the creation of the requested lock-table entries, lists, and associated controls, or (2) larger than the maximum-structure-size request operand, the minimum apportionable structure size, marginal structure size, and an indicative response code are returned to the program.

A request exception is recognized when the element-toleration factor, entry-toleration factor, allocation type, list count, list-element characteristic, list-structure type, lock-table-entry characteristic, lock-table-entry count, maximum data-list-entry size, structure identifier, or target entry-to-element ratio is invalid. Command execution is suppressed.

Entry-Related List Structure Commands

The entry-related list structure commands consist of the following set of commands: Delete List Entries (DLES), Delete List Entry (DLE), Delete List Set (DLS), Move and Read List Entry (MRLE), Move List Entry (MLE), Read and Delete List Entry (RDLE), Write and Move List Entry (WMLE), and Write List Entry (WLE).

When a list entry is deleted, moved, or created by one of these entry-related list structure commands, and monitored list-state transitions result, the list monitors are notified.

When a list entry is deleted, moved, or created by one of these entry-related list structure commands (2101), and one or more monitored subsidiary-list-state transitions result (2102,2103,2104,2107), the event-monitor-controls objects associated with the subsidiary list(s) are queued (2106) or withdrawn (2105), or both. If this causes event-queue transitions (1509,1808), the event-queue monitors are notified (1511,1809).

Dequeue Event-Monitor Controls (DEMC)

The event-monitor-controls objects are dequeued from the event queue associated with the specified user starting at the leftmost position and proceeding to the right (2208) until the model-dependent time period elapses (2213), the data area is filled (2212), or the last event-monitor-controls object is dequeued (2214).

The returned event-monitor-queued indicators always indicate that the event-monitor-controls object(s) are not queued to the user's event queue (2209,2210).

When an event-monitor-controls object is dequeued and an event-queue-state transition results (1606), the event-queue monitor is notified (1608).

When the retry index is nonzero, the retry buffer is written.

When the last event-monitor-controls object is dequeued (2214), the event-monitor-controls-queued count is set to zero (1604), the event-monitor-controls-dequeued count is set to the number of event-monitor-controls objects dequeued and returned (2211), the dequeued event-monitor controls (2210), and a successful response code are returned in the response operands (2215).

When the data area is filled or a model-dependent time period has elapsed, the event-monitor-controls-queued count is set to the number of event-monitor-controls objects still queued (1604), the event-monitor-controls-dequeued count is set to the number of event-monitor-controls objects dequeued and returned (2211), the dequeued event-monitor controls (2210), and a timeout response code are returned in the response operands (2217).

When the message-buffer size is less than 4096 bytes (2205), an indicative response code is returned in the response operand (2216).

When the list structure does not support keyed entries (2204), the list-structure-type object is invalid and a request exception is recognized.

A request exception is recognized when the retry-index operand (2203), the structure-identifier operand (2201), the user-identifier operand (2202), or the list-structure-type object (2204) is invalid. Command execution is suppressed.

Deregister List Monitor (DLM)

The deregister-list-monitor (DLM) command deregisters the designated monitor (2307,2314).

When an event monitor is deregistered, the designated event-monitor-controls object is deregistered (2307) and deleted (1202), if it exists (2306). If this causes an event-queue transition, the event-queue monitor is notified.

When an event-queue monitor is deregistered, the event-queue controls associated with the deregistering user are located (2313) and deregistered (2314).

When the monitor is deregistered, a successful response code is returned in the response operand (2308,2315).

A request exception is recognized when the list number (2303), structure identifier (2301,2310), or user identifier (2302,2311) is invalid, or when the list structure does not support keyed list entries (2304,2312). Command execution is suppressed.

Detach List-Structure User (DLSU)

The detach-list-structure-user (DLSU) command initiates or continues detaching the list-structure user when the user-authority comparison succeeds.

When the user-authority comparison succeeds, the detach-list-structure-user (DLSU) command completes detaching the list-structure user, the user is deregistered for all objects previously being monitored (2402,801,802,803), all event-monitor-controls objects associated with the user are deleted (1202), and the event-queue-controls object is reset to its initial state (2403,2404,2405,2406).

The user identifier is placed in the unassigned state and the user controls are deleted when the user-authority comparison succeeds, the user is detached, and the detachment-request type specifies that the user identifier is to be unassigned.

When the list-structure user is detached, a successful response code is returned in the response operand.

When the model-dependent time period has elapsed before the detachment process is complete, a timeout response code is returned in the response operand.

When the user-authority comparison fails, the user authority, user-attachment control, and an indicative response code are returned in the response operands.

Read Event-Monitor Controls (REMC)

When the specified event-monitor-controls object exists (2506,2507), the event-monitor controls and a successful response code are returned in the response operands (2508).

When the specified event-monitor controls object does not exist, an indicative response code is returned in the response operand (2509).

When the list structure does not support keyed entries, the list-structure-type object is invalid and a request exception is recognized (2504).

A request exception is recognized when the list-number operand (2503), the structure-identifier operand (2501), the user-identifier operand (2502), or the list-structure-type object (2504) is invalid. Command execution is suppressed.

Read Event-Queue Controls (REQC)

The event-queue controls for the specified user (2604) and a successful response code are returned in the response operands (2605).

When the list structure does not support keyed entries, the list-structure-type object is invalid and a request exception is recognized (2603).

A request exception is recognized when the structure-identifier operand (2601), the user-identifier operand (2602), or the list-structure-type object (2603) is invalid. Command execution is suppressed.

Register Event Monitors (REMS)

The registration requests which are received as input via the command's data area are processed starting with the event-monitor-controls object specified by the user identifier and the registration request designated by the starting event index (2707,2708), and continuing in the order as specified in the data area, up through the registration request designated by the ending event index (2713). Each requested event monitor is registered (2710). Each individual registration request in the data area contains the list number, list-entry key, and user-notification controls associated with the event-monitor registration which is to be performed.

When the initial-notification-request-type operand indicates that initial notification is requested (1405,1406), a withdrawal (1409) or queueing (1410) of the event-monitor-controls object associated with each requested event monitor may be performed. If this causes an event-queue transition, the event-queue monitor is notified (1511,1809).

When the last event monitor specified by the ending event index is processed (2713), the event-monitor-controls count (214), the maximum event-monitor-controls count (213), the monitored-object-state vector (2712), and a successful response code are returned in the response operands (2718).

When a model-dependent time period has elapsed (2715), the current event index of the next event to be processed, the event-monitor-controls count (214), the maximum event-monitor-controls count (213), the monitored-object-state vector (2712), and a timeout response code are returned in the response operands (2717).

When event-monitor registration requiring event-monitor-controls creation is requested and the event-monitor-controls object space is full (1305,2711), the current event index of the event currently being processed, the event-monitor-controls count (214), the maximum event-monitor-controls count (213), the monitored-object-state vector (2712), and an indicative response code are returned in the response operands (2717).

When the specified list-structure user is attached with a zero list-notification token (2706), an indicative response code is returned in the response operand (2716).

When the list number is invalid (2709), the current event index of the event currently being processed, the event-monitor-controls count (214), the maximum event-monitor-controls count (213), the monitored-object-state vector (2712), and an indicative response code are returned in the response operand (2717).

When the list structure does not support keyed entries, the list-structure-type object is invalid and a request exception is recognized (2705).

A request exception is recognized when the ending-event-index operand (2704), the starting-event-index operand (2703), the structure-identifier operand (2701), the user-identifier operand (2702), or the list-structure-type object (2705) is invalid. Command execution is suppressed.

Register List Monitor (RLM)

The register-list-monitor (RLM) command registers the designated monitor (2806,2815), as specified by the monitor-request type.

When a list monitor is registered, the list-entry count or the list-element count, the monitored object state, and a successful response code are returned in the response operands. If the initial-notification-request-type operand indicates that initial notification is requested, the list monitor is notified.

When an event-queue monitor is registered (2815), the event-monitor-controls-queued count (504), the monitored object state (905,906), and a successful response code are returned in the response operands (2816). If the initial-notification-request-type operand indicates that initial notification is requested (907), the event-queue monitor is notified (908).

When an event monitor is registered (2806), the event-monitor-controls count (214), the maximum event-monitor-controls count (213), the monitored object state (1403, 1404), and a successful response code are returned in the response operands (2808). If the initial-notification-request-type operand indicates that initial notification is requested (1405,1406), a withdrawal (1409) or queueing (1410) of the designated event-monitor-controls object may be performed. If this causes an event-queue transition, the event-queue monitor is notified (1511,1809).

When the specified list-structure user is attached with a zero list-notification token (2805,2814), an indicative response code is returned in the response operand (2809, 2817).

When event-monitor registration requiring event-monitor-controls creation is requested and the event-monitor-controls object space is full (1305,2807), the event-monitor-controls count (214), the maximum event-monitor-controls count (213), and an indicative response code are returned in the response operands (2810).

A request exception is recognized when the list number (2803), structure identifier (2801,2811), or user identifier (2802,2812) is invalid, or when the list-structure type indicates that list entries are not keyed (2804,2813). Command execution is suppressed.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

Having thus described our invention, what we claim as new and desire to secure by Letters Patent is:

1. Notification controls in an system external storage (SES) connected to one or more central processor complexes (CPCs) commands and responses being communicated between the SES and any CPC, a list structure being stored in SES storage by a SES processor under CPC command, the list structure containing one or more lists, each list having a respective list control, each list having any number of list entries, and each list having any number of list entries which may be stored in contiguous and non-contiguous areas in SES storage, user programs in the CPC issuing commands to the SES for using list entries, the notification controls in the SES further comprising:

each list containing any number of subsidiary lists including no subsidiary list, each subsidiary list comprised of a subset of list entries contiguously located in the SES storage and having a common subsidiary-list-entry identifier (SLEID), each SLEID being unique in each list, an event monitoring control (EMC) created in SES for an associated subsidiary list for each user program indicating an interest in the associated subsidiary list, each subsidiary list having a variable number of EMCs determined by the number of user programs indicating an interest in the associated subsidiary list and having no EMC when no user program has indicated an interest in the associated subsidiary list, an event queue (EQ) created in SES for a respective user program in any CPC which is to process subsidiary list n SES to provide a number of EQs in SES identified with corresponding user programs and CPCs containing the user programs, any EMC being queued onto the EQ created for the user program identified with the EMC when the subsidiary list associated with the EMC has a state transition from an empty state to a non-empty state or from a non-empty state to an empty state; and notification controls in SES for performing a notification communication by SES to the CPC identified for an EQ when an EMC is queue onto the EQ for notifying the user program associated with the EMC of the transition by the associated subsidiary list.

2. A list notification structure in an external storage (SES) as defined in claim 1, the notification controls in the SES further comprising:

a list notification command signaled by SES to the CPC for indicating to the user program indicated in the notification communication that a state transition has occurred in a subsidiary list for which the user program has registered an interest.

3. A list notification structure in an external storage (SES) as defined in claim 2, the notification controls in the CPC further comprising:

a field in an event queue notification vector in the CPC being set to a predetermined state by a signal received by the CPC from the list SES notification command to indicate the user's EQ in SES has a transition indicated in at least one subsidiary list for which the user has registered an interest.

4. A list notification structure in an external storage (SES) as defined in claim 3, the notification controls in the CPC further comprising:

a user test instruction executed for a user program to determine the state of a field associated with an EQ of the user in the event queue notification vector to obtain notification of state transition by any subsidiary list in which the user program has registered an interest.

5. A list notification structure in an external storage (SES) as defined in claim 3, the notification controls in the CPC further comprising:

a bit providing the field for each respective EQ represented in the event queue notification vector in the CPC.

6. A list notification structure in an external storage (SES) as defined in claim 3, the notification controls in the CPC further comprising:

a protected storage area in the CPC containing the EQ notification vector.

7. A list notification structure in an external storage (SES) as defined in claim 1, the notification controls in the SES further comprising:

EMC processing controls for queuing a representation of the EMC onto each EQ for each user program having registered with the EMC an interest in the associated subsidiary list when the associated subsidiary list registers a transition from an empty state to a non-empty state.

8. A list notification structure in an external storage (SES) as defined in claim 7, the notification controls in the SES further comprising:

the EMC processing controls withdrawing the representation of the EMC queued onto each EQ for each user program having registered with the EMC an interest in the subsidiary list when the EMC registers a transition changing the associated subsidiary list from a non-empty state to an empty state.

9. A list notification structure in an external storage (SES) as defined in claim 7, the notification controls in the CPC further comprising:

a user-application-protocol program in the CPC respectively associated with a field in the user's EQ-notification vector, the user's field being scanned by the associated user-application-protocol program for an indication of a notification by SES of a change in transition state of any subsidiary list in which the user program has registered an interest in the SES.

10. A list notification structure in an external storage (SES) as defined in claim 1, the notification controls further comprising:

a register-list-monitor (RLM) command initiated by the CPC for signalling SES that a user identifier operand of the command represents a user program indicating an interest in an identified subsidiary list indicated by another operand of the command; and an EMC associated with the identified subsidiary list registering the user identifier operand to indicate an interest in an associated subsidiary list by the associated user program.

11. A list notification structure in an external storage (SES) as defined in claim 10, the notification controls further comprising:

the register-list-monitor (RLM) command being executed for any user program any number of times in the CPC for signalling SES that the user program is indicating an interest in any number of identified subsidiary lists associated with any number of EMCs.

12. A list notification structure in an external storage (SES) as defined in claim 11, the notification controls in the CPC further comprising:

the register-list-monitor (RLM) command also signalling to SES a user's list-notification token (LNT) and a field identification of which field in an EQ-list vector in the CPC is assigned to the user program for notification by the EMC associated with the identified subsidiary list, the LNT enabling the SES to identify the user program to the CPC in commands later issued by the SES.

13. A list notification structure in an external storage (SES) as defined in claim 12, the notification controls further comprising:

the register-list-monitor (RLM) command also signalling SES to create an EQ associated with the identified subsidiary list in the RLM command if no EQ is found associated with the identified subsidiary list.

14. A list notification structure in an external storage (SES) as defined in claim 13, the notification controls further comprising:

the register-event-monitors (REMS) command being issued by an operating system in the CPC for signalling SES that a user program identifier operand is indicating an interest by a user program in one or more identified subsidiary-list-associated operand(s) identifying associated EMC(s) and registering the user program identifier in the associated EMC(s).

15. A list notification structure in an external storage (SES) as defined in claim 1, the notification controls in the CPC further comprising:

a dequeue-event-monitor-controls (DEMC) command executed by the CPC for a user program to request SES to dequeue EMC representations enqueued onto the user's EQ for identifying to the user the subsidiary lists associated with the dequeued EMCs representing state transitions to empty state.

16. A list notification structure in an external storage (SES) as defined in claim 15, the notification controls in the CPC further comprising:

all EMC representations on an EQ being dequeued from the EQ and returning the content of each dequeued EMC to the CPC, in response to the DEMC command.

17. A notification structure in a SES as defined in claim 1, the notification controls further being included in:

one or more additional CPCs being connected to the SES in a multi-system;

each CPC independently executing one or more operating system (OSs) with user programs running under the OSs; and any one or more user programs in any one or more of the CPCs communicating with the SES through any of the OSs to use EQs and EMCs in the SES to access and use subsidiary lists in the SES for which any user program has registered an interest.

18. A notification method for use in a system external storage (SES) connected to at least one central processor complex (CPC) having commands and responses being communicated between the SES and CPC, a list structure being stored in the SES storage by a SES processor under CPC command, the list structure containing one or more lists, each list having a respective list control, each list having any number of list entries, and each list having any number of list entries which may be stored in contiguous and non-contiguous areas in SES storage, user programs in the CPC issuing commands to the SES for using list entries, controls in the SES further comprising the steps of:

storing in any list none, one or more subsidiary lists, each subsidiary list comprised of a subset of list entries contiguously located in SES storage and having a common subsidiary-list-entry identifier (SLEID), each SLEID being unique in each list;

creating in SES for any subsidiary list an associated event monitoring control (EMC) for a user program in a CPC indicating to SES an interest in the subsidiary list;

creating in SES an event queue (EQ) for each user program in an identified CPC which can access the subsidiary lists in SES, queuing on an EQ a created EMC indicating the same user program as the EQ when the subsidiary list associated with the EMC has a state transition from empty to non-empty or from non-empty to empty, and communicating when the EMC is queued on the EQ the state transition to a CPC identified for the EQ and also communicating the user program indicated for the EMC.

19. A notification method for use in an external storage (SES) as defined in claim 18, the notification controls in the SES further comprising the steps of:

signaling a list notification command by SES to the CPC for indicating to the user program that a transition has occurred in a subsidiary list for which the user program has registered an interest.

20. A list notification method for use in an external storage (SES) as defined in claim 19, the notification controls in the SES further comprising the steps of:

setting a field in an event queue notification vector in the CPC to a predetermined state by a signal received by the CPC from the list SES notification command to indicate the user's EQ in SES has a transition indicated in at least one subsidiary list for which the user has registered an interest.

21. A list notification method for use in an external storage (SES) as defined in claim 20, the notification controls in the SES further comprising the steps of:

executing a user test instruction for a user program to determine the state of a field associated with an EQ of the user in the event queue notification vector to obtain notification of state transition by any subsidiary list in which the user program has registered an interest.

22. A list notification method for use in an external storage (SES) as defined in claim 20, the notification controls in the SES further comprising the steps of:

providing a bit as the field for each respective EQ represented in the event queue notification vector in the CPC.

23. A list notification method for use in an external storage (SES) as defined in claim 20, the notification controls in the SES further comprising the steps of:

accessing for the SES a protected storage area in the CPC containing the EQ notification vector.

24. A notification method for use in an external storage (SES) as defined in claim 18, the notification controls in the SES further comprising the steps of:

queuing an EMC representation onto each EQ for each user program for a state transition registered in the EMC associated with the subsidiary list registered in the EMC as having interest to the user program associated with the EQ when the EMC registers a state transition from an empty state to a non-empty state for the associated subsidiary list.

25. A list notification method for use in an external storage (SES) as defined in claim 24, the notification controls in the SES further comprising the steps of:

withdrawing the EMC representation of the state transition queued onto each EQ for each user program registered with the EMC as having an interest in an associated subsidiary list when the EMC registers the state transition from a non-empty state to an empty state for the associated subsidiary list.

26. A list notification method for use in an external storage (SES) as defined in claim 24, the notification controls in the SES further comprising the steps of:

executing a program using a user-application-protocol in the CPC for accessing a user associated field in the user's EQ-notification vector in CPC storage, the user associated field being scanned by the program using the user-application-protocol for detecting a notification by SES of a state transition by any subsidiary list in which the user program has registered an interest in the SES.

27. A list notification method for use in an external storage (SES) as defined in claim 18, the notification controls in the SES further comprising the steps of:

initiating a register-list-monitor (RLM) command by the CPC for signalling SES that a user identifier operand of the command represents a user program indicating an interest in an identified subsidiary list indicated by another operand of the command; and registering the user identifier operand in an EMC associated with the identified subsidiary list to indicate an interest in an associated subsidiary list by the associated user program.

28. A list notification method for use in an external storage (SES) as defined in claim 27, the notification controls in the SES further comprising the steps of:

executing the register-list-monitor (RLM) command for any user program any number of times in the CPC for signalling SES that the user program is indicating an interest in any number of identified subsidiary lists associated with any number of EMCs.

29. A list notification method for use in an external storage (SES) as defined in claim 28, the notification controls in the SES further comprising the steps of:

signalling to SES the register-list-monitor (RLM) command with a user's list-notification token (LNT) and a field identification for locating a user's field in an EQ-list vector in the CPC assigned to the user program for notification by the EMC associated with the identified subsidiary list, the LNT enabling the SES to identify the user program to the CPC in commands later issued by the SES.

30. A list notification method for use in an external storage (SES) as defined in claim 29, the notification controls in the SES further comprising the steps of:

signalling the register-list-monitor (RLM) command for SES to create an EQ associated with the identified subsidiary list in the RLM command if no EQ is found associated with the identified subsidiary list.

31. A list notification method for use in an external storage (SES) as defined in claim 30, the notification controls in the SES further comprising the steps of:

issuing by an operating system (OS) the register-event-monitors (REMS) command in the CPC for signalling SES that a user-identifier operand is indicating an interest by a user program in a one or more identified subsidiary list(s) having other operand(s) for identifying associated EMC(s) and registering the user-identifier in the associated EMC(s).

32. A list notification method for use in an external storage (SES) as defined in claim 18, the notification controls in the SES further comprising the steps of:

executing a dequeue-event-monitor-controls (DEMC) command by the CPC for a user program to request SES to dequeue EMC representations enqueued onto the user's EQ for identifying to the user the subsidiary lists associated with the dequeued EMCs having state transitions from the non-empty state to the empty state.

33. A list notification method for use in an external storage (SES) as defined in claim 32, the notification controls in the SES further comprising the steps of:

dequeuing all EMC representations on an EQ and returning the content of each dequeued EMC to the CPC, in response to the DEMC command.

34. A notification method for use in an external storage (SES) as defined in claim 18, the notification controls in the SES further comprising the steps of:

connecting one or more additional CPCs to the SES in a multi-system;

independently executing in each CPC one or more operating system (OSs) running user programs; and any one or more of the user programs in any one or more of the CPCs communicating with the SES through an OS in any of the CPCs to access and use the EQs and EMCs in the SES in associated subsidiary lists in the SES for which any of the user programs has registered an interest.

35. A multi-system configuration controlling and communicating information about a list structure in a SES (shared electronic storage) between the SES and any CPC (central electronics complex) in a multi-system configuration, comprising:

a list structure in the SES having a set of lists, each list in the list set containing any number of subsidiary lists from no subsidiary list to a large number of subsidiary lists, each subsidiary list containing any number of list entries from no list entry to a large number of list entries, an empty list containing no list entry in the list, and an empty subsidiary list containing no list entry in the subsidiary list;

an event-monitor-controls object (EMC) in the SES provided for each monitoring user of each monitored subsidiary list to represent that particular user's interest in monitoring that particular subsidiary list's transition state;

an event queue object (EQ) in the SES for each CPC user of the list structure, where each EQ is comprised of an event-queue controls object and zero or more event-monitor-controls objects which have been queued to the user's EQ in response to a transition from the empty to not-empty state of a subsidiary list with which the user's event-monitor-controls object is associated;

a list notification vector being located in each CPC assigned to each user of the list structure in the SES, each entry in the list notification vector associated either with a particular monitored list in the list structure or with the user's monitored event queue in the list structure, and each entry in the list notification vector indicating the empty or not-empty state of its associated monitored list or event queue, and a list notification vector summary bit indicating whether any of the monitored lists or the user's event queue represented within the user's list notification vector have transitioned from the empty to the not-empty state;

the EQ of any user transitioning to a not-empty state as a result of a particular subsidiary list monitored by the user having transitioned to the not-empty state, resulting in the associated event-monitor-controls object being queued to the user's event queue; and the list notification vector entry associated with the user's monitored event queue being set to indicate that the user's event queue has entered the not-empty state, and the associated list notification vector summary bit also being set to a notification state.

36. A multi-system SES list structure as defined in claim 1, further comprising:

the event queue of the user having all of its queued event-monitor-controls objects dequeued and their contents returned to the user in response to a command from the CEC; the list notification vector entry associated with the user's event queue being set to an empty state when all of the event-monitor-controls objects are removed from the user's event queue; and the user making use of the returned contents of the event-monitor-controls objects from the user's event queue to determine which subsidiary list(s) within the list structure have transitioned from an empty to a not-empty state.

37. A method in a multi-system configuration for controlling and communicating information about a list structure located in a SES (shared electronic storage) between the SES and any CPC (computer processing complex) in a multi-system configuration, comprising:

allocating and generating a list structure in the SES having a set of lists, each list in the list set containing any number of subsidiary lists from no subsidiary list to a large number of subsidiary lists, each subsidiary list containing any number of list entries from no list entry to a large number of list entries, an empty list containing no list entry in the list, and an empty subsidiary list containing no list entry in the subsidiary list;

creating an event-monitor-controls object EMC in the SES for each monitoring user of each subsidiary list in the list structure to represent that particular user's interest in monitoring that particular subsidiary list's transition state;

creating an event queue object (EQ) in the SES for each user of the list structure, where each EQ is comprised of an event-queue controls object and zero or more event-monitor-controls objects which have been queued to the user's event queue in response to a transition from the empty to not-empty state of the subsidiary list with which the event-monitor-controls object has been associated;

locating a subsidiary list transition notification indicator in each CPC for each user of subsidiary lists in the list structure, associating each subsidiary list transition notification indicator with the user's monitored event queue in the SES;

signalling from SES to the CPC containing a user interested in an EQ when the event queue queues an EMC of interest to the user associated with the EQ when the EMC transitions to a not-empty state as a result of a subsidiary list monitored by the user having transitioned to the not-empty state, and setting the subsidiary list transition notification indicator associated with the user's monitored event queue to indicate that the user's event queue has entered the not-empty state.

38. A method in a multi-system for controlling and communicating information about a list structure between any number of CECs and a SES, as defined in claim 3, further comprising:

dequeueing from the event queue of the user all of its queued event-monitor-controls objects, and returning their contents to the user in response to a command from the CEC;

setting the list notification vector entry associated with the user's event queue to an empty state when all of the event-monitor-controls objects are removed from the user's event queue; and making use of the returned contents of the event-monitor-controls objects from the user's event queue to determine which subsidiary list(s) within the list structure have transitioned from an empty to a not-empty state.

* * * * *

UNITED STATES PATENT AND TRADEMARK OFFICE
CERTIFICATE OF CORRECTION

PATENT NO. : 5,887,135
DATED : March 23, 1999
INVENTOR(S) : D. J. Dahlen et al.

It is certified that error appears in the above-indentified patent and that said Letters Patent is hereby corrected as shown below:

Column 29, line 4, "Registering a Monitor" should read --Deregistering a Monitor--

Signed and Sealed this

Twenty-third Day of November, 1999

Attest:

Q. TODD DICKINSON

*Attesting Officer*        *Acting Commissioner of Patents and Trademarks*